United States Patent
Deng et al.

(10) Patent No.: US 12,309,734 B2
(45) Date of Patent: May 20, 2025

(54) REGISTRATION METHOD AND APPARATUS FOR REGISTERING USER EQUIPMENT

(71) Applicant: HUAWEI TECHNOLOGIES CO., LTD., Guangdong (CN)

(72) Inventors: Juan Deng, Hangzhou (CN); Chengdong He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 715 days.

(21) Appl. No.: 17/512,757

(22) Filed: Oct. 28, 2021

(65) Prior Publication Data
US 2022/0053446 A1    Feb. 17, 2022

Related U.S. Application Data

(63) Continuation of application No. PCT/CN2020/087062, filed on Apr. 26, 2020.

(30) Foreign Application Priority Data

Apr. 29, 2019  (CN) .......................... 201910357072.4
Jun. 17, 2019  (CN) .......................... 201910521938.0
Aug. 19, 2019  (CN) .......................... 201910765736.0

(51) Int. Cl.
*H04W 60/00*  (2009.01)
*H04W 12/06*  (2021.01)
*H04W 36/00*  (2009.01)

(52) U.S. Cl.
CPC .......... *H04W 60/00* (2013.01); *H04W 12/06* (2013.01); *H04W 36/0033* (2013.01)

(58) Field of Classification Search
CPC . H04W 60/00; H04W 12/06; H04W 36/0033; H04W 12/069; H04W 12/72; H04W 8/20
See application file for complete search history.

(56) References Cited

U.S. PATENT DOCUMENTS

2018/0279411 A1    9/2018  Kang et al.
2019/0159025 A1*   5/2019  Ben Henda ......... H04W 36/385
(Continued)

FOREIGN PATENT DOCUMENTS

CN    101505479 A    8/2009
CN    107580324 A    1/2018
(Continued)

OTHER PUBLICATIONS

ETSI TS 133 501 V15.2.0 (Oct. 2018)Technical Specification 5G; Security architecture and procedure for 5G System (3GPP TS 33.501 version 15.2.0 Release 15), p. 51, Section 6.4.2.2 Multiple active NAS Connections in the same PLMN's serving network (Year: 2018).*

(Continued)

*Primary Examiner* — Brandon J Miller

(57) ABSTRACT

Embodiments of this application relate to a registration method and apparatus to ensure that user equipment does not discard and processes a received authentication request message sent by a target AMF. In the registration method, an initial AMF sends indication information to the UE, or the target AMF sends, to the UE, the authentication request message that includes indication information, where the indication information is used to indicate the UE to delete an NAS security context. The UE deletes the NAS security context, processes the received authentication request message, and sends an authentication response message to the target AMF. Alternatively, the UE directly processes a received authentication request message without security protection, and sends an authentication response message to the target AMF.

18 Claims, 25 Drawing Sheets

(56) References Cited

U.S. PATENT DOCUMENTS

2019/0281649 A1* 9/2019 Moisanen ............. H04W 80/10
2019/0313250 A1* 10/2019 Moisanen ......... H04W 12/0431

FOREIGN PATENT DOCUMENTS

| CN | 108347728 A | 7/2018 |
| CN | 109314942 A | 2/2019 |
| CN | 109462847 A | 3/2019 |
| WO | 2018174524 A1 | 9/2018 |
| WO | 2020254359 A1 | 12/2020 |

OTHER PUBLICATIONS

Huawei et al., "Solving registration failure in initial registration procedure with AMF reallocation",3GPP TSG-SA WG3 Meeting #95 S3-191413, Reno (US), May 6-10, 2019, total 4 pages.
Extended European Search Report dated Apr. 7, 2022 for Application No. 20799587.9, 24 pages.
3GPP TS 23.502 V16.0.2 (Apr. 2019); 3rd Generation Partnership Project; Technical Specification Group Services and System Aspects; Procedures for the 5G System; Stage 2 (Release 16); total 419 pages.
3GPP TS 24.501 V16.0.2, Non-Access-Stratum (NAS) protocol for 5G System (5GS); Stage 3 Mar. 2019, 480 pages.
3GPP TS 33.501 V15.4.0 (Mar. 2019), 3rd Generation Partnership Project;Technical Specification Group Services and System Aspects; Security architecture and procedures for 5G system (Release 15), total 187 pages.
Office Action issued in CN201910765736, dated May 8, 2021, 14 pages.
International Search Report and Written Opinion issued in PCT/CN2020/087062, dated Jun. 28, 2020.

* cited by examiner

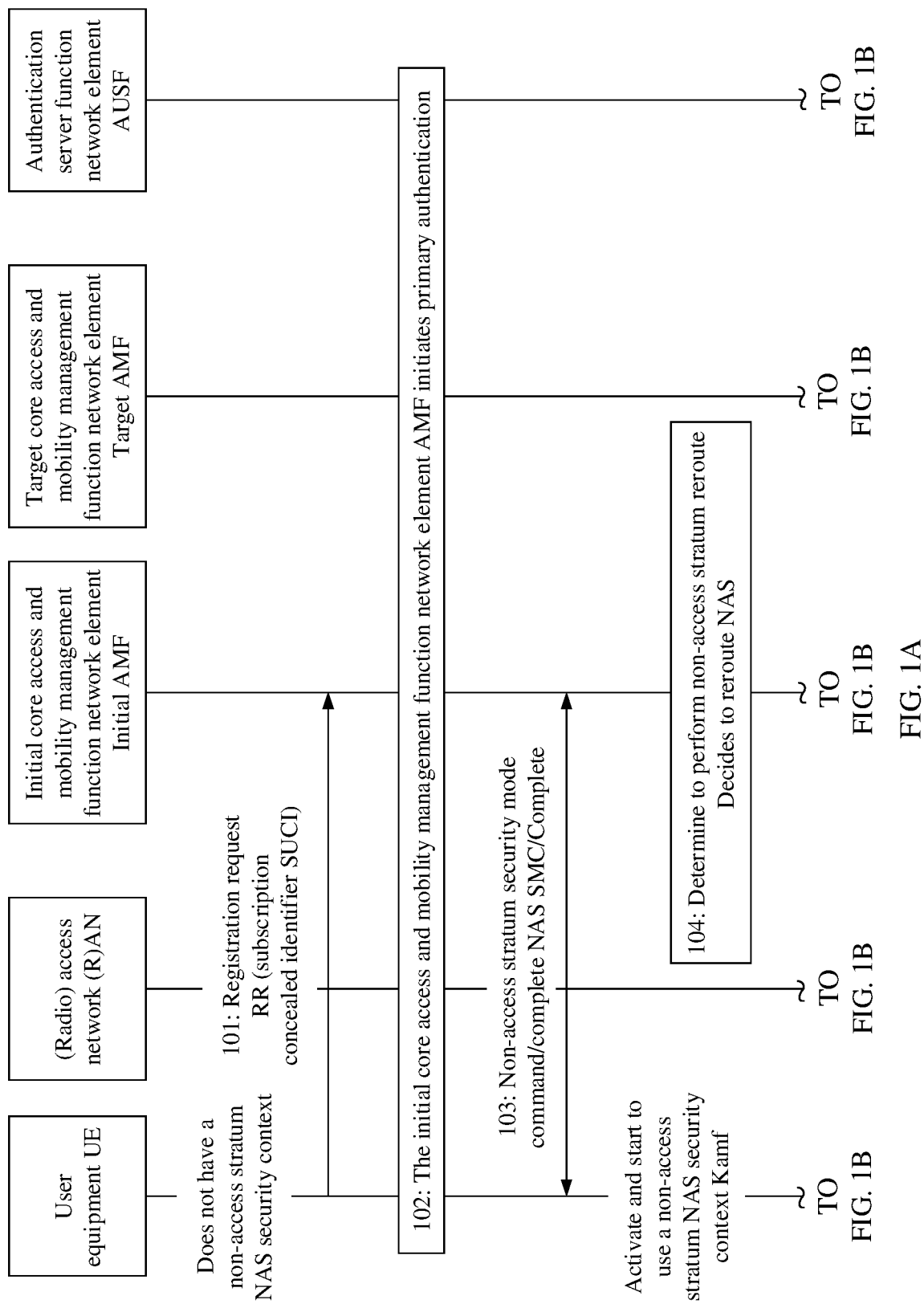

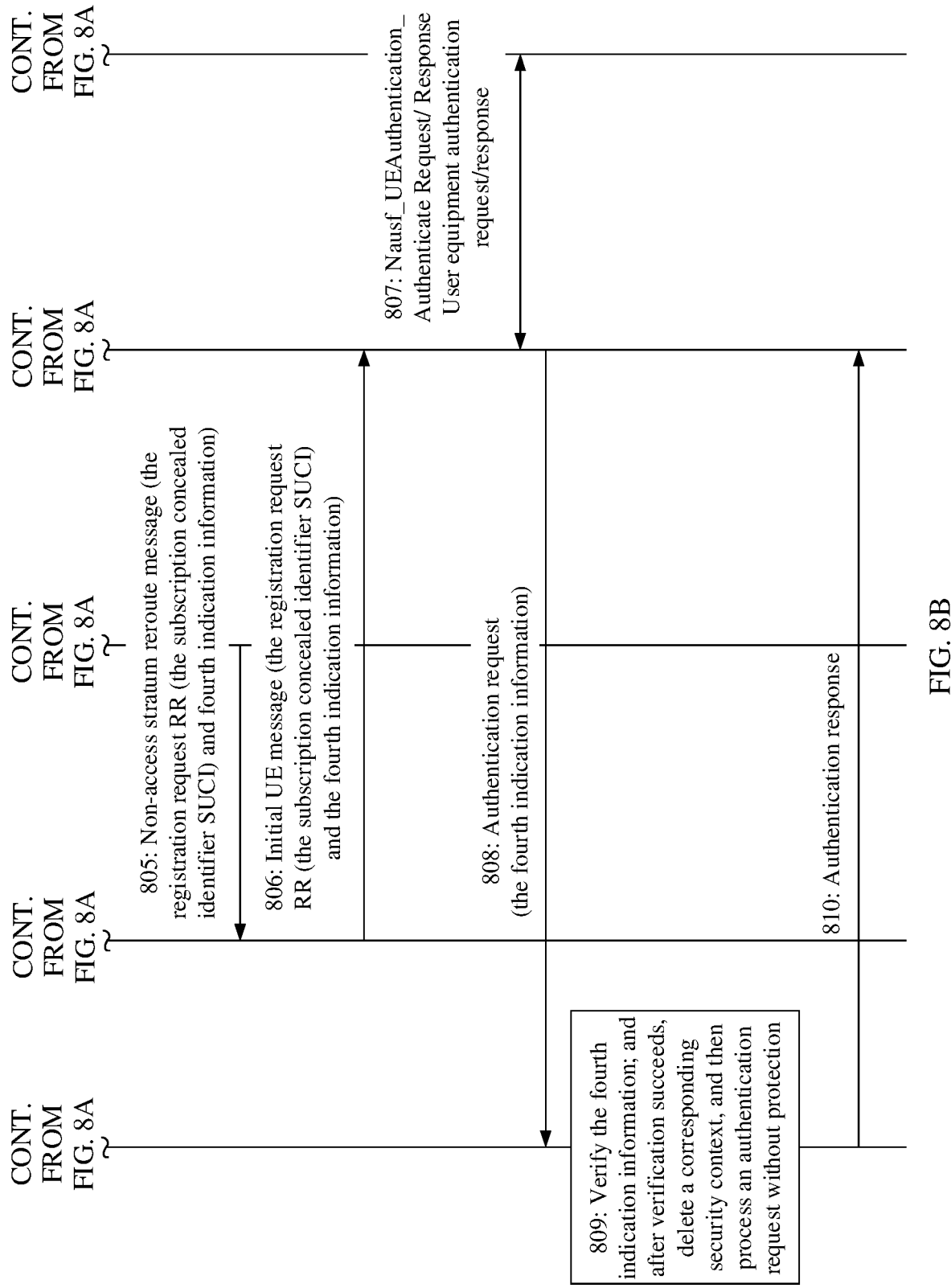

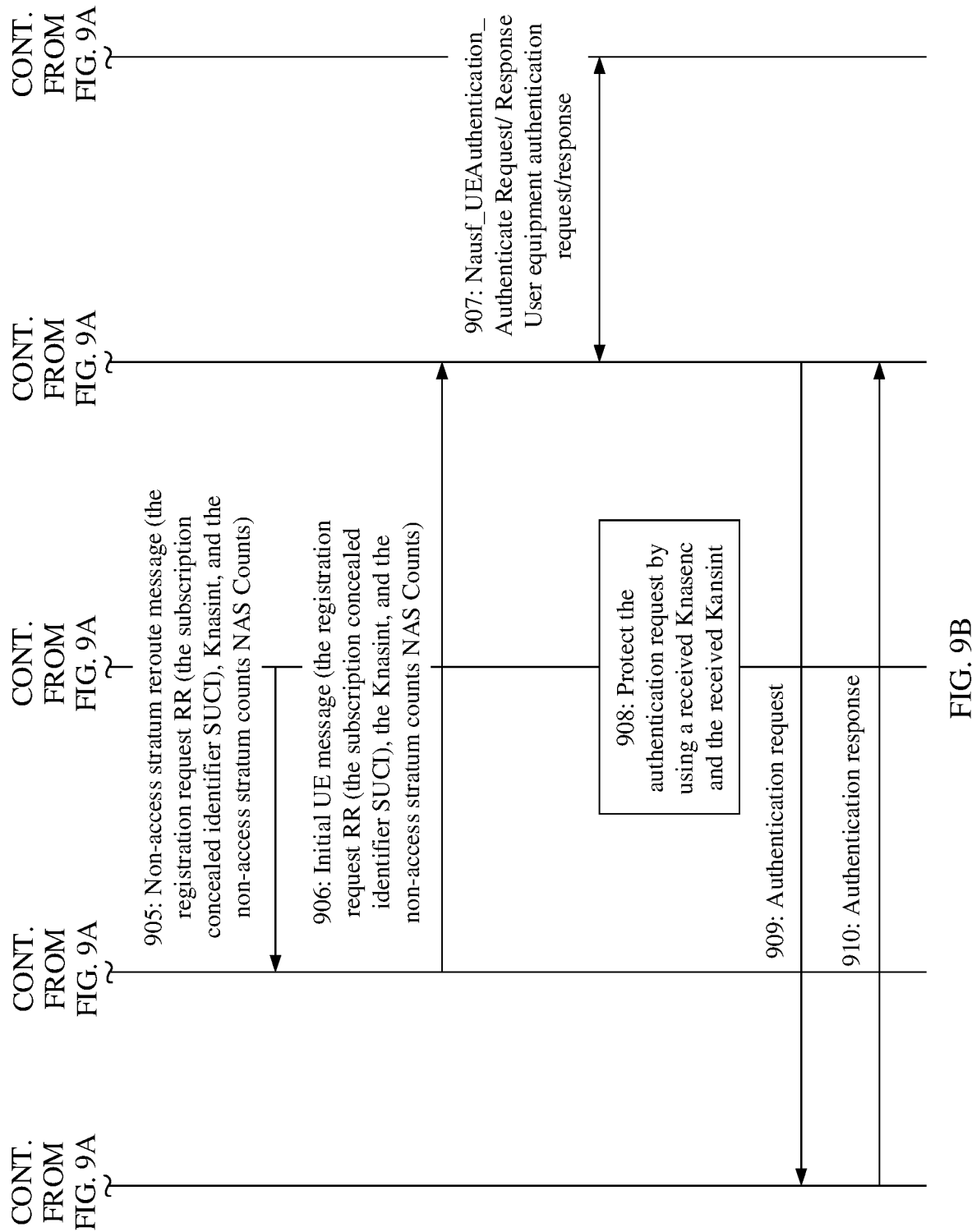

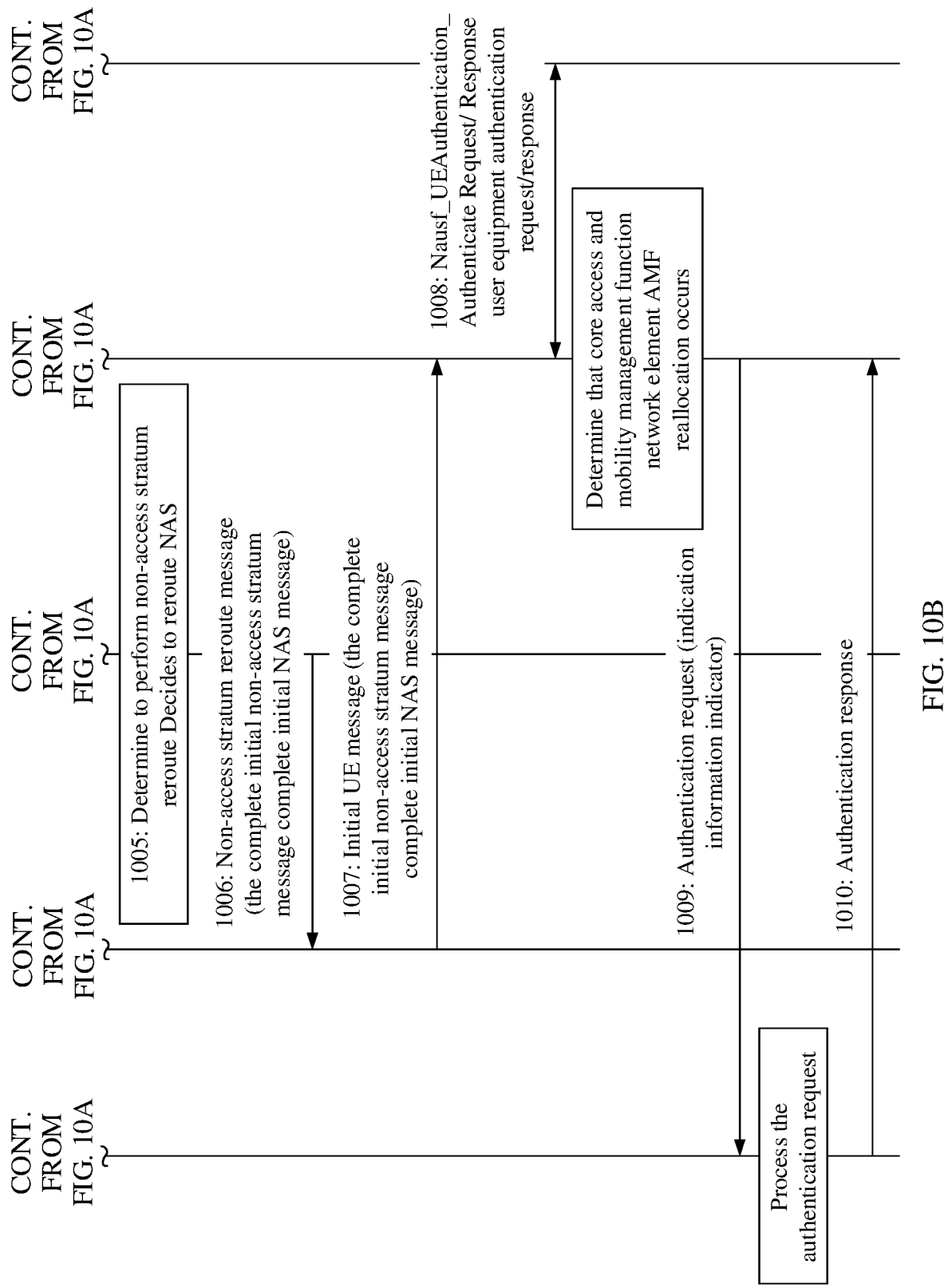

REGISTRATION METHOD AND APPARATUS FOR REGISTERING USER EQUIPMENT

CROSS-REFERENCE TO RELATED APPLICATIONS

This application is a continuation of International Patent Application No. PCT/CN2020/087062, filed on Apr. 26, 2020, which claims priority to Chinese Patent Application No. 201910357072.4 filed on Apr. 29, 2019, Chinese Patent Application No. 201910521938.0 filed on Jun. 17, 2019, and Chinese Patent Application No. 201910765736.0 filed on Aug. 19, 2019. All of the aforementioned patent applications are hereby incorporated by reference in their entireties.

TECHNICAL FIELD

The present technology relates to the field of wireless communication technologies, and in particular, to a registration method and apparatus.

BACKGROUND

As defined in the standard 3rd Generation Partnership Project (3GPP) TS 23.502 [1], in a fifth generation mobile communication technology (5G) system, a core access and mobility management function (AMF) network element reallocation procedure occurs in a registration process of user equipment (UE).

During initial registration of the UE, the UE first initiates registration request that carries a subscription concealed identifier (SUCI). The registration request information carries only cleartext information element(s) (IE). After receiving the registration request that carries the SUCI, an initial AMF initiates primary authentication to generate an AMF key Kamf and a corresponding key set identifier ngKSI. The initial AMF activates and starts to use the Kamf generated during the primary authentication by using a non-access stratum (NAS) security mode control procedure. The UE also activates and uses the Kamf. Because the registration request message sent by the UE includes only the cleartext IEs, the UE sends an NAS Security Mode Complete message including a complete registration request message, where the complete registration request information includes Requested S-NSSAIs. The initial AMF determines whether the initial AMF can serve the UE based on the Requested S-NSSAIs. When the initial AMF cannot serve the UE, the initial AMF performs NAS reroute, namely, AMF reallocation. The initial AMF sends the received registration request information to a target AMF that can serve the UE. When there is no direct connection between the initial AMF and the target AMF, the initial AMF sends the received registration request message that carries the SUCI to the target AMF via a (radio) access network ((R)AN).

The target AMF does not have an NAS security context, and the NAS security context includes the AMF key Kamf, the corresponding key identifier ngKSI, and the like. Therefore, when initiating primary authentication, the target AMF sends an authentication request message without security protection to the UE. However, the UE is not aware of AMF reallocation and the NAS security context has been established in the UE. Therefore, the UE does not process the authentication request message when receiving the authentication request message without security protection. As a result, the UE fails to register and cannot access a network.

SUMMARY

Embodiments of this application provide a registration method and apparatus, to prevent existing UE from discarding or not processing an authentication request message sent by a target AMF, so as to prevent the UE from failing to register.

According to a first aspect, a registration method is provided. The method includes the following processes.

An initial AMF sends a first non-access stratum security mode command message to a UE, or an initial AMF sends, to the UE, a first non-access stratum security mode command message that carries eighth indication information. The eighth indication information is used to indicate the UE to store an NAS security context if there is the NAS security context, or used to indicate the UE to store a currently used NAS security context if there is the currently used NAS security context.

The UE stores the NAS security context based on the first non-access stratum security mode command message or the eighth indication information if there is the NAS security context. Alternatively, the UE stores the currently used NAS security context based on the first non-access stratum security mode command message or the eighth indication information if there is the currently used NAS security context.

The initial AMF determines to perform AMF reallocation.

The initial AMF sends indication information to the UE, where the indication information is used to indicate the UE to delete or discard the NAS security context, used to indicate the UE to deactivate the current NAS security context of the UE, used to indicate the UE to process an authentication request message without security protection, used to indicate the UE that AMF reallocation occurs on a network side, used to indicate the UE to restore a state in which there is no NAS security context, used to indicate the UE to delete or discard a new NAS security context established between the UE and the initial AMF, used to indicate the UE to delete or discard an NAS security context established between the UE and the initial AMF, used to indicate the UE to delete or discard the new NAS security context, used to indicate the UE to deactivate the current NAS security context established between the UE and the initial AMF, and/or used to indicate the UE to resume using a stored NAS security context if there is the stored NAS security context.

It should be understood that, after the initial AMF determines to perform AMF reallocation via a (R)AN, the initial AMF sends the indication information before sending an NAS reroute message to the (R)AN.

The UE receives the indication information sent by the initial AMF.

Based on the indication information, the UE discards or deletes the NAS security context, deactivates the current NAS security context of the UE, determines not to discard and processes the received authentication request message without security protection, determines that AMF reallocation occurs on the network side, restores the state in which there is no NAS security context, deletes or discards the new NAS security context established between the UE and the initial AMF, deletes or discards the NAS security context established between the UE and the initial AMF, deletes or discards the new NAS security context, deactivates the current NAS security context established between the UE and the initial AMF, and/or resumes using the stored NAS security context if there is the stored NAS security context.

If the UE receives an authentication request message sent by a target AMF, the UE processes the authentication request message, and sends an authentication response message without security protection to the target AMF.

In an initial registration process, if the initial AMF determines to perform AMF reallocation, the initial AMF sends, to the UE, indication information used to indicate the UE to delete the NAS security context, indication information used to indicate the UE to deactivate the current NAS security context, indication information used to indicate the UE to process authentication request information without security protection, or indication information used to indicate the UE that AMF reallocation occurs on the network side. The UE receives the indication information, deletes the NAS security context based on the indication information, and processes the received authentication request information. Alternatively, the UE deactivates the current NAS security context based on the indication information, and processes the received authentication request message. Alternatively, the UE processes the received authentication request information based on the indication information, and processes the authentication request message without security protection. Alternatively, the UE determines that AMF reallocation occurs on the network side, and processes the received authentication request message. The UE sends the authentication response message without security protection to the target AMF. The UE does not discard and processes the received authentication request message, thereby preventing the UE from failing to register.

In a possible implementation, that the initial AMF sends indication information includes:

The initial AMF sends a first notification message to the UE, where the first notification message is used to indicate the UE to delete the NAS security context, used to indicate the UE to deactivate the current NAS security context, used to indicate the UE to process the authentication request message without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, and/or used to indicate the UE to resume using the stored NAS security context if there is the stored NAS security context.

That the UE receives the indication information sent by the initial AMF includes:

The UE receives the first notification message sent by the initial AMF.

The initial AMF sends the first notification message to the UE, and the UE receives the first notification message. The first notification message is used to indicate the UE to delete the NAS security context, used to indicate the UE to deactivate the current NAS security context, used to indicate the UE to process the authentication request message without security protection, or used to indicate the UE that AMF reallocation occurs on the network side. This ensures that the UE does not discard and processes the received authentication request message.

In a possible implementation, that the initial AMF sends indication information includes:

The initial AMF sends a first NAS message to the UE, where the first NAS message carries first indication information. The first indication information is used to indicate the UE to delete the NAS security context, used to indicate the UE to deactivate the current NAS security context, used to indicate the UE to process the authentication request message without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, and/or used to indicate the UE to resume using the stored NAS security context if there is the stored NAS security context. The first NAS message that carries the first indication information is not limited in this application. Possible options, the NAS message include a configuration update command message, a downlink NAS transport message, a 5G system mobility management status (5GMM Status), a registration reject message, and the like.

That the UE receives the indication information sent by the initial AMF includes:

The UE receives the first NAS message sent by the initial AMF, where the first NAS message carries the first indication information.

The initial AMF sends the first NAS message to the UE, and the UE receives the first NAS message. The first message carries the first indication information, to indicate the UE to delete the NAS security context, indicate the UE to deactivate the current NAS security context, indicate the UE to process the authentication request message without security protection, or indicate the UE that AMF reallocation occurs on the network side. This ensures that the UE does not discard and processes the received authentication request message.

In a possible implementation, the first notification message or the first NAS message carries an ngKSI, and the ngKSI is used to indicate the UE to delete or deactivate the NAS security context corresponding to the ngKSI.

The first notification message or the first NAS message sent by the initial AMF to the UE carries the ngKSI, and the UE deletes or deactivates the NAS security context corresponding to the ngKSI. This ensures that the UE does not discard and processes the received authentication request message.

According to a second aspect, a registration method is provided. The method includes the following processes.

A target AMF receives sixth indication information, where the sixth indication information is used to indicate UE to delete an NAS security context, used to indicate the UE to deactivate a current NAS security context, used to indicate the UE to process an authentication request message without security protection, used to indicate the UE that AMF reallocation occurs on a network side, used to indicate the UE to restore a state in which there is no NAS security context, used to indicate the UE to delete or discard a new NAS security context established between the UE and an initial AMF, used to indicate the UE to delete or discard an NAS security context established between the UE and the initial AMF, used to indicate the UE to delete or discard the new NAS security context, used to indicate the UE to deactivate a current NAS security context established between the UE and the initial AMF, used to notify the target AMF that AMF reallocation occurs, used to indicate the target AMF to send an indication to the UE, and/or used to indicate the UE to resume using a stored NAS security context if there is the stored NAS security context.

The target AMF includes, based on the sixth indication information in an authentication request message sent to the UE, indication information used to indicate the UE to delete the NAS security context, indication information used to indicate the UE to deactivate the current NAS security context, indication information used to indicate the UE to process the authentication request message without security protection, indication information used to indicate the UE that AMF reallocation occurs on the network side, indication information used to indicate the UE to restore the state in which there is no NAS security context, indication information used to indicate the UE to delete or discard the new NAS security context established between the UE and the initial AMF, indication information used to indicate the UE to delete or discard the NAS security context established between the UE and the initial AMF, indication information used to indicate the UE to delete or discard the new NAS security context, indication information used to indicate the UE to deactivate the current NAS security context established between the UE and the initial AMF, and/or indication information used to indicate the UE to resume using the stored NAS security context if there is the stored NAS security context.

The target AMF receives an authentication response message without security protection sent by the UE.

The UE receives the authentication request message sent by the target AMF, where the authentication request information includes the indication information used to indicate the UE to delete the NAS security context, the indication information used to indicate the UE to deactivate the current NAS security context, the indication information used to indicate the UE to process the authentication request message without security protection, or the indication information used to indicate the UE that AMF reallocation occurs on the network side.

The UE deletes the NAS security context based on the indication information that is included in the authentication request message and that is used to indicate the UE to delete the NAS security context, and processes the authentication request message. The UE deactivates the current NAS security context based on the indication information that is included in the authentication request message and that is used to indicate the UE to deactivate the NAS security context, and processes the authentication request message. The UE processes the authentication request message without security protection based on an indication that is included in the authentication request message and that is used to indicate the UE to process the authentication request message without security protection. The UE processes the authentication request message based on the indication information that is included in the authentication request message and that is used to indicate the UE that AMF reallocation has occurred on the network side.

Based on the indication information sent by the target AMF, the UE discards or deletes the NAS security context, deactivates the current NAS security context of the UE, determines not to discard and processes the received authentication request message without security protection, determines that AMF reallocation occurs on the network side, restores the state in which there is no NAS security context, deletes or discards the new NAS security context established between the UE and the initial AMF, deletes or discards the NAS security context established between the UE and the initial AMF, deletes or discards the new NAS security context, deactivates the current NAS security context established between the UE and the initial AMF, and/or resumes using the stored NAS security context if there is the stored NAS security context.

The UE sends the authentication response message without security protection to the target AMF.

The target AMF includes, based on the received sixth indication information in the authentication request message sent to the UE, the indication information used to indicate the UE to delete the NAS security context, the indication information used to indicate the UE to deactivate the current NAS security context, the indication information used to indicate the UE to process the authentication request message without security protection, or the indication information used to indicate the UE that AMF reallocation occurs on the network side. The UE deletes the NAS security context based on the indication information that is included in the authentication request message and that is used to indicate the UE to delete the NAS security context. Alternatively, the UE deactivates the current NAS security context based on the indication information that is included in the authentication request message and that is used to indicate the UE to deactivate the current security context. Alternatively, the UE processes the authentication request message without security protection based on the indication information that is included in the authentication request message and that is used to indicate the UE to process the authentication request message without security protection. Alternatively, the UE processes the authentication request message based on the indication information that is included in the authentication request message and that is used to indicate the UE that AMF reallocation occurs on the network side. Alternatively, the UE resumes using the stored NAS security context based on the indication information that is included in the authentication request message and that is used to indicate the UE to resume using the stored NAS security context if there is the stored NAS security context, and processes the authentication request message. This ensures that the UE does not discard and processes the received authentication request message.

In a possible implementation, the initial AMF sends the sixth indication information to a RAN, and the target AMF receives the sixth indication information sent by the RAN.

In a possible implementation, the initial AMF sends a NAS Reroute Message carrying the sixth indication information to the (R)AN. The (R)AN sends an Initial UE Message carrying the sixth indication information to the target AMF.

In a possible implementation, that a target AMF receives sixth indication information includes:

The target AMF receives a second notification message sent by the RAN, where the second notification message carries second indication information. The second indication information is used to indicate the UE to delete the NAS security context, used to indicate the UE to deactivate the current NAS security context, used to indicate the UE to process the authentication request information without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, used to notify the target AMF that AMF reallocation occurs, used to indicate the target AMF to send the indication to the UE, and/or used to indicate the UE to resume using the stored NAS security context if there is the stored NAS security context.

The target AMF includes, based on the second indication information in the authentication request message sent to the UE, third indication information used to indicate the UE to delete the NAS security context, used to indicate the UE to deactivate the current NAS security context, used to indicate the UE to process the authentication request information without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, used to notify the target AMF that AMF reallocation occurs, used to indicate the target AMF to send the indication to the UE, and/or used to indicate the UE to resume using the stored NAS security context if there is the stored NAS security context.

Based on the third indication information, the UE deletes the NAS security context, and processes the authentication request message; deactivates the current NAS security context, and processes the authentication request message; processes the authentication request message without security protection; determines that AMF reallocation occurs on the network side, and processes the authentication request message; resumes the state in which there is no NAS security context, and processes the authentication request message; deletes or discards the new NAS security context established between the UE and the initial AMF, and processes the authentication request message; deletes or discards the NAS security context established between the UE and the initial AMF, and processes the authentication request message; deletes or discards the new NAS security context, and processes the authentication request message; deactivates (deactivate) the current NAS security context established between the UE and the initial AMF, and processes the authentication request message; and/or resumes using the stored NAS security context if there is the stored NAS security context, and processes the authentication request message.

The target AMF includes, based on the received second notification message or the second indication information, the third indication information in the authentication request message sent to the UE. Based on the third indication information, the UE deletes the NAS security context, and processes the authentication request message; deactivates the current NAS security context, and processes the authentication request message; processes the received authentication request message without security protection; determines that AMF reallocation occurs on the network side, and processes the authentication request message; restores the state in which there is no NAS security context, and processes the authentication request message; deletes or discards the new NAS security context established between the UE and the initial AMF, and processes the authentication request message; deletes or discards the NAS security context established between the UE and the initial AMF, and processes the authentication request message; deletes or discards the new NAS security context, and processes the authentication request message; deactivates the current NAS security context established between the UE and the initial AMF, and processes the authentication request message; and/or resumes using the stored NAS security context if there is the stored NAS security context. This ensures that the UE does not discard and processes the received authentication request message.

In a possible implementation, that a target AMF receives sixth indication information includes:

The target AMF receives a third notification message sent by the RAN, where the third notification message carries fourth indication information used to indicate the UE to verify the fourth indication information; and after verification succeeds, delete the NAS security context, deactivate the current NAS security context, process the authentication request message without security protection, indicate the UE that AMF reallocation occurs on the network side, restore the state in which there is no NAS security context, delete or discard the new NAS security context established between the UE and the initial AMF, delete or discard the NAS security context established between the UE and the initial AMF, delete or discard the new NAS security context, deactivate (deactivate) the current NAS security context established between the UE and the initial AMF, and/or resume using the stored NAS security context if there is the stored NAS security context.

The fourth indication information may be further used to notify the target AMF that AMF reallocation occurs, and/or indicate the target AMF to send the indication to the UE.

The target AMF includes, based on the fourth indication information, the fourth indication information in the authentication request message sent to the UE.

The indication information that is carried in the authentication request message and that is used to indicate the UE to delete the NAS security context, the indication information that is carried in the authentication request message and that is used to indicate the UE to deactivate the current NAS security context, the indication information that is carried in the authentication request message and that is used to indicate the UE to process the authentication request information without security protection, or the indication information that is carried in the authentication request message and that is used to indicate the UE that AMF reallocation occurs on the network side is the fourth indication information.

The UE verifies the fourth indication information; and after the verification succeeds, deletes the NAS security context and processes the authentication request message, deactivates the current NAS security context and processes the authentication request message, processes the authentication request message without security protection, restores the state in which there is no NAS security context and processes the authentication request message, deletes or discards the new NAS security context established between the UE and the initial AMF and processes the authentication request message, deletes or discards the NAS security context established between the UE and the initial AMF and processes the authentication request message, deletes or discards the new NAS security context and processes the authentication request message, deactivates the current NAS security context established between the UE and the initial AMF and processes the authentication request message, and/or resumes using the stored NAS security context if there is the stored NAS security context and processes the authentication request information.

The fourth indication information is generated by the initial AMF based on a key shared by the initial AMF and the UE. The fourth indication information includes a first parameter and a message authentication code of the first parameter. The first parameter may be a random number, or may be one or more of a UL NAS Count in a registration message sent by the UE to the initial AMF, or a UL NAS Count in an NAS Security Complete sent by the UE to the initial AMF. The message authentication code of the first parameter is a message authentication code obtained by the initial AMF by calculating the first parameter based on the key shared by the initial AMF and the UE. The shared key may be one or more of a Kamf, a Kseaf, an NAS encryption key Knasenc, an NAS integrity protection key Knasint, and the like that are generated between the UE and the initial AMF through primary authentication.

The target AMF includes, based on the received third notification message, the fourth indication information in the authentication request message sent to the UE. The UE verifies the fourth indication information; and after the verification succeeds, deletes the NAS security context, deactivates the current NAS security context, processes the authentication request message without security protection, or determines that AMF reallocation occurs on the network side. On the basis of ensuring that the UE processes the received authentication request message without security protection, the fourth indication information is verified, so that an attacker is prevented from sending spoofed fourth indication information. This improves security in an entire registration process.

In a possible implementation, that a target AMF receives sixth indication information includes:

The target AMF receives a complete registration request message sent by the RAN.

The target AMF sends the authentication request message to the UE based on the complete registration request message, and includes, in the authentication request, fifth indication information used to indicate the UE to delete the NAS security context, used to indicate the UE to deactivate the current NAS security context, used to indicate the UE to process the authentication request information without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, and/or used to indicate the UE to resume using the stored NAS security context if there is the stored NAS security context.

The UE deletes the NAS security context based on the fifth indication information, and processes the authentication request message; deactivates the current NAS security context based on the fifth indication information, and processes the authentication request message; processes the authentication request message without security protection based on the fifth indication information; restores the state in which there is no NAS security context based on the fifth indication information, and processes the authentication request message; deletes or discards, based on the fifth indication information, the new NAS security context established between the UE and the initial AMF, and processes the authentication request message; deletes or discards, based on the fifth indication information, the NAS security context established between the UE and the initial AMF, and processes the authentication request message; deletes or discards the new NAS security context based on the fifth indication information, and processes the authentication request message; deactivates, based on the fifth indication information, the current NAS security context established between the UE and the initial AMF, and processes the authentication request message; and/or resumes using the stored NAS security context based on the fifth indication information if there is the stored NAS security context, and processes the authentication request message.

The target AMF includes, based on the received complete registration request message, the fifth indication information in the authentication request message sent to the UE. Based on the fifth indication information, the UE deletes the NAS security context, deactivates the current NAS security context, processes the received authentication request message without security protection, or determines that AMF reallocation occurs on the network side. This ensures that the UE does not discard and processes the received authentication request message.

In a possible implementation, that the target AMF sends the authentication request message to UE, to indicate the UE to delete or deactivate the NAS security context includes:

The target AMF sends, to the UE based on an obtained next generation key set identifier ngKSI, the authentication request message carrying the ngKSI, where the ngKSI is used to indicate the UE to delete or deactivate the NAS security context corresponding to the ngKSI.

That the authentication request message carries the next generation key set identifier ngKSI used to indicate the UE to delete or deactivate the NAS security context includes:

The UE deletes, based on the ngKSI, the NAS security context corresponding to the ngKSI.

The UE deletes or deactivates the NAS security context corresponding to the ngKSI. This ensures that the UE does not discard and processes the received authentication request message.

According to a third aspect, a registration method is provided. The method includes the following processes.

UE establishes an NAS security context with an initial AMF.

The UE receives an authentication request message without security protection sent by a target AMF.

The UE processes the authentication request message without security protection.

The UE sends an authentication response message without security protection.

The UE may not discard the authentication request message without security protection, but directly process the authentication request message without security protection, to ensure that initial registration of the UE succeeds and the UE successfully accesses a network.

According to a fourth aspect, a registration method is provided. The method includes the following processes.

An initial AMF sends a first non-access stratum security mode command message to a UE, or an initial AMF sends, to the UE, a first non-access stratum security mode command message that carries eighth indication information. The eighth indication information is used to indicate the UE to store an NAS security context if there is the NAS security context, or used to indicate the UE to store a currently used NAS security context if there is the currently used NAS security context.

The UE stores the NAS security context based on the first non-access stratum security mode command message or the eighth indication information if there is the first non-access stratum security mode command message or the eighth indication information. Alternatively, the UE stores the currently used NAS security context based on the first non-access stratum security mode command message or the eighth indication information if there is the currently used NAS security context.

The initial AMF determines to perform AMF reallocation and determines a target AMF.

The initial AMF sends sixth indication information to the target AMF and/or the user equipment UE, where the sixth indication information is used to indicate the UE to delete the NAS security context, used to indicate the UE to deactivate the current NAS security context, used to indicate the UE to process an authentication request message without security protection, or indicate the UE that AMF reallocation occurs on a network side. The sixth indication information may be further used to indicate the UE to delete the NAS security context, used to indicate the UE to deactivate the current NAS security context, used to indicate the UE to process the authentication request information without security protection, used to indicate the UE that AMF reallocation occurs on the network side, used to indicate the UE to restore a state in which there is no NAS security context, used to indicate the UE to delete or discard a new NAS security context established between the UE and the initial AMF, used to indicate the UE to delete or discard an NAS security context established between the UE and the initial AMF, used to indicate the UE to delete or discard the new NAS security context, used to indicate the UE to deactivate the current NAS security context established between the UE and the initial AMF, used to notify the target AMF that AMF reallocation occurs, used to indicate the target AMF to send an indication to the UE, and/or used to indicate the UE to resume using the stored NAS security context if there is the stored NAS security context.

In a possible implementation, that the initial AMF sends sixth indication information to the target AMF and/or the UE includes:

The initial AMF includes a second notification message in a Reroute NAS Message sent to a (R)AN, and the second notification message includes second indication information. The second indication information is used to indicate the UE to delete the NAS security context, used to indicate the UE to deactivate the current NAS security context, used to indicate the UE to process the authentication request message without security protection, or used to indicate the UE that AMF reallocation occurs on the network side. The second indication information may be further used to indicate the UE to delete the NAS security context, used to indicate the UE to deactivate the current NAS security context, used to indicate the UE to process the authentication request information without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, used to notify the target AMF that AMF reallocation occurs, used to indicate the target AMF to send the indication to the UE, and/or used to indicate the UE to resume using the stored NAS security context if there is the stored NAS security context. The second notification message further includes a registration request that carries an SUCI. The second notification message further includes an optional ngKSI.

The (R)AN sends an Initial UE Message including the received second notification message to the target AMF.

The target AMF includes, based on the second indication information in an authentication request message sent to the UE, third indication information used to indicate the UE to delete the NAS security context, used to indicate the UE to deactivate the current NAS security context, used to indicate the UE to process the authentication request information without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, and/or used to indicate the UE to resume using the stored NAS security context if there is the stored NAS security context. The AMF includes an optional ngKSI in the authentication request message.

In a possible implementation, that the initial AMF sends sixth indication information to the target AMF and/or the UE includes:

The initial AMF includes a third notification message in a Reroute NAS Message sent to a (R)AN, and the third notification message includes fourth indication information. The fourth indication information is used to indicate the UE to verify the fourth indication information; and after verification succeeds, delete the NAS security context, deactivate the current NAS security context, process the authentication request message without security protection, indicate the UE that AMF reallocation occurs on the network side, restore the state in which there is no NAS security context, delete or discard the new NAS security context established between the UE and the initial AMF, delete or discard the NAS security context established between the UE and the initial AMF, delete or discard the new NAS security context, deactivate the current NAS security context established between the UE and the initial AMF, and/or indicate the UE to resume using the stored NAS security context if there is the stored NAS security context. The fourth indication information may be further used to notify the target AMF that AMF reallocation occurs, and/or indicate the target AMF to send the indication to the UE.

The third notification message further includes a registration request that carries an SUCI, and the third notification message further includes an optional ngKSI.

The (R)AN sends an Initial UE Message including the received third notification message to the target AMF.

The target AMF includes, based on the fourth indication information, the fourth indication information and the optional ngKSI in the authentication request message sent to the UE.

In a possible implementation, that the initial AMF sends sixth indication information to the target AMF and/or the UE includes:

The initial AMF includes a complete initial registration request message and an optional ngKSI in a Reroute NAS Message sent to an (R)AN.

The (R)AN sends an Initial UE Message including the received complete registration request message and the received optional ngKSI to the target AMF.

The target AMF sends an authentication request message to the UE based on the complete registration request information, and includes, in the authentication request message, fifth indication information used to indicate the UE to delete the NAS security context, used to indicate the UE to deactivate the current NAS security context, used to indicate the UE to process the authentication request information without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, and/or used to indicate the UE to resume using the stored NAS security context if there is the stored NAS security context. The AMF includes the optional ngKSI in the authentication request message.

According to a fifth aspect, a registration method is provided. The method includes the following processes.

An initial AMF determines to initiate AMF reallocation via a (R)AN or NAS reroute via a (R)AN in a registration process of UE, and determines to perform reallocation to a target AMF. The initial AMF requests the target AMF to assign a new 5G-GUTI to the UE, the initial AMF assigns a new 5G-GUTI to the UE, the initial AMF requests the target AMF to assign a special new 5G-GUTI used for AMF reallocation, or the initial AMF assigns a special new 5G-GUTI used for AMF reallocation to the UE. The initial AMF sends the new 5G-GUTI to the UE. The initial AMF initiates a de-registration procedure or sends a registration reject message, and indicates the UE to perform re-registration. Optionally, the initial AMF initiates RRC connection release. The UE performs re-registration based on an indication, and the UE initiates a registration request RR message that carries the new 5G-GUTI to the target AMF.

In this method, the initial AMF skips a step of NAS reroute via the (R)AN, in other words, skips a process in which the initial AMF sends a received registration request to the (R)AN, and the (R)AN sends the registration request to the target AMF.

In a possible implementation, the initial AMF sends, to the target AMF, information for requesting to assign the new 5G-GUTI to the UE, and the target AMF assigns the new 5G-GUTI to the UE. The target AMF sends a message that carries the new 5G-GUTI to the initial AMF.

After allocating the new 5G-GUTI, the target AMF flags the new 5G-GUTI, for example, flags the new 5G-GUTI as a 5G-GUTI used in an AMF reallocation scenario, and/or flags the new 5G-GUTI as a new 5G-GUTI assigned to the UE.

Optionally, the initial AMF requests the target AMF to assign the new 5G-GUTI.

Optionally, the initial AMF sends, to the target AMF, an SUCI carried in the received registration request.

After receiving the SUCI sent by the initial AMF, the target AMF stores the SUCI, and establishes a correspondence between the SUCI and the new 5G-GUTI.

Optionally, the initial AMF notifies the target AMF that AMF reallocation occurs.

In a possible implementation, the initial AMF assigns the new 5G-GUTI to the UE.

After allocating the new 5G-GUTI, the initial AMF flags the UE or flags the new 5G-GUTI, for example, flags the new 5G-GUTI as a 5G-GUTI used in an AMF reallocation scenario, and/or flags the new 5G-GUTI as a new 5G-GUTI assigned to the UE.

In a possible implementation, the initial AMF sends, to the target AMF, information for requesting to assign the special new 5G-GUTI used for AMF reallocation to the UE, and the target AMF assigns the special new 5G-GUTI used for AMF reallocation to the UE. The target AMF sends a message that carries the special new 5G-GUTI used for AMF reallocation to the initial AMF.

Optionally, the initial AMF requests the target AMF to assign the special new 5G-GUTI used for AMF reallocation.

Optionally, the initial AMF sends, to the target AMF, an SUCI carried in the received registration request.

After receiving the SUCI sent by the initial AMF, the target AMF stores the SUCI, and establishes a correspondence between the SUCI and the special new 5G-GUTI used for AMF reallocation.

Optionally, the initial AMF notifies the target AMF that AMF reallocation occurs.

In a possible implementation, the initial AMF assigns the special new 5G-GUTI used for AMF reallocation to the UE.

In a possible implementation, the target AMF receives the registration request RR, and checks the 5G-GUTI carried in the RR.

If the target AMF has flagged the 5G-GUTI locally, the target AMF initiates an identity request procedure to obtain an SUCI of the UE and performs primary authentication to successfully register the UE.

Alternatively, if the target AMF has flagged the 5G-GUTI locally, the target AMF searches for the correspondence between the SUCI and the 5G-GUTI and performs primary authentication to successfully register the UE.

If the target AMF determines that the 5G-GUTI is the 5G-GUTI used in AMF reallocation scenario, the target AMF initiates an identity request procedure to obtain an SUCI of the UE and performs primary authentication to successfully register the UE.

Alternatively, if the target AMF determines that the 5G-GUTI is the 5G-GUTI used in AMF reallocation scenario, the target AMF searches for the correspondence between the SUCI and the 5G-GUTI and performs primary authentication to successfully register the UE.

If the target AMF has previously received the SUCI, the target AMF initiates primary authentication to successfully register the UE.

Alternatively, if the target AMF does not receive the SUCI, the target AMF initiates an identity request procedure to obtain an SUCI of the UE and then performs primary authentication to successfully register the UE.

According to a sixth aspect, a registration method is provided. The method includes the following processes.

Optionally, UE includes an indicator 1 in a registration request message.

In a possible implementation, the indicator 1 is used to indicate:

the UE is UE with non-Release 15;
the UE is UE with Release 16 or UE with a release later than Release 16;
the UE supports a capability in Release 16 or a release later than Release 16;
the UE supports a capability of performing NAS reroute via a (R)AN;

the UE supports a capability of performing AMF reallocation via a (R)AN;

the UE supports a capability of falling back an NAS security context (in NAS reroute via a (RAN)/in AMF reallocation via a (RAN));

the UE supports a capability of (resuming) using an old NAS security context (in NAS reroute via a (RAN)/in AMF reallocation via a (RAN));

the UE supports a capability of deleting a new NAS security context (in NAS reroute via a (RAN)/in AMF reallocation via a (RAN));

the UE supports a capability of restoring to a state in which there is no NAS security context (in NAS reroute via a (RAN)/in AMF reallocation via a (RAN)); or the UE supports a capability of processing an NAS security context in NAS reroute (in NAS reroute via a (RAN)/in AMF reallocation via a (RAN)).

In a possible implementation, if an initial AMF does not receive the indicator 1, or an initial AMF determines, based on the registration request message, that the UE is UE with Release 15;

that the UE is UE with non-Release 16 or a release earlier than Release 16;

that the UE does not support the capability in Release 16 or a release later than Release 16;

that the UE does not support the capability of performing NAS reroute via a (R)AN;

that the UE does not support the capability of performing AMF reallocation via a (R)AN;

that the UE does not support the capability of falling back an NAS security context (in NAS reroute via a (RAN)/in AMF reallocation via a (RAN));

that the UE does not support the capability of (resuming) using an old NAS security context (in NAS reroute via a (RAN)/in AMF reallocation via a (RAN));

that the UE does not support the capability of deleting a new NAS security context (in NAS reroute via a (RAN)/in AMF reallocation via a (RAN));

that the UE does not support the capability of restoring to a state in which there is no NAS security context (in NAS reroute via a (RAN)/in AMF reallocation via a (RAN)); or that the UE does not support the capability of processing an NAS security context in NAS reroute (in NAS reroute via a (RAN)/in AMF reallocation via a (RAN)), the initial AMF directly performs NAS reroute, the initial AMF directly forwards the registration request message to a target AMF, or the initial AMF performs all the methods in any one of the fifth aspect and the possible implementations of the fifth aspect.

To be specific, the initial AMF sends, to the target AMF, information for requesting to assign a new 5G-GUTI to the UE, the initial AMF requests the target AMF to assign a special new 5G-GUTI used for AMF reallocation, the initial AMF assigns a new 5G-GUTI to the UE, or the initial AMF assigns a special new 5G-GUTI used for AMF reallocation to the UE.

In a possible implementation, the initial AMF receives the indicator 1, or the initial AMF determines, based on the registration request message, that the UE is the UE with non-Release 15;

that the UE is the UE with Release 16 or a release later than Release 16;

that the UE supports the capability in a Release 16 or a release later than Release 16;

that the UE supports the capability of performing NAS reroute via a (R)AN;

that the UE supports the capability of performing AMF reallocation via a (R)AN;

that the UE supports the capability of falling back an NAS security context (in NAS reroute via a (RAN)/in AMF reallocation via a (RAN));

that the UE supports the capability of (resuming) using an old NAS security context (in NAS reroute via a (RAN)/in AMF reallocation via a (RAN));

that the UE supports the capability of deleting a new NAS security context (in NAS reroute via a (RAN)/in AMF reallocation via a (RAN));

that the UE supports the capability of restoring to a state in which there is no NAS security context (in NAS reroute via a (RAN)/in AMF reallocation via a (RAN)); or that the UE supports the capability of processing an NAS security context in NAS reroute (in NAS reroute via a (RAN)/in AMF reallocation via a (RAN)). The initial AMF performs all the methods in any one of the first aspect, the second aspect, the third aspect, or the fourth aspect and the possible implementations of the first aspect, the second aspect, the third aspect, or the fourth aspect.

To be specific, the initial AMF notifies the UE that AMF reallocation occurs, the initial AMF indicates the UE to delete the NAS security context, the initial AMF returns to security in which the registration request is sent, or the initial AMF indicates the UE to receive and process an authentication request message without protection. Alternatively, the initial AMF notifies the target AMF that AMF reallocation occurs. Alternatively, the initial AMF sends the NAS security context to the target AMF. Alternatively, the initial AMF sends a complete registration request message to the target AMF.

In a possible implementation, if the initial AMF determines, according to a local policy and based on subscription information, to perform NAS reroute via the (R)AN (or send the registration request message to the target AMF via the (R)AN), the initial AMF performs all the methods in any one of the first aspect, the second aspect, the third aspect, or the fourth aspect, and the possible implementations of the first aspect, the second aspect, the third aspect, or the fourth aspect.

According to a seventh aspect, a registration method is provided. The method includes the following processes.

In a registration process of UE, an initial AMF determines to initiate AMF reallocation according to a local policy. When the initial AMF determines to directly perform NAS reroute, in other words, directly send a registration request (or an NAS message) to a target AMF, the initial AMF performs steps described in one of the following three manners.

Manner 1:

The initial AMF sends a current NAS security context of the UE to the target AMF.

Manner 2:

The initial AMF determines whether to perform horizontal Kamf derivation according to the local policy of the initial AMF. If the initial AMF determines to perform horizontal Kamf derivation, the initial AMF generates a new Kamf and sends the new Kamf to the target AMF. If the initial AMF determines not to perform horizontal Kamf derivation, the initial AMF sends a current NAS security context of the UE to the target AMF.

Manner 3:

That the initial AMF determines, based on whether a first AMF performs key derivation, whether the initial AMF performs key derivation specifically includes the following several possibilities:

Possibility 1:

If the first AMF does not perform key derivation, the initial AMF determines whether to perform key derivation according to the local policy.

For example, if the initial AMF does not receive thirteenth indication information that is from the first AMF and that is used to indicate that a new key is generated, or if the initial AMF does not receive a key derivation indication sent by the first AMF, where the key derivation indication may be referred to as keyAMFHDerivationInd and is used to indicate that the first AMF performs key derivation, the initial AMF determines whether to perform key derivation according to the local policy. If the initial AMF determines to perform horizontal Kamf derivation, the initial AMF generates a new Kamf and sends the new Kamf to the target AMF. If the initial AMF determines not to perform horizontal Kamf derivation, the initial AMF sends a current NAS security context of the UE to the target AMF.

The first AMF may be the initial AMF or the target AMF, or may be another AMF except the initial AMF and the target AMF.

Possibility 2:

If the first AMF performs key derivation, the initial AMF sends a current NAS security context of the UE to the UE.

For example, if the initial AMF receives thirteenth indication information that is from the first AMF and that is used to indicate that a new key is generated, or if the initial AMF receives a key derivation indication sent by the first AMF, the initial AMF sends the current security context of the UE to the UE.

In a possible implementation, the initial AMF performs horizontal Kamf derivation to generate a new Kamf. That the initial AMF generates the new Kamf includes one of the following manners:

the initial AMF generates the new Kamf based on a current Kamf and an uplink NAS COUNT value in the registration request RR;

the initial AMF generates the new Kamf based on a current Kamf and an uplink NAS COUNT value in an NAS Security Mode Complete message; or the initial AMF generates the new Kamf based on a current Kamf and a current downlink NAS COUNT value.

Specifically, that the initial AMF performs horizontal Kamf derivation to generate a new Kamf includes one of the following manners:

The initial AMF generates the new Kamf based on the current Kamf and the uplink NAS COUNT value in the received registration request RR.

The initial AMF generates the new Kamf based on the current Kamf and the uplink NAS COUNT value in the received NAS Security Mode Complete message.

The initial AMF generates the new Kamf based on the current Kamf and an uplink NAS COUNT value in a recently received N1 message. Specifically, the N1 message includes the registration request RR and/or the NAS Security Mode Complete message. To be specific, if the initial AMF receives the NAS Security Mode Complete message sent by the UE, the NAS Security Mode Complete message is the recently received N1 message, and the initial AMF generates the new Kamf based on the current Kamf and the uplink NAS COUNT value in the received NAS Security Mode Complete message. Otherwise, the registration request RR is the recently received N1 message, and the initial AMF generates the new Kamf based on the current Kamf and the uplink NAS COUNT value in the received registration request RR.

The initial AMF generates the new Kamf based on the current Kamf and the current downlink NAS COUNT value.

If no new NAS security context is activated/used/generated/established between the initial AMF and the UE, the initial AMF generates the new Kamf based on the current Kamf and the uplink NAS COUNT value in the received registration request RR. Otherwise, the initial AMF generates the new Kamf based on the current Kamf and the current downlink NAS COUNT value.

If the initial AMF receives only one NAS message, and the NAS message is the registration request RR, the initial AMF generates the new Kamf based on the current Kamf and the uplink NAS COUNT value in the received registration request RR. Otherwise, the initial AMF generates the new Kamf based on the current Kamf and the current downlink NAS COUNT value.

If no NAS security mode command/control procedure is performed between the initial AMF and the UE, the initial AMF generates the new Kamf based on the current Kamf and the uplink NAS COUNT value in the received registration request RR. Otherwise, the initial AMF generates the new Kamf based on the current Kamf and the current downlink NAS COUNT value.

If the NAS message received by the initial AMF includes only the registration request RR message, the initial AMF generates the new Kamf based on the current Kamf and the uplink NAS COUNT value in the received registration request RR. Otherwise, the initial AMF generates the new Kamf based on the current Kamf and the current downlink NAS COUNT value.

If the initial AMF receives other NAS messages in addition to the registration request RR, the initial AMF generates the new Kamf based on the current Kamf and the current downlink NAS COUNT value. Otherwise, the initial AMF generates the new Kamf based on the current Kamf and the uplink NAS COUNT value in the received registration request RR. The other NAS messages include the NAS Security Mode Complete message.

In a possible implementation, the initial AMF sends the generated new Kamf to the target AMF, and the initial AMF sends, to the target AMF, an indicator 2 used to indicate that the new Kamf is generated, or an indication used to indicate that horizontal Kamf derivation is performed. The initial AMF further sends, to the target AMF, an indication used to indicate that AS key re-keying needs to be performed. Specifically, the initial AMF includes the indication indicator 2 used to indicate that the new Kamf is generated and the indication used to indicate that AS key re-keying needs to be performed in Namf_Communication_N1MessageNotify.

In a possible implementation, if the initial AMF generates the new Kamf by using the current downlink NAS COUNT, the initial AMF sends the downlink NAS COUNT value to the target AMF. Specifically, the initial AMF includes the downlink NAS COUNT value used to generate the new Kamf in the Namf_Communication_N1MessageNotify.

In a possible implementation, the initial AMF sends, to the target AMF, the uplink NAS COUNT value used to generate the new Kamf. Alternatively, if the initial AMF uses the uplink NAS COUNT in the registration request when generating the new Kamf, the initial AMF sends, to the target AMF, an indication indicator 3 used to indicate to "generate the new Kamf by using the uplink NAS COUNT value in the registration request message". Alternatively, if the initial AMF uses the uplink NAS COUNT in the NAS Security Mode Complete message when generating the new Kamf, the initial AMF sends, to the target AMF, an indication indicator 4 used to indicate to "generate the new Kamf by using the uplink NAS COUNT value in the NAS Security Mode Complete message".

In a possible implementation, the initial AMF sends an indication indicator X to the target AMF, where the indication indicator X is used to indicate that "the registration request message is from the verified UE", "verification on the UE succeeds", "verification on the registration message succeeds", "the UE does not need to be verified", or "the registration message does not need to be verified". Specifically, the initial AMF optionally sends the Namf_Communication_N1MessageNotify message including the indicator X to the target AMF.

Optionally, if the new NAS security context is established between the initial AMF and the UE, the initial AMF sends the indicator X to the target AMF.

In a possible implementation, the target AMF receives the Kamf, and the target AMF determines whether to use the received Kamf according to the local policy. If the target AMF determines to use the received Kamf, and if the target AMF receives the indication used to indicate that the new Kamf is generated, or the indication used to indicate that horizontal Kamf derivation needs to be performed, the target AMF sends an indication used to indicate that the UE performs horizontal Kamf derivation to the UE. Specifically, the target AMF sets K_AMF_change_flag (the indication used to indicate that the UE performs horizontal Kamf derivation) to 1, and send the K_AMF_change_flag to the UE.

Optionally, if the target AMF determines not to use the received newly generated Kamf, the target AMF initiates re-authentication to re-establish a new NAS security context with the UE.

In a possible implementation, that the target AMF further sends, to the UE, information about a value used to generate the new Kamf specifically includes one of the following cases:

If the target AMF receives a downlink NAS COUNT value, the target AMF sends the downlink NAS COUNT value to the UE. Specifically, the target AMF includes the downlink NAS COUNT value in NAS Container.

Alternatively, if the target AMF receives an uplink NAS COUNT value, the target AMF sends the uplink NAS COUNT value to the UE. Specifically, the target AMF includes the uplink NAS COUNT value in an NAS Security Mode Command message.

Alternatively, if the target AMF receives the indicator 3, the target AMF sends, to the UE, an indication indicator 5 used to indicate to "generate the new Kamf by using the uplink NAS COUNT value in the registration request message". Specifically, the target AMF sends an NAS Security Mode Command message including the indicator 5 to the UE.

Alternatively, if the target AMF receives the indicator 4, the target AMF sends, to the UE, an indication indicator 6 used to indicate to "generate the new Kamf by using the uplink NAS COUNT value in the NAS security mode complete message". Specifically, the target AMF sends an NAS Security Mode Command message including the indicator 6 to the UE.

In a possible implementation, if the target AMF receives the indicator X, the target AMF does not verify the received registration request RR, or the target AMF does not verify the UE.

In a possible implementation, the UE receives the indication used to indicate that the UE performs horizontal Kamf derivation, and the UE performs horizontal Kamf derivation to generate a new Kamf.

Specifically, when receiving the K_AMF_change_flag whose value is 1, the UE determines that information used to indicate that the UE performs horizontal Kamf derivation is received.

In a possible implementation, that the UE performs horizontal Kamf derivation based on the information about the value used to generate the new Kamf, to generate the new Kamf specifically includes one of the following cases:

If the UE receives a downlink NAS COUNT value, the UE generates the new Kamf by using the downlink NAS COUNT value.

Alternatively, if the UE receives an uplink NAS COUNT value, the UE generates the new Kamf by using the uplink NAS COUNT value.

Alternatively, if the UE receives the indicator 4, the UE generates the new Kamf by using the uplink NAS COUNT value in the registration request message.

Alternatively, if the UE receives the indicator 5, the UE generates the new Kamf by using the uplink NAS COUNT value in the NAS Security Mode Complete.

Otherwise, the UE generates the new Kamf by using the uplink NAS COUNT value in the recently sent N1 message. Specifically, if the UE recently sends the NAS Security Command message, the UE generates the new Kamf by using the uplink NAS COUNT value in the NAS Security Command message. Otherwise, the UE uses the uplink NAS COUNT value in the sent registration request message.

According to an eighth aspect, a registration apparatus is provided. The apparatus provided in this application specifically implements a function of behavior of the AMF or the UE in the aspects of the foregoing methods, and includes a corresponding means configured to perform the steps or the functions described in the aspects of the foregoing methods. The steps or functions may be implemented by using software, hardware (for example, a circuit), or a combination of hardware and software.

In a possible design, the apparatus includes one or more processors and a communication unit. The one or more processors are configured to support the apparatus to perform the corresponding function of the AMF or the UE in the foregoing methods.

Optionally, the apparatus may further include one or more memories. The memory is configured to couple to the processor, and the memory stores program instructions and/or data necessary for the apparatus. The one or more memories may be integrated with the processor, or may be disposed independent of the processor. This is not limited in this application.

In another possible design, the apparatus includes a transceiver, a processor, and a memory. The processor is configured to control the transceiver or an input/output circuit to send and receive signals, the memory is configured to store a computer program, and the processor is configured to run the computer program in the memory, to enable the apparatus to perform the method completed by the AMF or the UE in any one of the first aspect, the second aspect, the third aspect, the fourth aspect, the fifth aspect, the sixth aspect, or the seventh aspect, or the possible implementations of the first aspect, the second aspect, the third aspect, the fourth aspect, the fifth aspect, the sixth aspect, or the seventh aspect.

In a possible design, the apparatus includes one or more processors and a communication unit. The one or more processors are configured to support the apparatus to perform the corresponding function of the AMF or the UE in the foregoing methods.

Optionally, the apparatus may further include one or more memories. The memory is configured to couple to the processor, and the memory stores program instructions and/or data necessary for the AMF or the UE. The one or more memories may be integrated with the processor, or may be disposed independent of the processor. This is not limited in this application.

The apparatus may be located in the AMF or the UE, or may be the AMF or the UE.

In another possible design, the apparatus includes a transceiver, a processor, and a memory. The processor is configured to control the transceiver or an input/output circuit to send and receive signals, the memory is configured to store a computer program, and the processor is configured to run the computer program in the memory, to enable the apparatus to perform the method completed by the AMF or the UE in any one of the first aspect, the second aspect, the third aspect, the fourth aspect, the fifth aspect, the sixth aspect, or the seventh aspect, or the possible implementations of the first aspect, the second aspect, the third aspect, the fourth aspect, the fifth aspect, the sixth aspect, or the seventh aspect.

According to a ninth aspect, a computer-readable storage medium is provided, configured to store a computer program. The computer program includes instructions used to perform the method in any one of the first aspect, the second aspect, the third aspect, the fourth aspect, the fifth aspect, the sixth aspect, or the seventh aspect, or the possible implementations of the first aspect, the second aspect, the third aspect, the fourth aspect, the fifth aspect, the sixth aspect, or the seventh aspect.

According to a tenth aspect, a computer program product is provided. The computer program product includes computer program code, and when the computer program code is run on a computer, the computer is enabled to perform the method in any one of the first aspect, the second aspect, the third aspect, the fourth aspect, the fifth aspect, the sixth aspect, or the seventh aspect, or the possible implementations of the first aspect, the second aspect, the third aspect, the fourth aspect, the fifth aspect, the sixth aspect, or the seventh aspect.

BRIEF DESCRIPTION OF DRAWINGS

FIG. 1A and FIG. 1B are example schematic diagrams of a registration procedure of UE in a 5G system;

FIG. 8A and FIG. 8B are example schematic diagrams of a registration procedure to which an embodiment of this application is applicable;

FIG. 9A and FIG. 9B are example schematic diagrams of a registration procedure to which an embodiment of this application is applicable;

FIG. 10A and FIG. 10B are example schematic diagrams of a registration procedure to which an embodiment of this application is applicable;

DESCRIPTION OF EMBODIMENTS

Figure 1B:
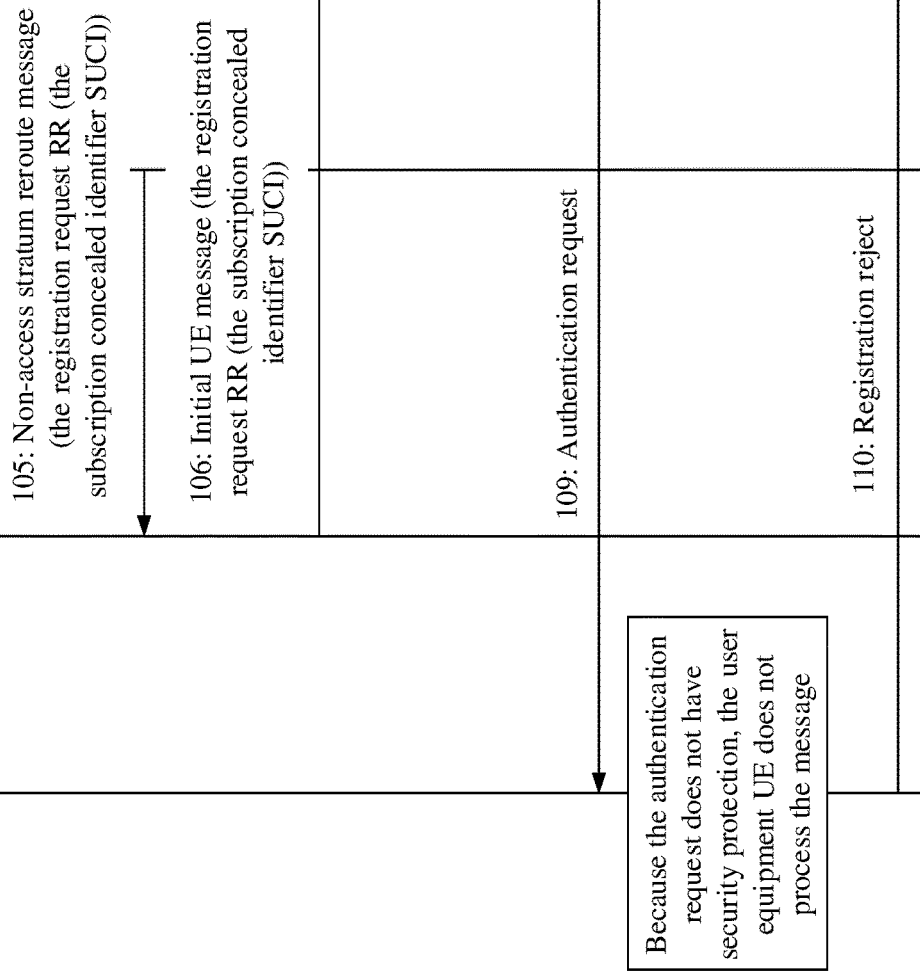

The following further describes the present technology in detail with reference to accompanying drawings.

Technical solutions in embodiments of this application may be applied to various communication systems, for example, a 4th generation (4G) system including a long term evolution (LTE) system and a worldwide interoperability for microwave access (WiMAX) communication system, a future 5th generation (5G) system such as a new radio access (NR) system, and a future communication system such as a 6G system. As long as one entity in the communication system needs to send a signal and another entity needs to receive the signal, the entity may be understood as a communication device in the communication system.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may alternatively be used.

In addition, the term "for example" in the embodiments of this application is used to represent giving an example, an illustration, or a description. Any embodiment or design scheme described as an "example" in this application should not be explained as being more preferred or having more advantages than another embodiment or design scheme. Specifically, the term "example" is used to present a concept in a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

The following describes some terms in the embodiments of this application, to facilitate understanding of a person skilled in the art.

(1) An AMF is a core access and mobility management function network element, is configured to manage access and mobility of UE, and specifically includes functions such as UE registration, UE mobility management, NAS connection, access authentication and authorization, and providing transmission for the UE and an session management function (SMF).

(2) The UE is user equipment, including a universal subscriber identity module (USIM) card and mobile equipment (ME), sends or receives an NAS message and a radio resource control (RRC) request message, and establishes a user-plane tunnel with a base station.

The term "and/or" in this application describes an association relationship for describing associated objects and represents that at least three relationships may exist. For example, A and/or B may represent the following three cases: Only A exists, both A and B exist, and only B exists. The character "/" generally indicates an "or" relationship between the associated objects.

"A plurality of" in this application can mean two or more.

In addition, it should be understood that in the descriptions of this application, terms such as "first" and "second" are merely used for distinguishing and description, but should not be understood as indicating or implying relative importance, or should not be understood as indicating or implying a sequence.

For ease of understanding of the embodiments of this application, an application scenario used in this application is first described.

The standard 3GPP TS 23.502 [1] defines a procedure in which AMF reallocation occurs in a registration process of UE in the 5G system. A schematic diagram of a registration procedure shown in FIG. 1A and FIG. 1B is used as an example to describe in detail an application scenario in a registration process of this application. The registration process includes the following steps.

Step 101: During initial registration, UE initiates a registration request (RR for short) that carries an SUCI.

In this step, the UE does not have an NAS security context. As defined in the standard 33.501 [2], the registration request initiated by the UE in this step carries only cleartext information elements (e.g., cleartext IEs) and does not include Requested S-NSSAIs.

An AMF may determine, based on the Requested S-NSSAIs, whether the AMF can serve the UE.

The Requested S-NSSAIs indicate requested single network slice selection assistance information (S-NSSAI). Allowed NSSAIs are allowed NSSAIs, and indicate that which S-NSSAIs in NSSAIs requested by the UE are allowed by a network. The network sends a registration accept message or configuration update command that carries an Allowed NSSAI IE to the UE.

In this step, the UE may send the registration request to a (R)AN. After receiving the registration request from the UE, the (R)AN selects to send the registration request to an initial AMF.

Step 102: After receiving the registration request that carries the SUCI, the initial AMF initiates primary authentication.

In this step, the initial AMF and the UE each generate an AMF key that is denoted as Kamf, a next generation key set identifier ngKSI corresponding to the AMF key, and the like.

Step 103: The initial AMF initiates an NAS security mode command (NAS SMC), and activates and starts to use the Kamf generated during the primary authentication. The initial AMF includes a request complete initial NAS message flag in the NAS SMC.

The UE returns an NAS security mode complete message, and activates and starts to use the Kamf generated during the primary authentication. The NAS security mode complete message includes a complete initial NAS message, namely, a complete registration request message. The complete registration request message includes the Requested S-NSSAIs.

An NAS security context is established between the initial AMF and the UE, including the Kamf generated during the primary authentication, the corresponding ngKSI, an uplink NAS Count, a downlink NAS Count, and the like.

Step 104: The initial AMF determines, based on the Requested S-NSSAIs, whether the initial AMF can serve the UE. If the initial AMF determines that the initial AMF cannot serve the UE, the initial AMF determines to perform NAS reroute (AMF reallocation).

In this step, the initial AMF determines to perform AMF reallocation to a target AMF, where the target AMF is an AMF that can serve the UE. Specifically, the initial AMF may obtain information about the target AMF from a network slice selection function (NS SF) network element.

The UE is not aware of a process of AMF reallocation.

Step 105: The initial AMF sends the received registration request to the (R)AN.

In this step, the initial AMF sends the registration request that carries the SUCI and that is received in step 102.

Specifically, the initial AMF sends a non-access stratum reroute message (Reroute NAS Message) carrying the registration request message that carries the SUCI to the (R)AN.

Step 106: The (R)AN sends the received registration request to the target AMF.

Specifically, the (R)AN sends an initial UE message carrying the registration request message that carries the SUCI to the target AMF.

Step 107: The target AMF determines to initiate primary authentication.

In this step, after receiving the registration request, the target AMF initiates the primary authentication based on the SUCI in the registration request.

Step 108: The target AMF sends a user authentication request (Nausf_UEAuthentication_Authenticate Request) to an authentication server function (AUSF) network element, and the AUSF returns a user authentication response (Nausf_UEAuthentication_Authenticate Response).

Step 109: The target AMF sends an authentication request to the UE.

In this step, because the target AMF does not have an NAS security context, the authentication request sent by the target AMF to the UE is an authentication request message without security protection.

The authentication request message without security protection is a type of NAS message.

The UE discards (e.g., reject) the authentication request message without security protection.

Step 110: The target AMF sends a registration reject message.

In the foregoing step 102 and step 103, an NAS SMC procedure has been performed between the UE and the initial AMF, and the UE has established and started to use the NAS security context. As defined in the standard 24.501, after the UE establishes and starts to use the NAS security context, if a received NAS message does not have security protection, the UE does not process the NAS message. Therefore, the UE does not process the authentication request message without security protection. As a result, registration fails and the UE cannot access the network.

Based on the foregoing descriptions of the registration procedure in the conventional technology, the NAS security context is established and activated between the initial AMF and the UE, the initial AMF initiates AMF reallocation to the target AMF, and the target AMF initiates the primary authentication, and sends the authentication request without security protection to the UE. However, the UE has activated the NAS security context and is not aware of AMF reallocation. Therefore, the UE does not process the received authentication request without security protection. As a result, the UE fails to register when AMF reallocation occurs in an initial registration process. In view of this, to prevent the UE from failing to register when AMF reallocation occurs in the initial registration process, this application provides a registration method to prevent the UE from discarding a received authentication request sent by a target AMF.

Specifically, in a registration process of the UE, an initial AMF determines to initiate AMF reallocation to the target AMF, and the initial AMF sends indication information to the UE, to indicate the UE to delete an established NAS security context, to indicate the UE to deactivate a current NAS security context, to indicate the UE that AMF reallocation occurs on a network side, and/or to indicate the UE to process an authentication request message without security protection. The UE processes the received authentication request message sent by the target AMF, and returns an authentication response message, to ensure that initial registration of the UE succeeds. Alternatively, the initial AMF sends an NAS security context established between the initial AMF and the UE to the target AMF, and the target AMF performs security protection on a to-be-sent authentication request message by using the NAS security context, and then sends the security-protected authentication request message to the UE. The UE determines that the received authentication request message is a security-protected authentication request message, processes the authentication request message, and returns an authentication response message, to ensure that initial registration of the UE succeeds. Alternatively, the UE directly processes the received authentication request message sent by the target AMF, and returns an authentication response message, to ensure that initial registration of the UE succeeds. Alternatively, the initial AMF sends, to the target AMF via a RAN, indication information used to indicate the UE to delete an NAS security context, indication information used to indicate the UE to deactivate a current NAS security context, indication information used to indicate the UE that AMF reallocation occurs on a network side, or indication information used to indicate the UE to process authentication request information without security protection. The target AMF sends, to the UE based on the indication information, the authentication request message including the indication information used to indicate the UE to delete the NAS security context, the indication information used to indicate the UE to deactivate the current NAS security context, the indication information used to indicate the UE that AMF reallocation occurs on the network side, or the indication information used to indicate the UE to process the authentication request information without security protection. Alternatively, the initial AMF sends a complete registration request message to the target AMF via a RAN, and the target AMF sends, to the UE based on the complete registration request message, the authentication request message including indication information used to indicate the UE to delete an NAS security context, indication information used to indicate the UE to deactivate a current NAS security context, indication information used to indicate the UE that AMF reallocation occurs on a network side, or indication information used to indicate the UE to process authentication request information without security protection.

The following embodiments describe in detail a specific process of UE registration.

Embodiment 1

Figure 2:
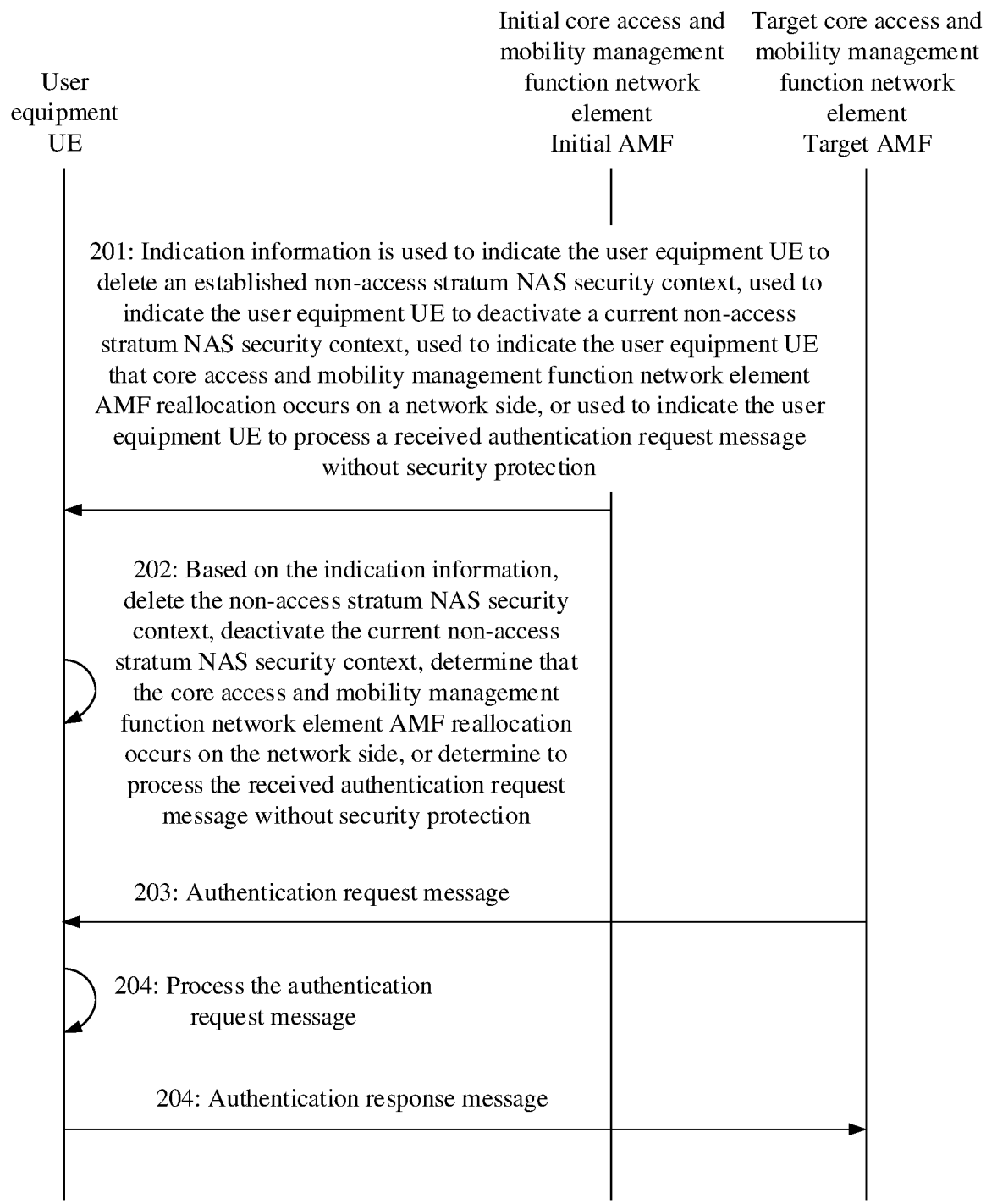
FIG. 2 is an example schematic diagram of a registration method to which an embodiment of this application is applicable.

First, refer to a registration process shown in FIG. 2. In the process, an initial AMF mainly sends indication information to UE, to indicate the UE to delete an established NAS security context, to indicate the UE to deactivate a current NAS security context, to indicate the UE that AMF reallocation occurs on a network side, or to indicate the UE to process a received authentication request message without security protection. The UE deletes the NAS security context based on the indication information, and processes a received authentication request message sent by a target AMF. Alternatively, the UE deactivates the current NAS security context based on the indication information, and processes a received authentication request message sent by a target AMF. Alternatively, the UE processes, based on the indication information, a received authentication request message sent by a target AMF. The process includes the following steps.

Step 201: When determining to perform AMF reallocation, the initial AMF sends the indication information to the UE, used to indicate the UE to delete or discard the NAS security context, used to indicate the UE to deactivate the current NAS security context of the UE, used to indicate the UE to process the authentication request message without security protection, used to indicate the UE that AMF reallocation occurs on the network side, used to indicate the UE to restore a state in which there is no NAS security context, used to indicate the UE to delete or discard a new NAS security context established between the UE and the initial AMF, used to indicate the UE to delete or discard an NAS security context established between the UE and the initial AMF, used to indicate the UE to delete or discard the new NAS security context, used to indicate the UE to deactivate a current NAS security context established between the UE and the initial AMF, and/or used to indicate the UE to use a stored NAS security context if there is the stored NAS security context.

The initial AMF receives a complete registration request message sent by the UE, and determines, based on Requested S-NSSAIs carried in the complete registration request message, whether the initial AMF can serve the UE. If the initial AMF determines that the initial AMF cannot provide the service for the UE, the initial AMF determines to perform AMF reallocation. When the initial AMF determines to perform AMF reallocation, the initial AMF sends the indication information to the UE, where the indication information is used to indicate the UE to delete the NAS security context, to indicate the UE to deactivate the current NAS security context, to indicate the UE that AMF reallocation occurs on the network side, or to indicate the UE to process the received authentication request message without security protection.

Specifically, after the initial AMF determines to perform AMF reallocation via a (R)AN, and before the initial AMF sends a non-access stratum reroute message to the (R)AN, the initial AMF sends the indication information to the UE.

That the initial AMF sends the indication information to the UE may include two options.

Option 1:

The initial AMF may send a first notification message to the UE, where the first notification message is used to indicate the UE to delete or discard the NAS security context, used to indicate the UE to deactivate the current NAS security context of the UE, used to indicate the UE to process the authentication request message without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, and/or used to indicate the UE to use the stored NAS security context if there is the stored NAS security context. The first notification message may be a newly added notification message, for example, a newly added NAS message. The newly added NAS message may be named AMF Reallocation Notification.

Option 2:

The initial AMF may send a first NAS message to the UE, where the first NAS message carries first indication information. The first indication information is used to indicate the UE to delete or discard the NAS security context, used to indicate the UE to deactivate the current NAS security context of the UE, used to indicate the UE to process the authentication request message without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, and/or used to indicate the UE to use the stored NAS security context if there is the stored NAS security context. The first indication information may be newly added indication information. For example, the first indication information may be named AMF_Reallocation_Ind.

For example, the first NAS message may be an existing NAS message, for example, including but not limited to the following NAS messages: a configuration update command, a downlink NAS transport (DL NAS Transport) message, a 5G system mobility management status (5GMM Status), a registration reject message, and the like.

Optionally, the indication information sent by the initial AMF to the UE may further carry a next generation key set identifier (ngKSI). The ngKSI is used to indicate the UE to delete the NAS security context corresponding to the ngKSI, or used to indicate the UE to deactivate the NAS security context corresponding to the ngKSI. The ngKSI is an ngKSI in the NAS security context established between the UE and the initial AMF.

Specifically, the first notification message or the first NAS message carries the ngKSI. Optionally, if the first NAS message carries the ngKSI, the ngKSI may be directly carried in the first NAS message, or the ngKSI may be carried in the first indication information of the first NAS message.

Step 202: The UE receives the indication information sent by the initial AMF; and discards or deletes the NAS security context based on the indication information, deactivates the current NAS security context of the UE based on the indication information, determines not to discard and processes the received authentication request message without security protection based on the indication information, determines, based on the indication information, that AMF reallocation occurs on the network side, restores the state in which there is no NAS security context based on the indication information, deletes or discards, based on the indication information, the new NAS security context established between the UE and the initial AMF, deletes or discards, based on the indication information, the NAS security context established between the UE and the initial AMF, deletes or discards the new NAS security context based on the indication information, deactivates, based on the indication information, the current NAS security context established between the UE and the initial AMF, and/or uses the stored NAS security context based on the indication information if there is the stored NAS security context.

Corresponding to a fact that the initial AMF sends the indication information, if the initial AMF sends the first notification message to the UE, the UE receives the first notification message sent by the initial AMF.

Alternatively, if the initial AMF sends the first NAS message that carries the first indication information to the UE, the UE receives the first NAS message sent by the initial AMF, where the first NAS message carries the first indication information.

Based on the received indication information, the UE discards or deletes the NAS security context, deactivates the current NAS security context of the UE, determines not to discard and processes the received authentication request message without security protection, determines that AMF reallocation occurs on the network side, restores the state in which there is no NAS security context, deletes or discards the new NAS security context established between the UE and the initial AMF, deletes or discards the NAS security context established between the UE and the initial AMF, deletes or discards the new NAS security context, deactivates the current NAS security context established between the UE and the initial AMF, and/or uses the stored NAS security context if there is the stored NAS security context.

For example, if the UE deletes the NAS security context based on the received indication, the UE deletes the NAS security context based on the received first notification message, or the UE deletes the NAS security context based on the first indication information carried in the first NAS message.

For example, if the UE deactivates the current NAS security context based on the received indication, the UE deactivates the NAS security context based on the received first notification message, or the UE deactivates the NAS security context based on the first indication information carried in the first NAS message.

For example, if the UE determines, based on the received indication, that AMF reallocation occurs on the network side, the UE determines, based on the received first notification message, that AMF reallocation occurs on the network side, or the UE determines, based on the first indication information carried in the first NAS message, that AMF reallocation occurs on the network side.

For example, if the UE determines, based on the received indication, to process the received authentication request message without security protection, the UE determines, based on the received first notification message, to process the received authentication request message without security protection, or the UE determines, based on the first indication information carried in the first NAS message, to process the received authentication request message without security protection.

Optionally, the indication information received by the UE may further carry the ngKSI, and the ngKSI is used to indicate the UE to delete the NAS security context corresponding to the ngKSI, or to deactivate the NAS security context corresponding to the ngKSI. When deleting the NAS security context, the UE deletes the NAS security context corresponding to the ngKSI based on the ngKSI. When deactivating the NAS security context, the UE deactivates the NAS security context corresponding to the ngKSI based on the ngKSI.

Specifically, the first notification message or the first NAS message optionally carries the ngKSI. The UE deletes, based on the ngKSI carried in the received first notification message or the received first NAS message, the NAS security context corresponding to the ngKSI; or deactivates, based on the ngKSI carried in the received first notification message or the received first NAS message, the NAS security context corresponding to the ngKSI.

Step 203: The target AMF sends an authentication request message to the UE.

The initial AMF sends a registration request message that includes an SUCI to a (R)AN, and the (R)AN sends the registration request message to the target AMF.

The target AMF initiates a primary authentication based on the SUCI in the registration request message. The target AMF sends the authentication request message without security protection to the UE.

Step 204: The UE receives the authentication request message sent by the target AMF, processes the authentication request message, and sends an authentication response message to the target AMF.

The authentication request message sent by the target AMF does not have security protection.

If the UE deletes the NAS security context or deactivates the current NAS security context based on the indication information sent by the initial AMF, the UE does not have the NAS security context, and the UE processes the authentication request message.

If the UE determines, based on the indication information sent by the initial AMF, to process the authentication request message without security protection, the UE processes the authentication request message.

The UE sends the authentication response without security protection to the target AMF.

Figure 3:
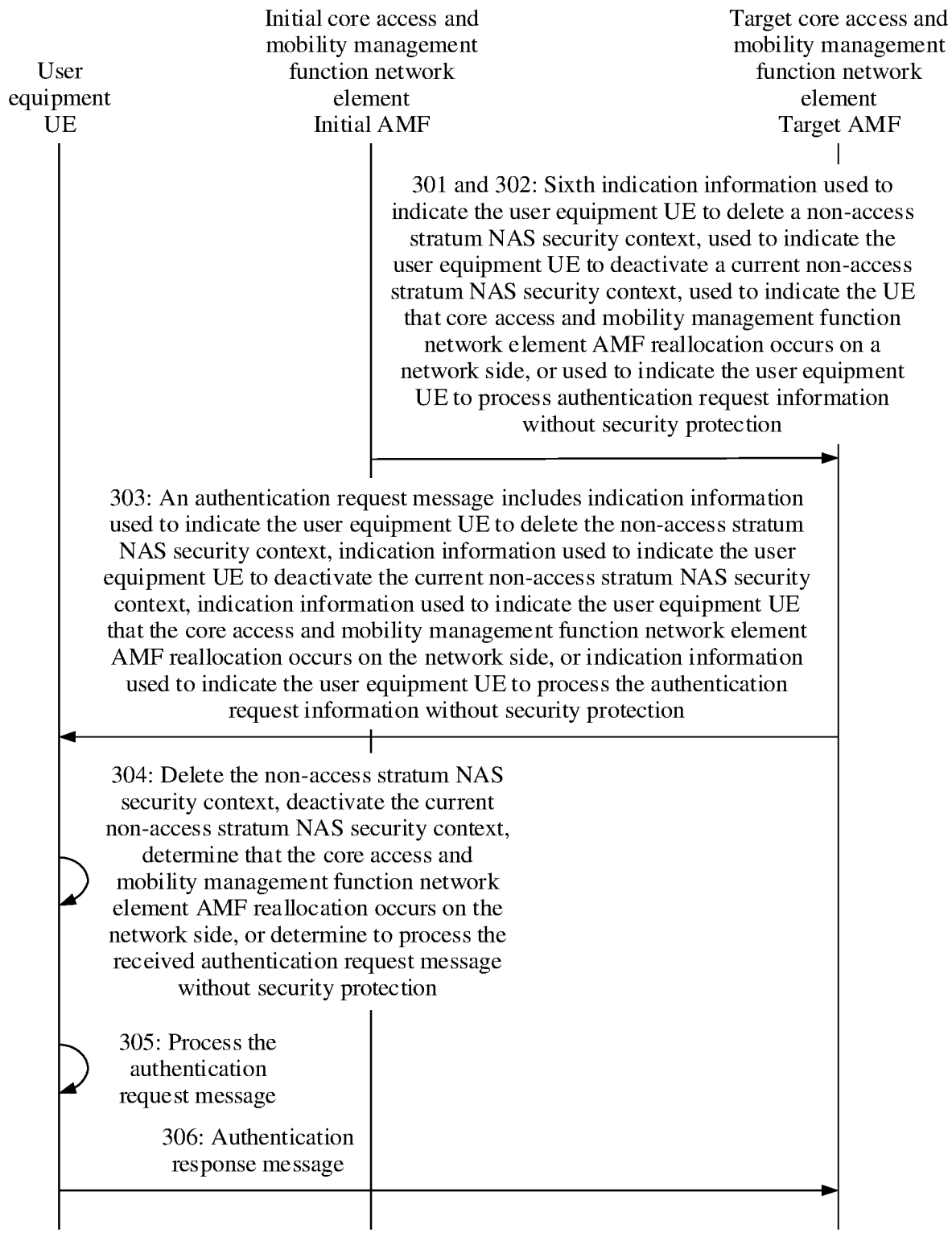
FIG. 3 is an example schematic diagram of a registration method to which an embodiment of this application is applicable.

The target AMF may send indication information to the UE, to indicate the UE to delete the established NAS security context, to indicate the UE to deactivate the current NAS security context, to indicate the UE that AMF reallocation occurs on the network side, or to indicate the UE to process the authentication request information without security protection. The UE deletes the NAS security context based on the indication information, and processes received authentication request information sent by the target AMF. Alternatively, the UE deactivates the current NAS security context based on the indication information, and processes the received authentication request information sent by the target AMF. Alternatively, the UE processes, based on the indication information, the received authentication request message sent by the target AMF. For details, refer to a registration procedure shown in FIG. 3. The process includes the following steps.

Step 301: An initial AMF sends sixth indication information to a target AMF. The sixth indication information is used to indicate UE to delete an NAS security context, used to indicate the UE to deactivate a current NAS security context, used to indicate the UE to process an authentication request message without security protection, used to indicate the UE that AMF reallocation occurs on a network side, used to indicate the UE to restore a state in which there is no NAS security context, used to indicate the UE to delete or discard a new NAS security context established between the UE and the initial AMF, used to indicate the UE to delete or discard an NAS security context established between the UE and the initial AMF, used to indicate the UE to delete or discard the new NAS security context, used to indicate the UE to deactivate a current NAS security context established between the UE and the initial AMF, used to notify the target AMF that AMF reallocation occurs, used to indicate the target AMF to send the indication to the UE, and/or used to indicate the UE to use a stored NAS security context if there is the stored NAS security context.

If the initial AMF determines that the initial AMF cannot serve the UE, the initial AMF determines to perform AMF reallocation. When performing AMF reallocation, the initial AMF sends the sixth indication information to the target AMF via a (R)AN.

Specifically, when sending the sixth indication information to the target AMF via the (R)AN, the initial AMF sends the sixth indication information to the (R)AN, and the (R)AN sends the sixth indication information to the target AMF.

That the initial AMF sends the sixth indication information to the target AMF may include Option 1:

The initial AMF sends a second notification message to the target AMF via the (R)AN.

For example, the initial AMF sends a Reroute NAS Message carrying the second notification message to the (R)AN. The (R)AN sends an Initial UE Message carrying the second notification message to the target AMF.

The second notification message carries second indication information, where the second indication information is used to indicate the UE to delete the NAS security context, used to indicate the UE to deactivate the current NAS security context, used to indicate the UE to process the authentication request message without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, used to notify the target AMF that AMF reallocation occurs, used to indicate the target AMF to send the indication to the UE, and/or used to indicate the UE to use the stored NAS security context if there is the stored NAS security context.

The second notification message further includes a registration request message that carries an SUCI.

The second indication information may be newly added indication information. For example, the second indication information may be named AMF_Reallocation_Ind1.

Optionally, the second notification message may further carry an ngKSI, where the ngKSI is used to indicate the UE to delete the NAS security context corresponding to the ngKSI, or indicate the UE to deactivate the NAS security context corresponding to the ngKSI.

That the initial AMF sends the sixth indication information to the target AMF may include Option 2:

The initial AMF sends a third notification message to the target AMF via the (R)AN.

For example, the initial AMF sends a Reroute NAS Message carrying the third notification message to the (R)AN. The (R)AN sends an Initial UE Message carrying the third notification message to the target AMF.

The third notification message carries fourth indication information, where the fourth indication information is used to indicate the UE to verify the fourth indication information; and after verification succeeds, delete the NAS security context, deactivate the current NAS security context, process the authentication request message without security protection, indicate the UE that AMF reallocation occurs on the network side, restore the state in which there is no NAS security context, delete or discard the new NAS security context established between the UE and the initial AMF, delete or discard the NAS security context established between the UE and the initial AMF, delete or discard the new NAS security context, and/or deactivate the current NAS security context established between the UE and the initial AMF. The fourth indication information may be further used to notify the target AMF that AMF reallocation occurs, used to indicate the target AMF to send the indication to the UE, and/or used to indicate the UE to use the stored NAS security context if there is the stored NAS security context.

The third notification message further includes a registration request message that carries an SUCI.

The fourth indication information may be generated by the initial AMF based on a key shared by the initial AMF and the UE. For example, the fourth indication information may be named Secret. For example, the Secret includes a first parameter and a message authentication code of the first parameter. The first parameter may be a random number, or may be one or more of a UL NAS Count in a registration message sent by the UE to the initial AMF, or a UL NAS Count in an NAS Security Complete sent by the UE to the initial AMF. The message authentication code of the first parameter is a message authentication code obtained by the initial AMF by calculating the first parameter based on the key shared by the initial AMF and the UE. The shared key may be one or more of a Kamf, a Kseaf, an NAS encryption key Knasenc, an NAS integrity protection key Knasint, and the like that are generated between the UE and the initial AMF through primary authentication.

When the first parameter is the UL NAS Count in the registration message sent by the UE to the initial AMF, the first parameter may not be carried in the third notification message.

Optionally, the third notification message may further carry an ngKSI, where the ngKSI is used to indicate the UE to delete the NAS security context corresponding to the ngKSI, or indicate the UE to deactivate the NAS security context corresponding to the ngKSI.

That the initial AMF sends the sixth indication information to the target AMF may include Option 3:

The initial AMF may send a complete registration request message to the target AMF via the (R)AN.

For example, the initial AMF sends a Reroute NAS Message carrying the complete registration request message to the (R)AN. The (R)AN sends an Initial UE Message carrying the complete registration request message to the target AMF.

Optionally, the initial AMF sends an ngKSI to the target AMF via the (R)AN, where the ngKSI is used to indicate the UE to delete the NAS security context corresponding to the ngKSI, or indicate the UE to deactivate the NAS security context corresponding to the ngKSI.

Step 302: The target AMF receives the sixth indication information.

Corresponding to the initial AMF, the target AMF receives the second notification message, where the second notification message carries the second indication information. The second indication information is used to indicate the UE to delete the NAS security context, used to indicate to deactivate the current NAS security context, used to determine that AMF reallocation occurs on the network side, or used to determine to process the received authentication request message without security protection. Alternatively, the target AMF receives the third notification message, where the third notification message carries the fourth indication information, to indicate the UE to verify the fourth indication information and delete the NAS security context, indicate the UE to verify the fourth indication information and deactivate the current NAS security context, indicate the UE to verify the fourth indication information and determine that AMF reallocation occurs on the network side, or indicate the UE to verify the fourth indication information and determine to process the received authentication request message without security protection. Alternatively, the target AMF receives the complete registration request message.

Step 303: The target AMF includes, based on the sixth indication information in an authentication request message sent to the UE, indication information used to indicate the UE to delete the NAS security context, indication information used to indicate the UE to deactivate the current NAS security context, indication information used to indicate the UE to process the authentication request message without security protection, indication information used to indicate the UE that AMF reallocation occurs on the network side, indication information used to indicate the UE to restore the state in which there is no NAS security context, indication information used to indicate the UE to delete or discard the new NAS security context established between the UE and the initial AMF, indication information used to indicate the UE to delete or discard the NAS security context established between the UE and the initial AMF, indication information used to indicate the UE to delete or discard the new NAS security context, indication information used to indicate the UE to deactivate the current NAS security context established between the UE and the initial AMF, or indication information used to indicate the UE to use the stored NAS security context if there is the stored NAS security context.

The target AMF initiates a primary authentication based on the received registration request that carries the SUCI.

If the target AMF receives the second notification message, where the second notification message carries the second indication information, the target AMF includes, based on the second indication information, third indication information in the authentication request sent to the UE. The third indication information is used to indicate the UE to delete the NAS security context, used to indicate the UE to deactivate the current NAS security context, used to indicate the UE to process the authentication request information without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, used to notify the target AMF that AMF reallocation occurs, used to indicate the target AMF to send the indication to the UE, and/or used to indicate the UE to use the stored NAS security context if there is the stored NAS security context.

The third indication information may be newly added indication information. For example, the third indication information may be named AMF_Reallocation_Ind2. The third indication information and the second indication information may be the same, or may be different.

If the target AMF receives the third notification message, where the third notification message carries the fourth indication information, the target AMF includes, based on the fourth indication information, the fourth indication information in the authentication request sent to the UE. The fourth indication information is used to indicate the UE to verify the fourth indication information; and after the verification succeeds, delete the NAS security context and process the authentication request message, deactivate the current NAS security context and process the authentication request message, process the authentication request message without security protection, restore the state in which there is no NAS security context and process the authentication request message, delete or discard the new NAS security context established between the UE and the initial AMF and process the authentication request message, delete or discard the NAS security context established between the UE and the initial AMF and process the authentication request message, delete or discard the new NAS security context and process the authentication request message, deactivate the current NAS security context established between the UE and the initial AMF and process the authentication request message, and/or use the stored NAS security context if there is the stored NAS security context and process the authentication request message.

If the target AMF receives the complete registration request message, the target AMF sends the authentication request message to the UE based on the complete registration request message, and includes fifth indication information in the authentication request message. The fifth indication information is used to indicate the UE to delete the NAS security context, used to indicate the UE to deactivate the current NAS security context, used to indicate the UE to process the authentication request information without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, and/or used to indicate the UE to use the stored NAS security context if there is the stored NAS security context.

If the second notification message or the third notification message received by the target AMF carries the ngKSI, or if the target AMF further receives the ngKSI when receiving the complete registration request message, the target AMF sends the authentication request message carrying the ngKSI to the UE. The ngKSI is used to indicate the UE to delete or deactivate the NAS security context corresponding to the ngKSI.

Step 304: The UE deletes the NAS security context based on the indication information included in the authentication request message, and processes the authentication request message; deactivates the current NAS security context based on the indication information included in the authentication request message, and processes the authentication request message; processes the authentication request message without security protection based on the indication information included in the authentication request message; restores the state in which there is no NAS security context based on the indication information included in the authentication request message, and processes the authentication request message; deletes or discards, based on the indication information included in the authentication request message, the new NAS security context established between the UE and the initial AMF, and processes the authentication request message; deletes or discards, based on the indication information included in the authentication request message, the NAS security context established between the UE and the initial AMF, and processes the authentication request message; deletes or discards the new NAS security context based on the indication information included in the authentication request message, and processes the authentication request message; deactivates, based on the indication information included in the authentication request message, the current NAS security context established between the UE and the initial AMF, and processes the authentication request message; and/or uses the stored NAS security context based on the indication information included in the authentication request message if there is the stored NAS security context, and processes the authentication request message.

The UE receives the authentication request message sent by the target AMF.

If the authentication request message sent by the target AMF and received by the UE carries the third indication information, based on the third indication information, the UE deletes the NAS security context, and processes the authentication request message; deactivates the current NAS security context, and processes the authentication request message; processes the authentication request message without security protection; restores the state in which there is no NAS security context, and processes the authentication request message; deletes or discards the new NAS security context established between the UE and the initial AMF, and processes the authentication request message; deletes or discards the NAS security context established between the UE and the initial AMF, and processes the authentication request message; deletes or discards the new NAS security context, and processes the authentication request message; deactivates the current NAS security context established between the UE and the initial AMF, and processes the authentication request message; and/or uses the stored NAS security context if there is the stored NAS security context, and processes the authentication request message.

If the authentication request message sent by the target AMF and received by the UE carries the fourth indication information, after the verification succeeds, the UE deletes the NAS security context and processes the authentication request message, deactivates the current NAS security context and processes the authentication request message, processes the authentication request message without security protection, restores the state in which there is no NAS security context and processes the authentication request message, deletes or discards the new NAS security context established between the UE and the initial AMF and processes the authentication request message, deletes or discards the NAS security context established between the UE and the initial AMF and processes the authentication request message, deletes or discards the new NAS security context and processes the authentication request message, deactivates the current NAS security context established between the UE and the initial AMF and processes the authentication request message, and/or uses the stored NAS security context if there is the stored NAS security context and processes the authentication request message.

For example, the UE generates a message authentication code by calculating the first parameter in the fourth indication information by using the key shared by the UE and the initial AMF. The UE determines whether the generated message authentication code is consistent with the message authentication code carried in the received fourth indication information. If the generated message authentication code is consistent with the message authentication code carried in the received fourth indication information, verification on the fourth indication information succeeds. If the generated message authentication code is inconsistent with the message authentication code carried in the received fourth indication information, verification on the fourth indication information fails, and the UE discards the received authentication request message.

If the authentication request message sent by the target AMF and received by the UE carries the fifth indication information, the UE deletes the NAS security context based on the fifth indication information, deactivates the current NAS security context based on the fifth indication information, processes the authentication request information without security protection based on the fifth indication information, determines, based on the fifth indication information, that AMF reallocation occurs on the network side, restores the state in which there is no NAS security context based on the fifth indication information, deletes or discards, based on the fifth indication information, the new NAS security context established between the UE and the initial AMF, deletes or discards, based on the fifth indication information, the NAS security context established between the UE and the initial AMF, deletes or discards the new NAS security context based on the fifth indication information, deactivates, based on the fifth indication information, the current NAS security context established between the UE and the initial AMF, and/or uses the stored NAS security context based on the fifth indication information if there is the stored NAS security context.

If the authentication request message received by the UE carries the ngKSI, when deleting the NAS security context, the UE deletes the NAS security context corresponding to the ngKSI based on the ngKSI.

Step 305: The UE processes the authentication request message, and sends an authentication response message without security protection to the target AMF.

Step 306: The target AMF receives the authentication response message.

The target AMF sends the sixth indication information to the UE, to resolve a problem that the registration procedure fails because the UE does not process the authentication request message sent by the target AMF because NAS security contexts stored in the target AMF and the UE are inconsistent.

Figure 4:
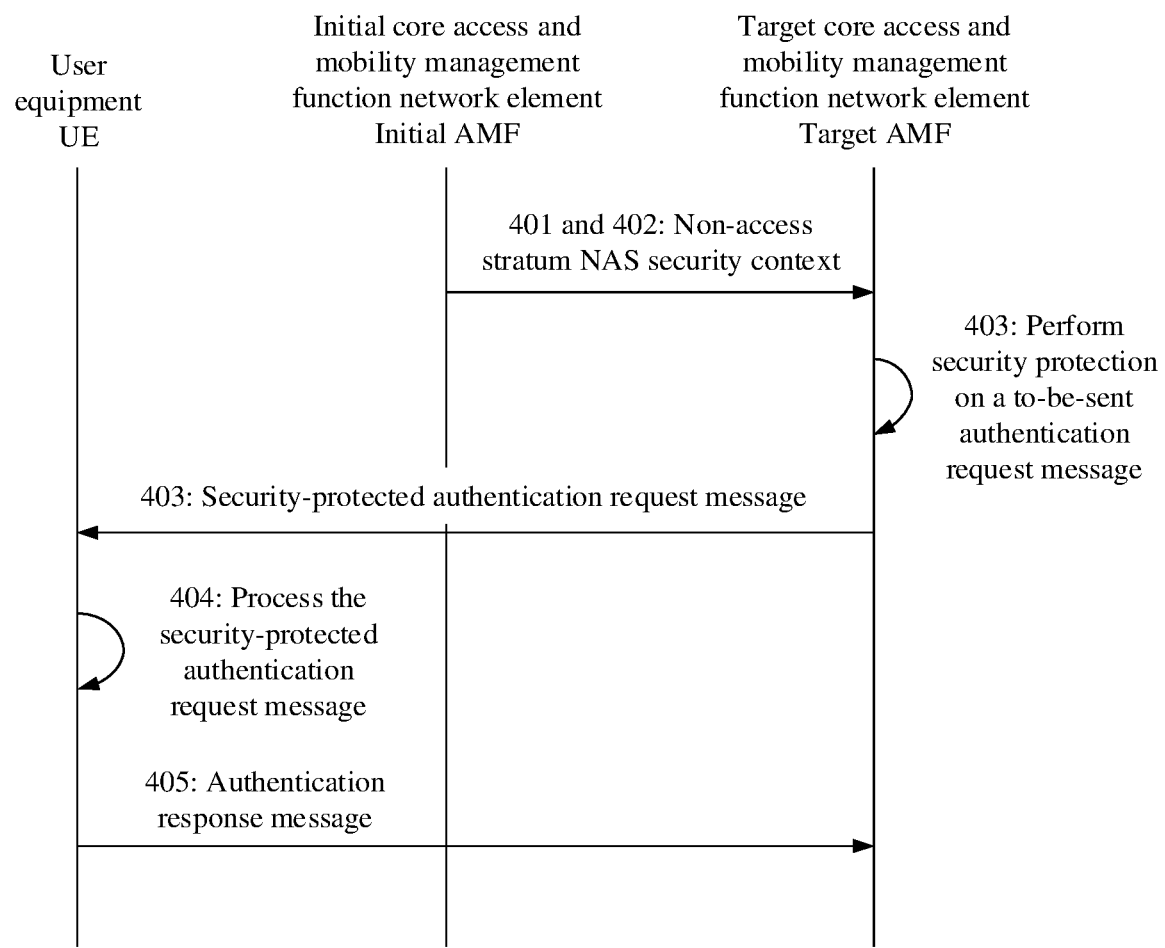
FIG. 4 is an example schematic diagram of a registration method to which an embodiment of this application is applicable.

The initial AMF may send the NAS security context established between the initial AMF and the UE to the target AMF. The target AMF uses the NAS security context as a current NAS security context. The target AMF performs security protection on the authentication request message, and sends the security-protected authentication request message to the UE. The UE processes the security-protected authentication request message. For details, refer to a registration process shown in FIG. 4. The process includes the following steps.

Step 401: An initial AMF determines to perform AMF reallocation, and sends an NAS security context established between the initial AMF and UE to a target AMF.

The initial AMF sends the NAS security context established between the initial AMF and the UE to the target AMF. The NAS security context may include NAS Counts; an NAS encryption key and an NAS integrity protection key, or a parameter used to generate an NAS encryption key and an NAS integrity protection key; a security algorithm selected by the initial AMF; and the like. For example, the initial AMF sends a Reroute NAS Message carrying the NAS security context to a (R)AN. The (R)AN sends an Initial UE Message carrying the NAS security context to the target AMF.

Step 402: The target AMF receives the NAS security context, and uses the NAS security context as a current NAS security context.

Step 403: The target AMF performs security protection on a to-be-sent authentication request message based on the NAS security context, and sends the security-protected authentication request message to the UE.

If the NAS security context received by the target AMF is the NAS encryption key and the NAS integrity protection key, the target AMF performs security protection on the to-be-sent authentication request message by using the keys and the security algorithm selected by the initial AMF.

If the NAS security context received by the target AMF is the parameter used to generate the NAS encryption key and the NAS integrity protection key, the target AMF generates the NAS encryption key and the NAS integrity protection key, and then performs security protection on the to-be-sent authentication request message by using the generated NAS encryption key, the generated NAS integrity protection key, and the security algorithm selected by the initial AMF.

Step 404: The UE receives the security-protected authentication request message, processes the security-protected authentication request message, and sends an authentication response message to the target AMF.

After receiving the security-protected authentication request message, the UE may process the security-protected authentication request message regardless of whether the UE is aware of AMF reallocation.

Step 405: The target AMF receives the authentication response message.

The initial AMF sends the NAS security context established between the initial AMF and the UE to the target AMF, and the target AMF may perform security protection on the authentication request message by using the NAS security context, to resolve a problem that the registration procedure fails because the UE discards or does not process the authentication request message sent by the target AMF because NAS security contexts stored in the target AMF and the UE are inconsistent.

Figure 5:
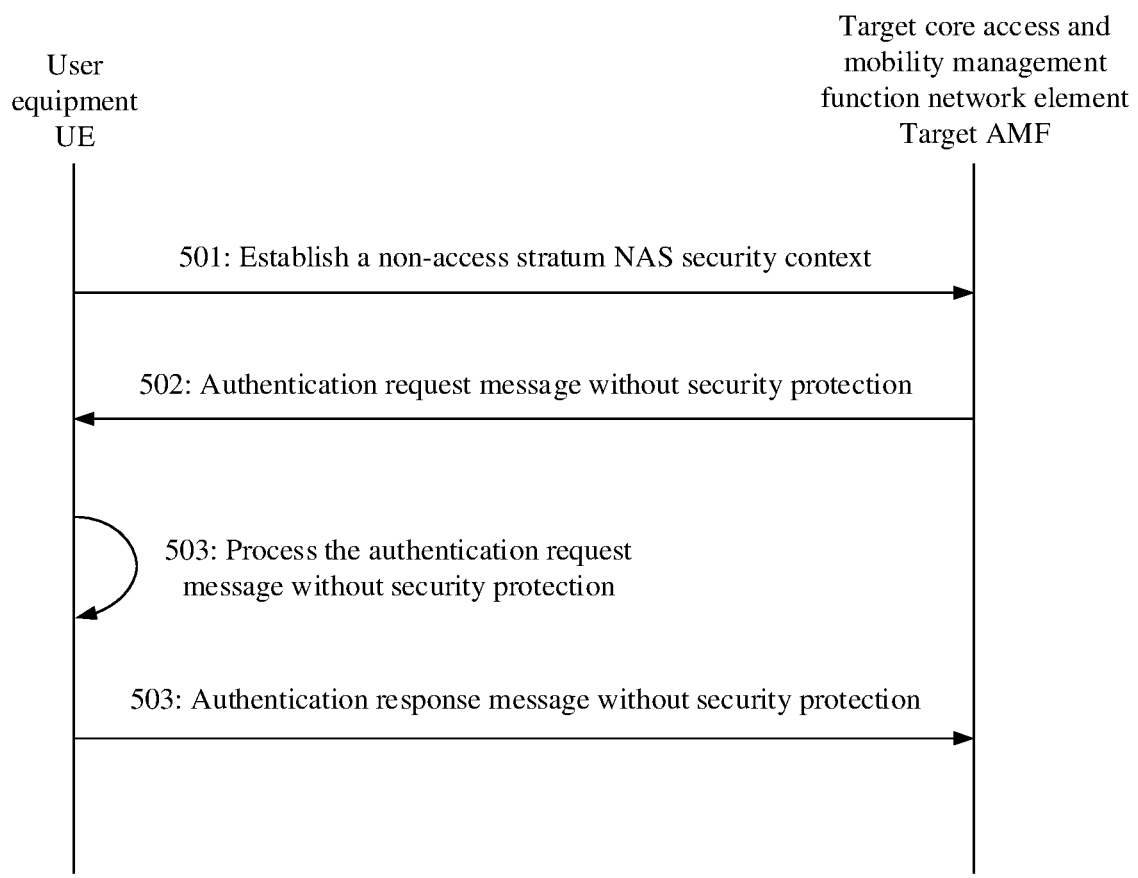
FIG. 5 is an example schematic diagram of a registration method to which an embodiment of this application is applicable.

Alternatively, the UE may directly store an authentication request message processing mechanism, and the UE can directly process an authentication request message without security protection without an indication of a network side. For details, refer to a registration process shown in FIG. 5. The process includes the following steps.

Step 501: UE establishes an NAS security context with a target AMF.

Step 502: The UE receives an authentication request message without security protection sent by a target AMF.

Step 503: The UE processes the authentication request message without security protection, and returns an authentication response message without security protection to the target AMF.

The following describes a registration process in Embodiment 1 of this application by using five specific embodiments.

Embodiment 1(1): An initial AMF notifies UE before performing AMF reallocation. Refer to a registration procedure shown in FIG. 6A and FIG. 6B. The registration process includes the following steps.

Step 601: The UE sends a registration request that carries an SUCI.

The RR includes only cleartext IEs and does not include Requested S-NSSAIs.

Step 602: The initial AMF initiates primary authentication.

The UE and the initial AMF each generate an AMF key that is denoted as Kamf, and a corresponding key identifier ngKSI.

An NAS security context includes the AMF key Kamf and the corresponding ngKSI.

Step 603: The initial AMF initiates a security mode command, namely, an NAS Security Mode Command (NAS SMC for short), and activates and starts to use the Kamf generated during the primary authentication. Alternatively, the initial AMF sends an NAS SMC that carries eighth indication information. The eighth indication information is used to indicate the UE to store a currently used NAS security context if there is the currently used NAS security context.

The UE stores the currently used NAS security context based on the NAS SMC or the carried eighth indication information if there is the NAS SMC or the carried eighth indication information.

The UE returns an NAS security mode complete message, namely, the NAS Security Mode Complete, and activates the Kamf and starts to use the Kamf.

In the NAS security mode complete message, the UE sends a complete registration request message including the Requested S-NSSAIs.

Step 604: The initial AMF determines, based on the Requested S-NSSAIs, whether the initial AMF can serve the UE. When the initial AMF determines that the initial AMF cannot serve the UE, the initial AMF determines to perform AMF reallocation, namely, the reroute NAS.

Step 605: The initial AMF sends indication information (for example, an AMF Reallocation Notification) to the UE, where the indication information is used to indicate the UE to delete or discard the NAS security context, used to indicate the UE to deactivate the current NAS security context of the UE, used to indicate the UE to process an authentication request message without security protection, used to indicate the UE that AMF reallocation occurs on a network side, used to indicate the UE to restore a state in which there is no NAS security context, used to indicate the UE to delete or discard a new NAS security context established between the UE and the initial AMF, used to indicate the UE to delete or discard an NAS security context established between the UE and the initial AMF, used to indicate the UE to delete or discard the new NAS security context, used to indicate the UE to deactivate the current NAS security context established between the UE and the initial AMF, and/or used to indicate the UE to use the stored NAS security context if there is the stored NAS security context.

Optionally, the indication message carries the key identifier ngKSI of the key Kamf generated during the primary authentication, and is used to indicate the UE to delete the NAS security context corresponding to the ngKSI.

In a possible implementation, that the initial AMF sends indication information includes:

The initial AMF sends a first notification message to the UE, where the first notification message is used to indicate the UE to delete the NAS security context, used to indicate the UE to deactivate the current NAS security context, used to indicate the UE to process the authentication request message without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, and/or used to indicate the UE to deactivate the current NAS security context established between the UE and the initial AMF. The first notification message is a newly added NAS message, or referred to as an AMF Reallocation Notification message. Optionally, AMF reallocation Notification message carries the key identifier ngKSI of the key Kamf generated during the primary authentication, and is used to indicate the UE to delete the NAS security context corresponding to the ngKSI.

In another possible implementation, that the initial AMF sends indication information includes:

The initial AMF sends a first NAS message to the UE, where the first NAS message carries first indication information. The first indication information is used to indicate the UE to delete the NAS security context, used to indicate the UE to deactivate the current NAS security context, used to indicate the UE to process the authentication request message without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, and/or used to indicate the UE to deactivate the current NAS security context established between the UE and the initial AMF. The first NAS message that carries the first indication information is not limited in this application. Possible options, the NAS message include a configuration update command message, a downlink NAS transport message, a 5G system mobility management status (5GMM Status), a registration reject message, and the like. Optionally, the first NAS message carries the key identifier ngKSI of the key Kamf generated during the primary authentication, and is used to indicate the UE to delete the NAS security context corresponding to the ngKSI.

After receiving the indication information, including the first notification message or the first NAS message that carries the first indication information, the UE discards or deletes the NAS security context, deactivates the current NAS security context of the UE, determines not to discard and processes the received authentication request message without security protection, determines that AMF reallocation occurs on the network side, restores the state in which there is no NAS security context, deletes or discards the new NAS security context established between the UE and the initial AMF, deletes or discards the NAS security context established between the UE and the initial AMF, deletes or discards the new NAS security context, and/or deactivates the current NAS security context established between the UE and the initial AMF. If the indication information received by the UE carries the ngKSI, the UE deletes the NAS security context corresponding to the ngKSI. Specifically, after the UE receives the first notification message (or referred to as AMF reallocation Notification message), if the first notification message (or referred to as AMF reallocation Notification message) carries the ngKSI, the UE deletes the NAS security context corresponding to the ngKSI. Alternatively, after the UE receives the first NAS message that carries the first indication information, if the first NAS message carries the ngKSI, the UE deletes the NAS security context corresponding to the ngKSI.

Step 606: The initial AMF performs NAS reroute, namely, AMF reallocation. The initial AMF sends a Reroute NAS Message carrying the registration request message that carries the SUCI to the (R)AN.

Step 607: The (R)AN sends an Initial UE Message carrying the registration request message that carries the SUCI to a target AMF.

Step 608: The target AMF initiates primary authentication and sends a Nausf_UEAuthentication_Authenticate Request to an AUSF. The AUSF returns a Nausf_UEAuthentication_Authenticate Response.

Step 609: The target AMF sends an authentication request (also referred to as Auth. Request) message to the UE.

The authentication request message is an authentication request message without security protection.

Step 610: The UE processes (e.g., calculate) the Authentication Request message.

Step 611: The UE returns an authentication response message to the target AMF.

The authentication response message is an authentication response message without security protection.

Figure 7A:
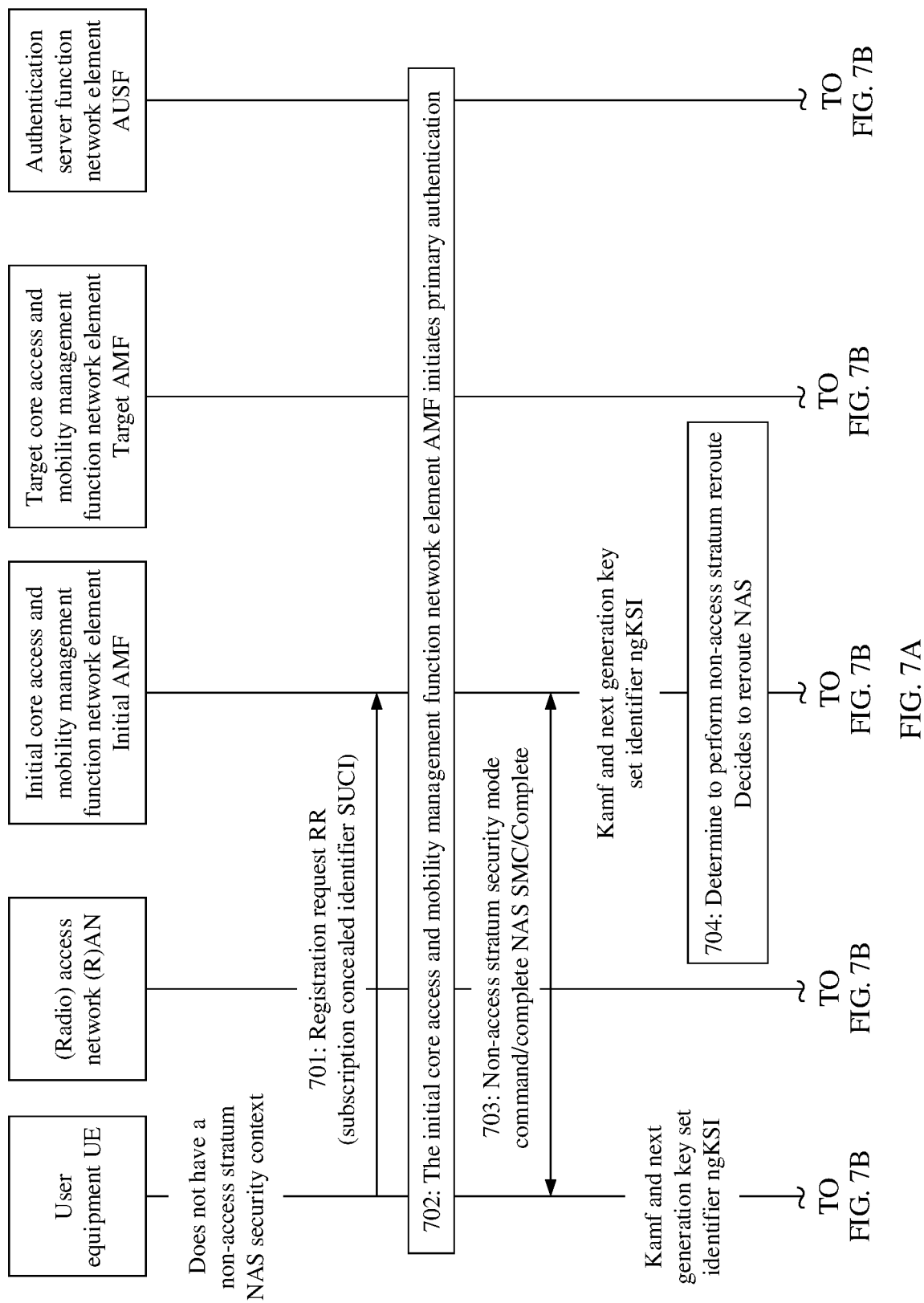
FIG. 7A and FIG. 7B are example schematic diagrams of a registration procedure to which an embodiment of this application is applicable.
Figure 7B:
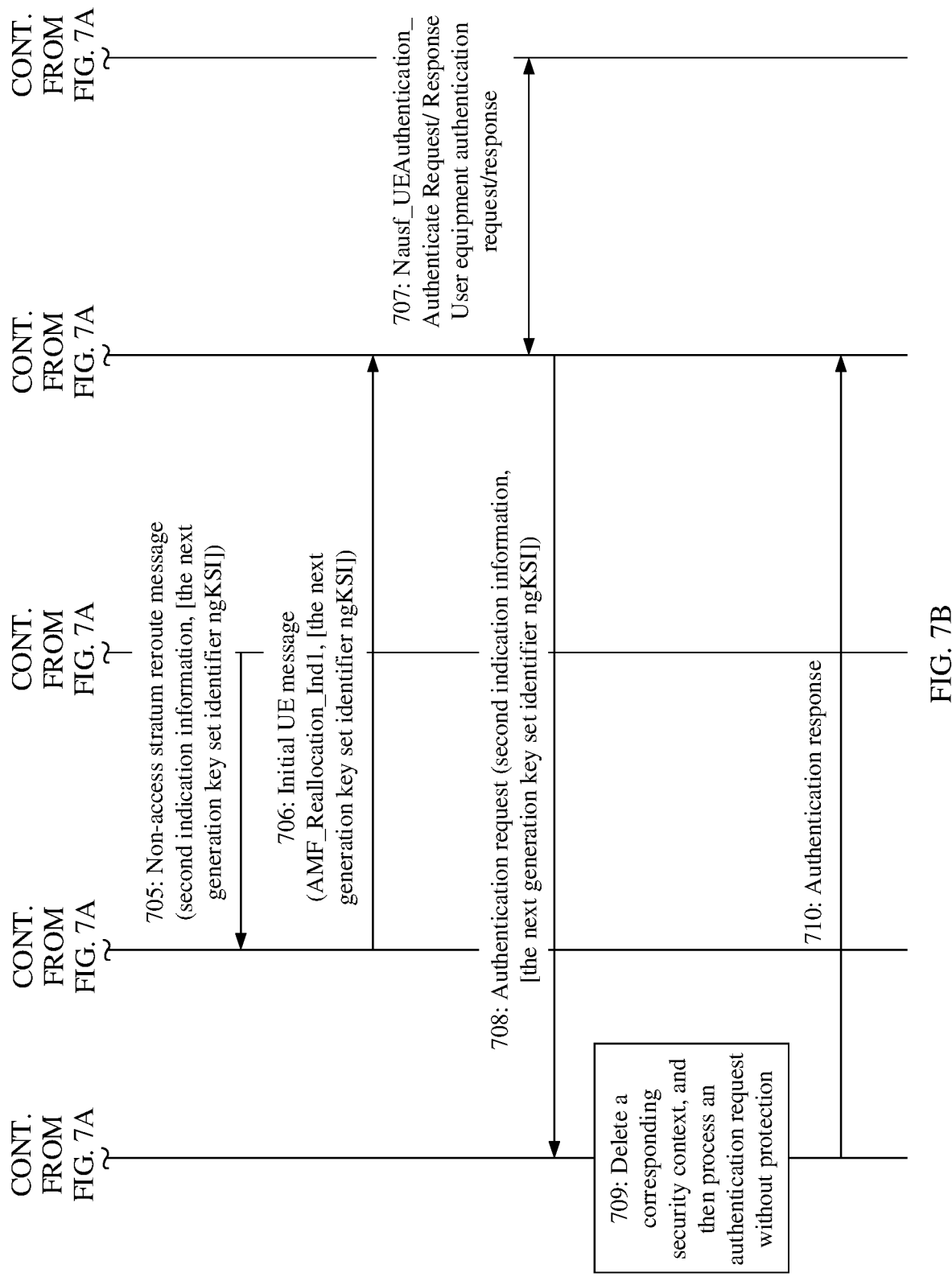

Embodiment 1(2): An initial AMF notifies a target AMF that AMF reallocation has occurred. The target AMF adds an indication to an authentication request message, to notify UE that AMF reallocation has occurred on a network side, and to indicate the UE to delete an NAS security context established and activated before AMF reallocation. Refer to a registration procedure shown in FIG. 7A and FIG. 7B. The registration process includes the following steps.

Figure 6A:
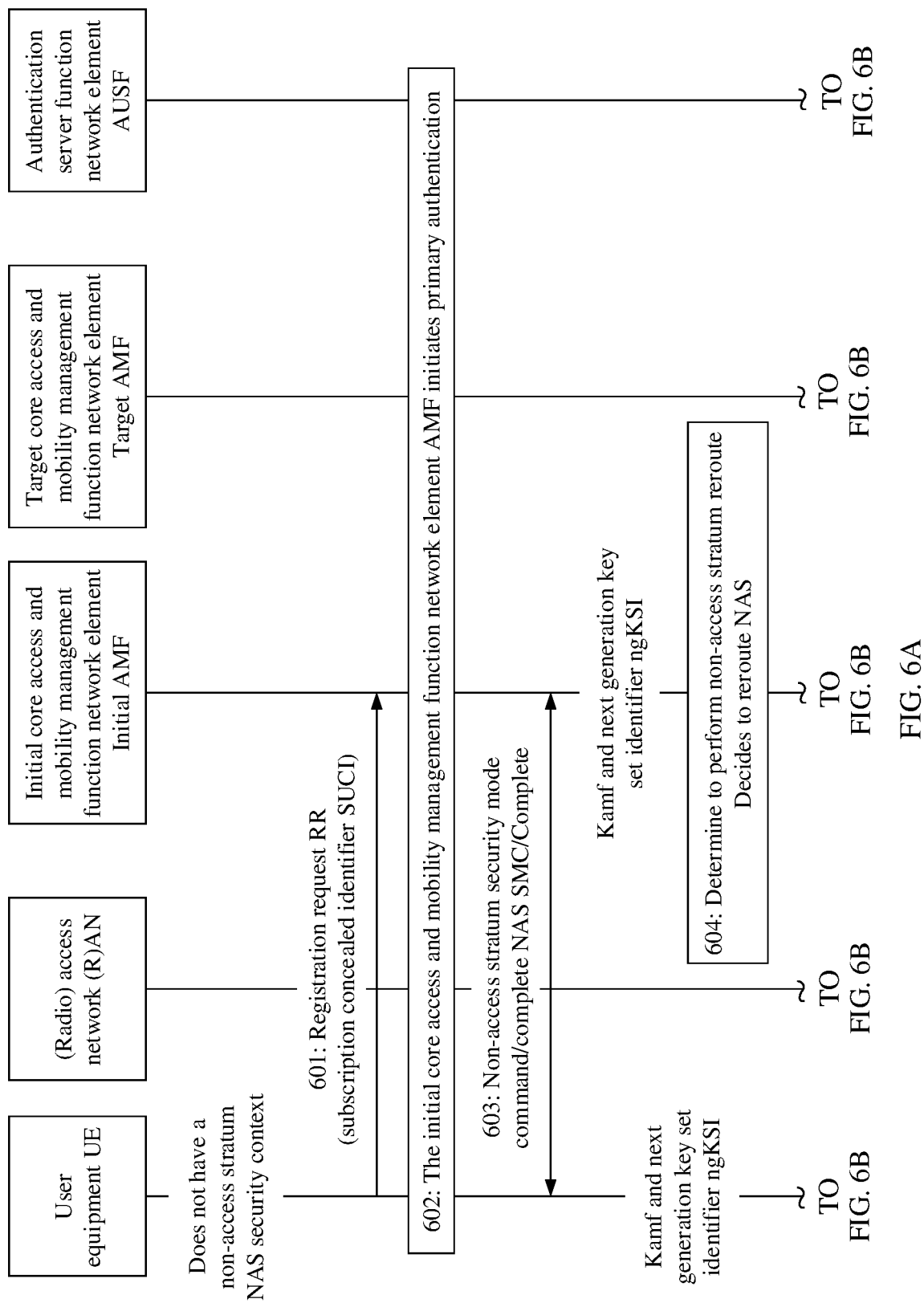
FIG. 6A and FIG. 6B are example schematic diagrams of a registration procedure to which an embodiment of this application is applicable.
Figure 6B:
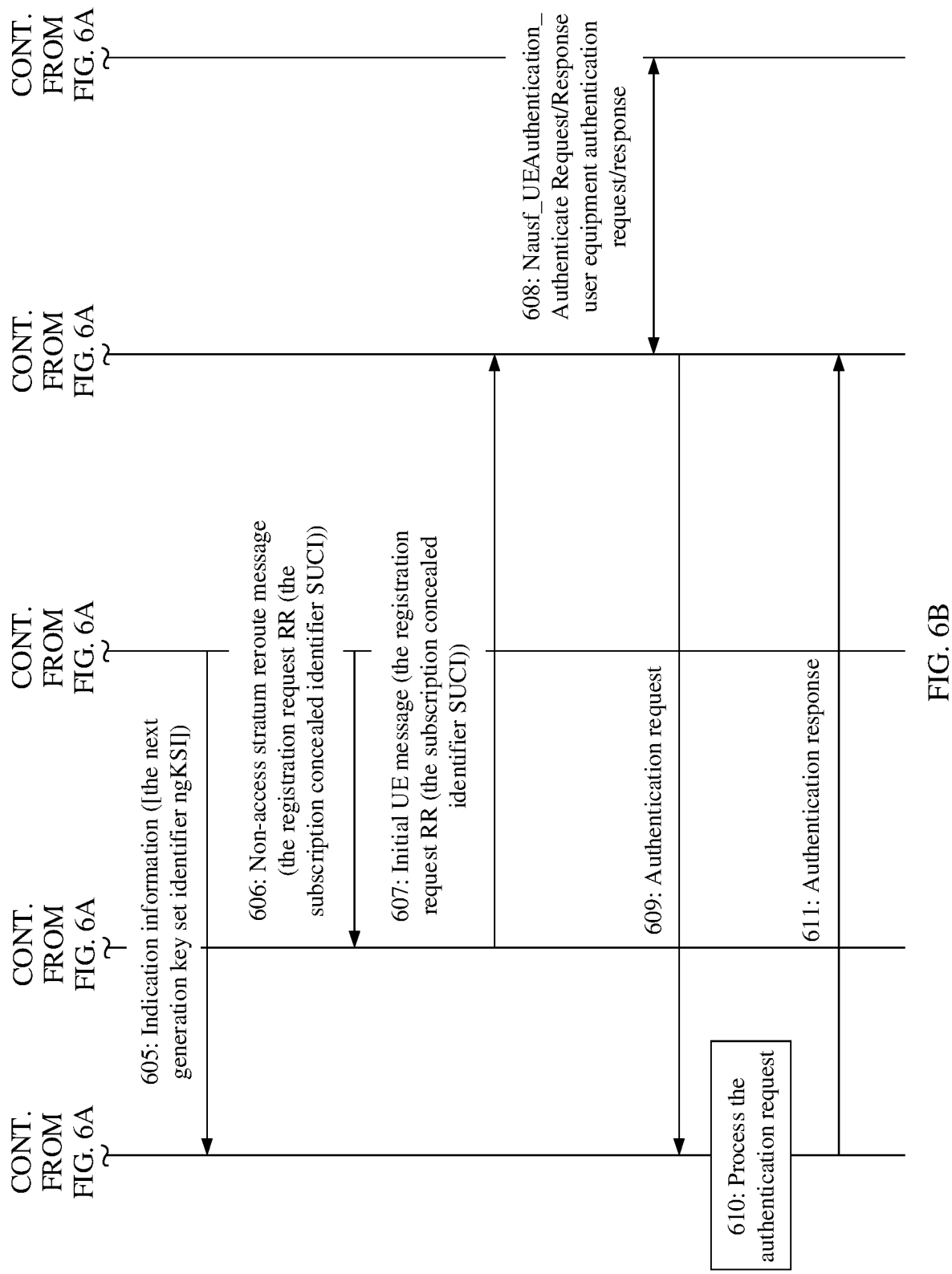

An implementation process of step 701 to step 704 is the same as that of step 601 to step 604 shown in FIG. 6A and FIG. 6B.

Step 705: The initial AMF sends a Reroute NAS Message carrying second indication information (or referred to as an AMF_Reallocation_Ind1) to a (R)AN. The second indication information (or referred to as the AMF_Reallocation_Ind1) is used to indicate the UE to delete the NAS security context, used to indicate the UE to deactivate a current NAS security context, used to indicate the UE to process authentication request information without security protection, used to indicate the UE that AMF reallocation occurs on the network side, used to indicate the UE to restore a state in which there is no NAS security context, used to indicate the UE to delete or discard a new NAS security context established between the UE and the initial AMF, used to indicate the UE to delete or discard an NAS security context established between the UE and the initial AMF, used to indicate the UE to delete or discard the new NAS security context, used to indicate the UE to deactivate a current NAS security context established between the UE and the initial AMF, used to notify the target AMF that AMF reallocation occurs, used to indicate the target AMF to send the indication to the UE, and/or used to indicate the UE to use a stored NAS security context if there is the stored NAS security context.

Optionally, NAS reroute Message may carry an ngKSI, and the ngKSI is used to indicate the UE to delete the NAS security context corresponding to the ngKSI.

Step 706: The (R)AN sends an Initial UE Message carrying the second indication information, namely, the AMF_Reallocation_Ind1, to the target AMF.

Optionally, the Initial UE Message may carry the ngKSI.

Step 707: The target AMF initiates primary authentication and sends a Nausf_UEAuthentication_Authenticate Request to an AUSF. The AUSF returns a Nausf_UEAuthentication_Authenticate Response.

Step 708: The target AMF sends the authentication request message to the UE. If the target AMF receives the second indication information (or referred to as the AMF_Reallocation_Ind1) in the previous Initial UE message, the target AMF includes the indication, namely, third indication information (or referred to as an AMF_Reallocation_Ind2 indication) in the Authentication Request message, used to notify the UE that AMF reallocation occurs on the network side, used to indicate the UE to delete the previously activated NAS security context, used to indicate the UE to delete the NAS security context, used to indicate the UE to deactivate the current NAS security context, used to indicate the UE to process the authentication request information without security protection, used to indicate the UE that AMF reallocation occurs on the network side, used to indicate the UE to restore the state in which there is no NAS security context, used to indicate the UE to delete or discard the new NAS security context established between the UE and the initial AMF, used to indicate the UE to delete or discard the NAS security context established between the UE and the initial AMF, used to indicate the UE to delete or discard the new NAS security context, used to indicate the UE to deactivate the current NAS security context established between the UE and the initial AMF, and/or used to indicate the UE to use the stored NAS security context if there is the stored NAS security context.

Optionally, if the target AMF receives the ngKSI in the previous Initial UE message, the target AMF includes the ngKSI in the Authentication Request message, where the ngKSI is used to indicate the UE to delete the NAS security corresponding to the ngKSI.

Step 709: After receiving the Authentication Request message, if the message carries the third indication information (or referred to as the AMF_Reallocation_Ind2), the UE deletes the NAS security context and processes the authentication request message, deactivates the current NAS security context and processes the authentication request message, processes the authentication request message without security protection, determines that AMF reallocation occurs on the network side and processes the authentication request message, restores the state in which there is no NAS security context and processes the authentication request message, deletes or discards the new NAS security context established between the UE and the initial AMF and processes the authentication request message, deletes or discards the NAS security context established between the UE and the initial AMF and processes the authentication request message, deletes or discards the new NAS security context and processes the authentication request message, deactivates the current NAS security context established between the UE and the initial AMF and processes the authentication request message, and/or resumes using the stored NAS security context if there is the stored NAS security context.

Optionally, if the message includes the ngKSI, the UE deletes the NAS security context corresponding to the ngKSI. If the message does not include the ngKSI, the UE finds the NAS security context established and activated during previous primary authentication and deletes the NAS security context.

Alternatively, after receiving the AMF_Reallocation_Ind2, the UE skips a process of performing security protection, verification, and decryption on the Authentication Request, and directly processes the received Authentication Request message.

Step 710: The UE returns an authentication response message to the target AMF.

Figure 8A:
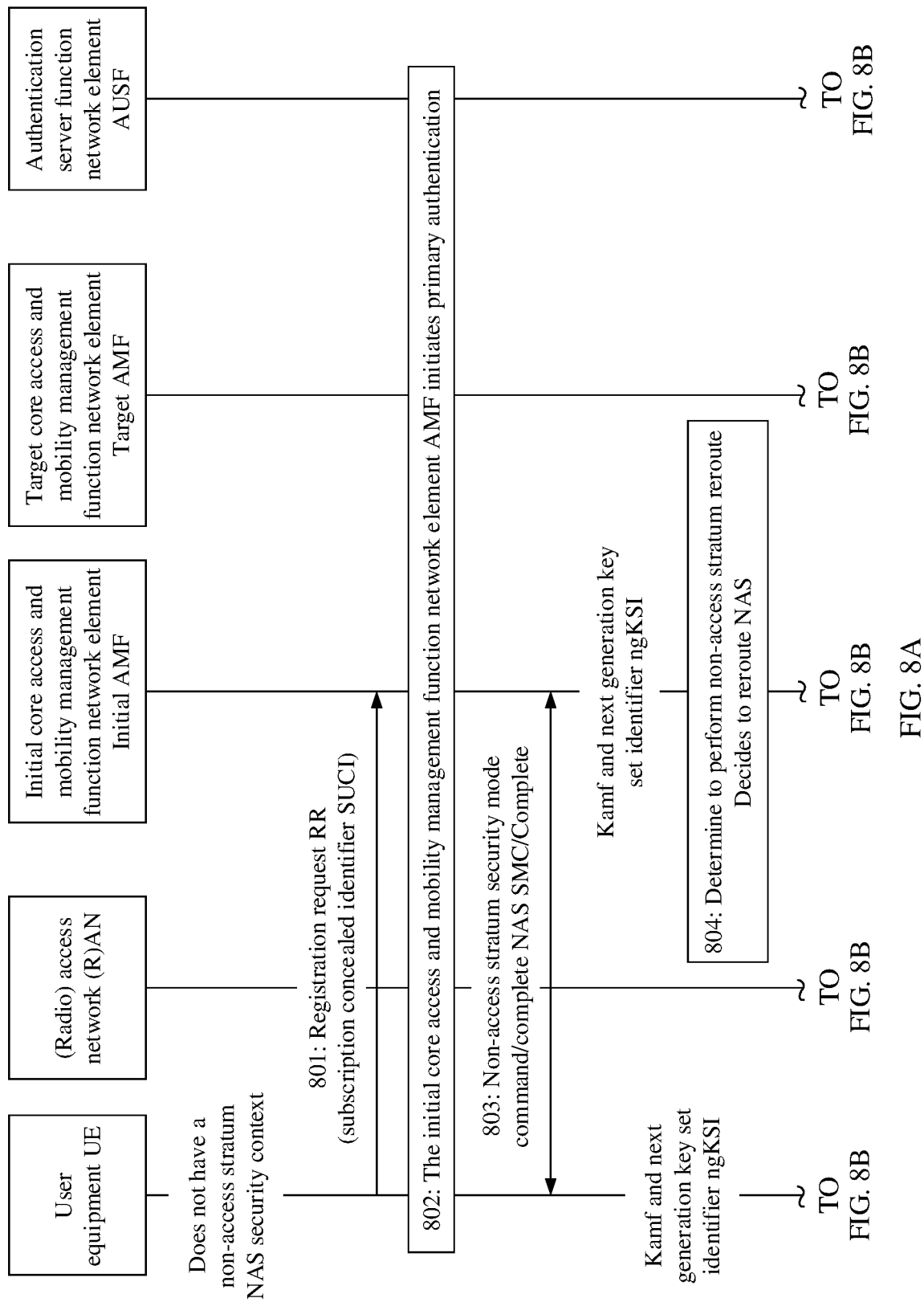

Embodiment 1(3): An initial AMF notifies a target AMF that AMF reallocation has occurred. The target AMF adds an indication to an authentication request message, to notify UE that AMF reallocation has occurred on a network side, indicate the UE to perform verification, and delete an NAS security context established and activated before AMF reallocation. Refer to a registration procedure shown in FIG. 8A and FIG. 8B. The registration process includes the following steps.

An implementation process of step 801 to step 804 is the same as that of step 601 to step 604 shown in FIG. 6A and FIG. 6B.

Step 805: The initial AMF sends a Reroute NAS Message carrying the newly added indication, namely, fourth indication information (or referred to as Secret), to a (R)AN. The fourth indication information (or referred to as the Secret) is used to indicate the UE to verify the fourth indication information. After verification succeeds, the UE deletes the NAS security context, deactivates a current NAS security context, processes an authentication request message without security protection, determine the UE that AMF reallocation occurs on the network side, restores a state in which there is no NAS security context, deletes or discards a new NAS security context established between the UE and the initial AMF, deletes or discards an NAS security context established between the UE and the initial AMF, deletes or discards the new NAS security context, deactivates a current NAS security context established between the UE and the initial AMF, and/or resumes using a stored NAS security context if there is the stored NAS security context. The fourth indication information may be further used to notify the target AMF that AMF reallocation occurs, and/or indicate the target AMF to send the indication to the UE.

NAS reroute Message further carries the registration request message that carries the SUCI.

Parameters in the Secret include:

(1) Freshness parameter. The freshness parameter may be a random number, a UL NAS Count in the registration message sent by the UE to the initial AMF, a UL NAS Count in an NAS Security Complete sent by the UE to the initial AMF, or one or more of the foregoing options. A purpose of the freshness parameter is to prevent a replay attack.

If the freshness parameter is the UL NAS Count in the registration message sent by the UE to the initial AMF, the Secret may not carry the freshness parameter.

(2) ngKSI in the NAS security context established between the UE and the initial AMF. The ngKSI is used to indicate the UE to delete the NAS security context corresponding to the ngKSI. The Secret may not carry the ngKSI.

(3) Message authentication code MAC. The MAC is generated by the initial AMF by calculating the parameters in (1) and/or (2) by using a key shared by the UE and the initial AMF, to be specific, generated by calculating the freshness parameter and/or the ngKSI. The MAC is used to prove authenticity of the Secret and avoid a spoofing attack from an attacker.

Optionally, the shared key may be a Kamf, a Kseaf, an NAS encryption key Knasenc, or an NAS integrity protection key Knasint generated between the UE and the initial AMF through primary authentication.

Step 806: The (R)AN sends an Initial UE message that carries the fourth indication information (or referred to as the Secret) to the target AMF.

The Initial UE message further carries the registration request message that carries the SUCI.

Step 807: The target AMF initiates primary authentication and sends a Nausf_UEAuthentication_Authenticate Request to an AUSF. The AUSF returns a Nausf_UEAuthentication_Authenticate Response.

Step 808: The target AMF sends the authentication request message to the UE. The Authentication Request message carries the received fourth indication information (or referred to as the Secret).

Step 809: After receiving the Authentication Request message, if the Authentication Request message carries the fourth indication information (or referred to as the Secret), the UE verifies the fourth indication information (or referred to as the Secret); and after the verification succeeds, deletes the NAS security context and processes the authentication request message, deactivates the current NAS security context and processes the authentication request message, processes the authentication request message without security protection, restores the state in which there is no NAS security context and processes the authentication request message, deletes or discards the new NAS security context established between the UE and the initial AMF and process the authentication request message, deletes or discards the NAS security context established between the UE and the initial AMF and processes the authentication request message, deletes or discards the new NAS security context and processes the authentication request message, deactivates the current NAS security context established between the UE and the initial AMF and processes the authentication request message, and/or resumes using the stored NAS security context if there is the stored NAS security context and processes the authentication request message.

When the UE deletes the NAS security context, the UE deletes the NAS security context corresponding to the ngKSI if the Secret includes the ngKSI, or the UE deletes the NAS security context generated and activated during the primary authentication if the secret does not include the ngKSI. Then, the UE processes the authentication Request message, or the UE directly processes an Authentication Request message without protection.

Step 810: The UE returns an authentication response message to the target AMF.

Figure 9A:
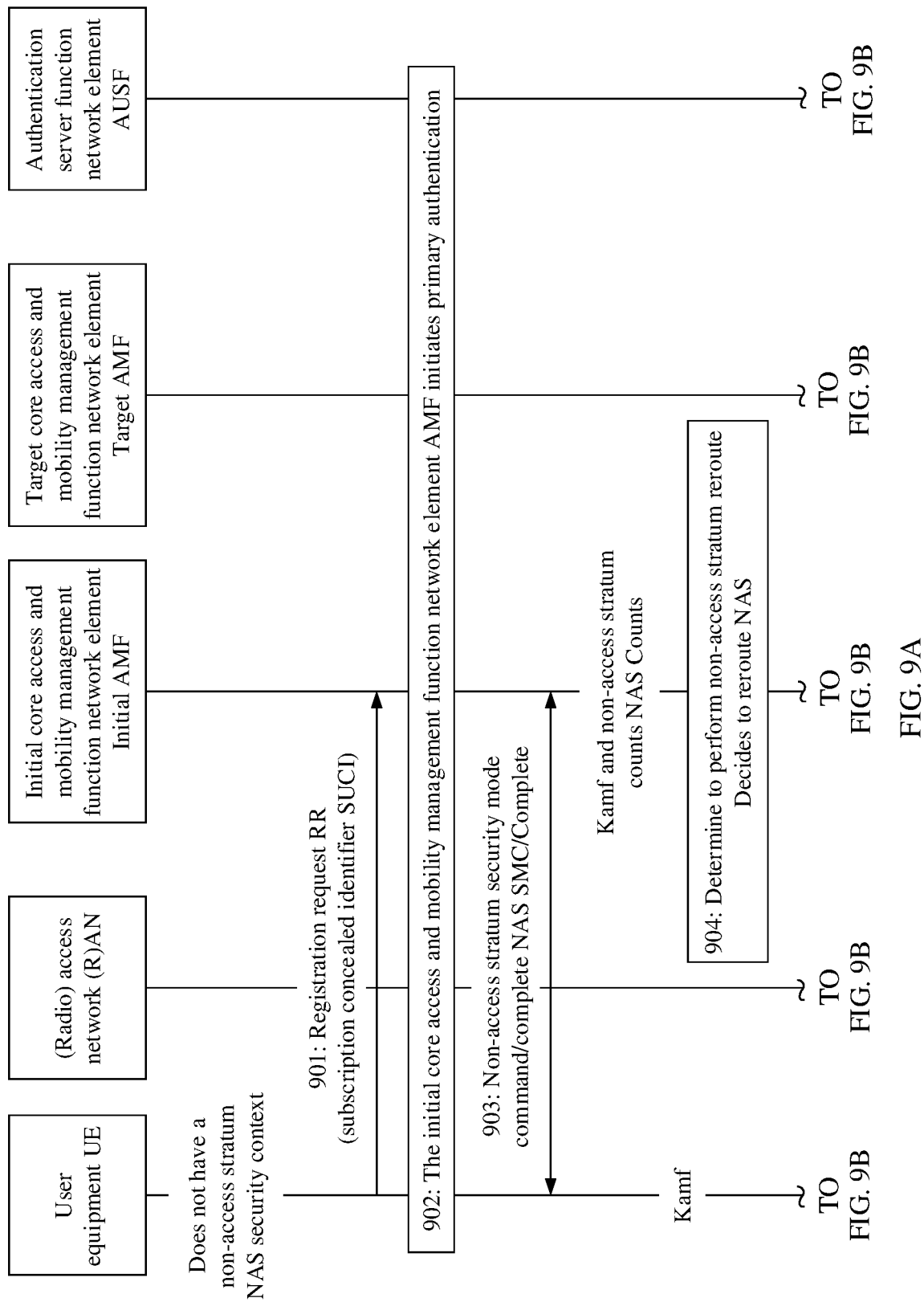

Embodiment 1(4): An initial AMF sends an NAS security context to a target AMF, to keep the NAS security context between the target AMF and UE consistent. Refer to a registration procedure shown in FIG. 9A and FIG. 9B. The registration process includes the following steps.

An implementation process of step 901 to step 904 is the same as that of step 601 to step 604 shown in FIG. 6A and FIG. 6B.

Step 905: The initial AMF adds the NAS security context, including NAS keys (including an NAS encryption key Knasenc and an NAS integrity protection key Knasint), parameters (for example, the Kamf and a selected security algorithm) used to generate the NAS keys, the security algorithm, NAS Counts, and/or the like, to an NAS Reroute Message and sends NAS reroute Message to a (R)AN.

The initial AMF may alternatively add NAS counts to a Reroute NAS Message. The NAS Counts are obtained by the initial AMF from the target AMF.

Step 906: The (R)AN sends an Initial UE message to the target AMF, where the message carries the NAS security context, including the NAS keys or the parameters used to generate the NAS keys, the security algorithm, and/or the like.

The Initial UE Message may further carry the NAS Counts.

Step 907: The target AMF stores the received NAS security context. The target AMF initiates primary authentication and sends a Nausf_UEAuthentication_Authenticate Request to an AUSF. The AUSF returns a Nausf_UEAuthentication_Authenticate Response.

If the target AMF receives the NAS counts, the target AMF updates the NAS counts stored in the target AMF by using the received NAS counts.

Step 908: Before sending an authentication request message to the UE, the target AMF protects the authentication request message based on the received NAS security context (for example, the Knasenc and the Knansint).

Optionally, the Authentication Request message may further include an uplink NAS count, a downlink NAS count, or an updated NAS count of the target AMF.

Step 909: The target AMF sends the security-protected Authentication Request message to the UE.

The UE processes the security-protected Authentication Request message.

Step 910: The UE returns an authentication response message to the target AMF.

Figure 10A:
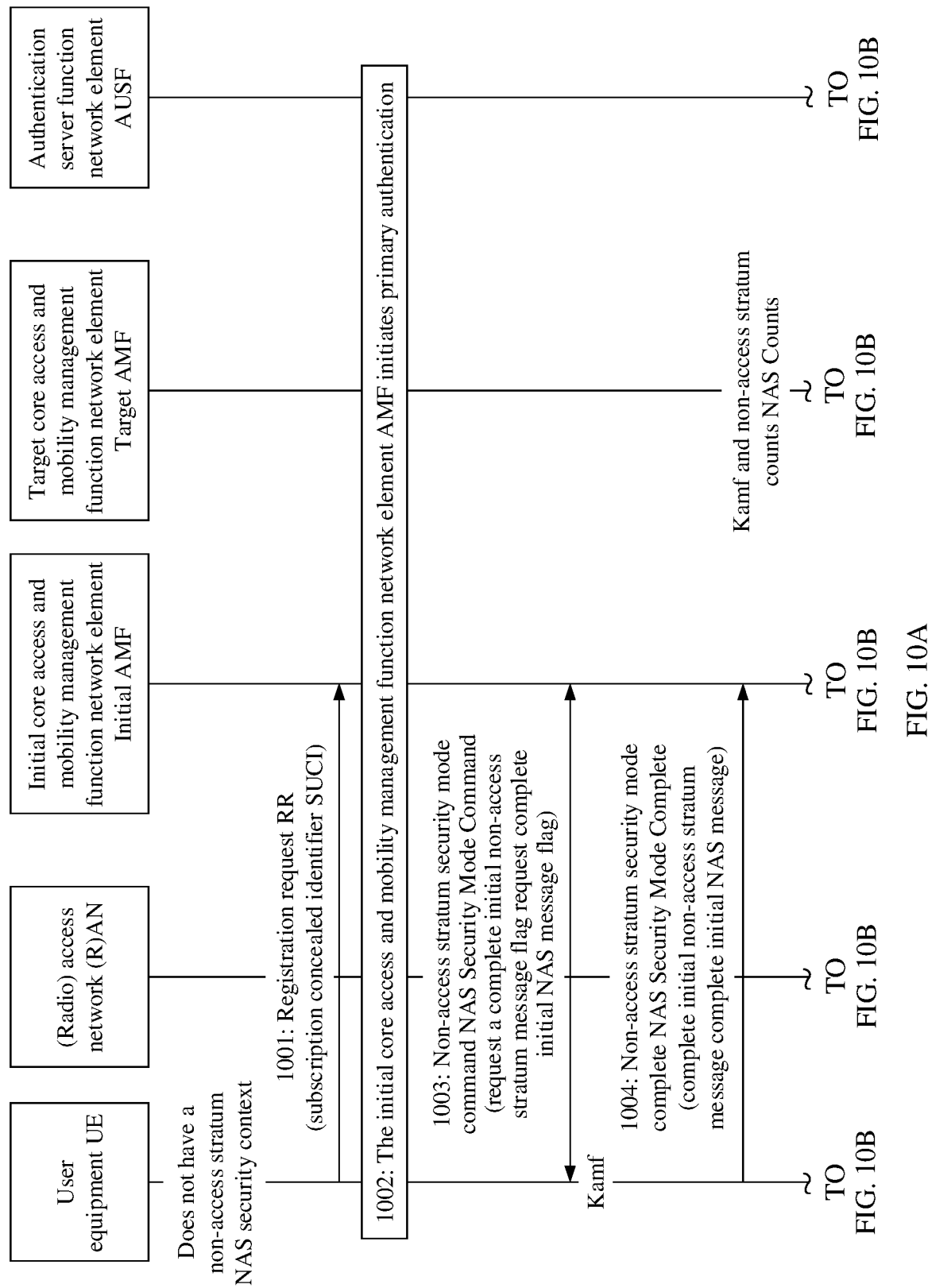

Embodiment 1(5): An initial AMF sends a complete registration request message to a target AMF. The target AMF determines that AMF reallocation has occurred, and indicates UE to process a received authentication request message. Refer to a registration procedure shown in FIG. 10A and FIG. 10B. The registration process includes the following steps.

An implementation process of step 1001 to step 1005 is the same as that of step 601 to step 604 shown in FIG. 6A and FIG. 6B.

Step 1006: The initial AMF sends a Reroute NAS Message carrying the complete registration request message (for example, a complete initial NAS message) to a (R)AN.

The complete registration request message is obtained by the initial AMF in step 1004.

Step 1007: The (R)AN sends an Initial UE Message carrying the complete registration request message to the target AMF.

Step 1008: The target AMF initiates primary authentication and sends a Nausf_UEAuthentication_Authenticate Request to an AUSF. The AUSF returns a Nausf_UEAuthentication_Authenticate Response.

The target AMF determines, based on the complete registration request message, that AMF reallocation has occurred (determines AMF reallocation has occurred).

Step 1009: The target AMF sends an authentication request message carrying indication information indicator to the UE. The indication information indicator is used to indicate the UE that AMF reallocation has occurred on a network side, or indicate the UE to process the received authentication request.

The UE processes the received authentication request message based on the indication information indicator.

Step 1010: The UE returns an authentication response message to the target AMF.

Embodiment 2

An initial AMF determines to initiate AMF reallocation via a (R)AN or NAS reroute via a (R)AN in a registration process of UE, and determines to perform reallocation to a target AMF. The initial AMF requests the target AMF to assign a new 5G-GUTI (5G Globally Unique Temporary UE Identity, a globally unique temporary UE identity in a 5G network) to the UE, the initial AMF assigns a new 5G-GUTI to the UE, the initial AMF requests the target AMF to assign a special new 5G-GUTI used for AMF reallocation, or the initial AMF assigns a special new 5G-GUTI used for AMF reallocation to the UE. The initial AMF sends the new 5G-GUTI to the UE. The initial AMF initiates a de-registration procedure or sends a registration reject message, and indicates the UE to perform re-registration. Optionally, the initial AMF initiates RRC connection release. The UE performs re-registration based on an indication, and the UE initiates a registration request RR message that carries the new 5G-GUTI to the target AMF. In this embodiment, the initial AMF skips the steps of performing NAS reroute via the (R)AN shown in step 105 and step 106 in FIG. 1A and FIG. 1B, in other words, skips a process in which the initial AMF sends the received registration request to the (R)AN, and the (R)AN sends the registration request to the target AMF.

Figure 11:
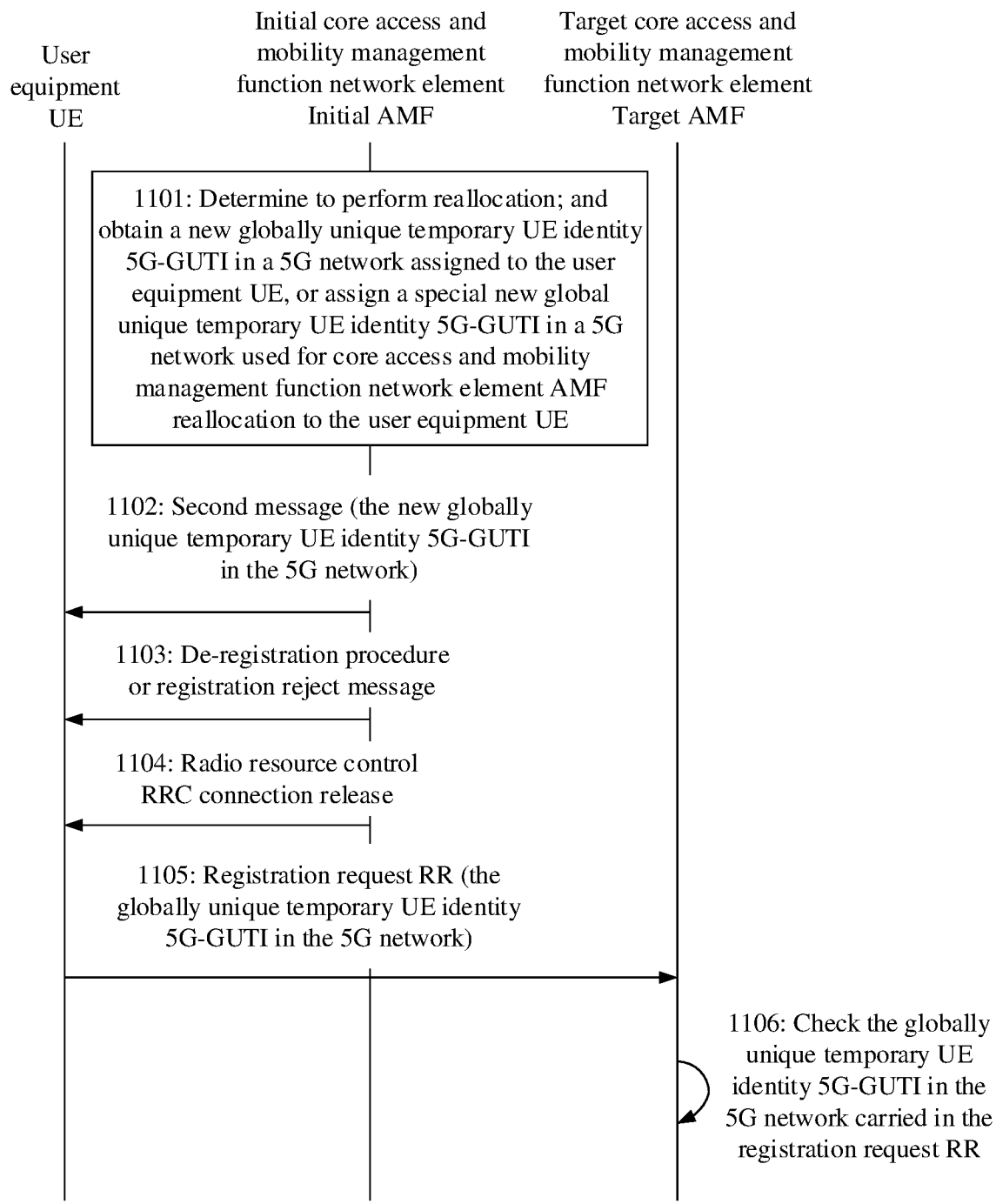
FIG. 11 is an example schematic diagram of a registration procedure to which an embodiment of this application is applicable.

Refer to a registration process shown in FIG. 11. The registration process includes the following steps.

Step 1101: An initial AMF determines to initiate reallocation to a target AMF via a (RAN) or NAS reroute to a target AMF via a (RAN). The initial AMF skips a procedure of performing NAS reroute via the (R)AN. The initial AMF requests the target AMF to assign a new 5G-GUTI to UE (see the following description in Manner 1), the initial AMF assigns a new 5G-GUTI to UE (see the following description in Manner 2), the initial AMF requests the target AMF to assign a special new 5G-GUTI used for AMF reallocation (see the following description in Manner 3), or the initial AMF assigns a special new 5G-GUTI used for AMF reallocation to UE (see the following description in Manner 4).

Manner 1:

The initial AMF sends, to the target AMF, information for requesting to assign the new 5G-GUTI to the UE, and the target AMF assigns the new 5G-GUTI to the UE. The target AMF sends a message that carries the new 5G-GUTI to the initial AMF.

Optionally, the initial AMF includes an initial SUCI in the information that is sent to the target AMF and that is for requesting to assign the new 5G-GUTI, and the SUCI is an SUCI carried in a registration request message received by the initial AMF.

Optionally, the target AMF sends the message that carries the new 5G-GUTI to the initial AMF via the (R)AN. To be specific, the target AMF sends the message that carries the new 5G-GUTI to the (R)AN, and the (R)AN sends the message that carries the new 5G-GUTI to the initial AMF.

After allocating the new 5G-GUTI, the target AMF flags the new 5G-GUTI, for example, flags the new 5G-GUTI as a 5G-GUTI used in an AMF reallocation scenario, and/or flags the new 5G-GUTI as a new 5G-GUTI assigned to the UE.

For example, the initial AMF requests the target AMF to assign the new 5G-GUTI.

Optionally, the initial AMF sends, to the target AMF, the information for requesting to assign the new 5G-GUTI.

In still another example, the initial AMF sends, to the target AMF, the SUCI carried in the received registration request.

Optionally, the initial AMF sends the SUCI to the target AMF via the (R)AN. To be specific, the initial AMF sends the SUCI to the (R)AN, and the (R)AN sends the SUCI to the target AMF.

The SUCI may be carried in the information, and the information that carries the SUCI is not limited.

Optionally, after receiving the SUCI sent by the initial AMF, the target AMF may store the SUCI, and establish a correspondence between the SUCI and the new 5G-GUTI.

In another example, the initial AMF notifies the target AMF that AMF reallocation occurs.

Optionally, the initial AMF sends, to the target AMF via the (R)AN, indication information or a message used to notify the target AMF that AMF reallocation occurs. To be specific, the initial AMF sends, to the (R)AN, the indication information or the message used to notify the target AMF that AMF reallocation occurs, and the (R)AN sends, to the target AMF, the indication information or the message used to notify the target AMF that reallocation occurs.

The indication information used to notify the target AMF that AMF reallocation occurs may be carried in a message.

Manner 2:

The initial AMF assigns the new 5G-GUTI to the UE.

After allocating the new 5G-GUTI, the initial AMF flags the UE or flags the new 5G-GUTI, for example, flags the new 5G-GUTI as a 5G-GUTI used in an AMF reallocation scenario, and/or flags the new 5G-GUTI as a new 5G-GUTI assigned to the UE.

Optionally, the initial AMF stores information about the target AMF.

Manner 3:

The AMF requests the target AMF to assign the special new 5G-GUTI used for AMF reallocation, and the target AMF assigns the special new 5G-GUTI used for AMF reallocation to the UE. The target AMF sends a message that carries the special new 5G-GUTI used for AMF reallocation to the initial AMF.

After the target AMF assigns the special new 5G-GUTI used for AMF reallocation, the target AMF does not need to flag the 5G-GUTI.

Optionally, the target AMF sends, to the initial AMF via the (R)AN, the message that carries the special new 5G-GUTI used for AMF reallocation. To be specific, the target AMF sends the message that carries the special new 5G-GUTI used for AMF reallocation to the (R)AN, and the (R)AN sends the message that carries the special new 5G-GUTI used for AMF reallocation to the initial AMF.

For example, the initial AMF requests the target AMF to assign the special new 5G-GUTI used for AMF reallocation.

Optionally, the initial AMF sends, to the target AMF, information for requesting to assign the special new 5G-GUTI used for AMF reallocation.

In still another example, the initial AMF sends, to the target AMF, the SUCI carried in the received registration request.

Optionally, the initial AMF sends the SUCI to the target AMF via the (R)AN. To be specific, the initial AMF sends the SUCI to the (R)AN, and the (R)AN sends the SUCI to the target AMF.

The SUCI may be carried in the information, and the information that carries the SUCI is not limited.

Optionally, after receiving the SUCI sent by the initial AMF, the target AMF may store the SUCI, and establish a correspondence between the SUCI and the special new 5G-GUTI used for AMF reallocation.

In another example, the initial AMF notifies the target AMF that AMF reallocation occurs.

Optionally, the initial AMF sends, to the target AMF via the (R)AN, indication information or a message used to notify the target AMF that AMF reallocation occurs. To be specific, the initial AMF sends, to the (R)AN, the indication information or the message used to notify the target AMF that AMF reallocation occurs, and the (R)AN sends, to the target AMF, the indication information used to notify the target AMF that reallocation occurs.

The indication information used to notify the target AMF that AMF reallocation occurs may be carried in a message.

Manner 4:

The initial AMF assigns the special new 5G-GUTI used for AMF reallocation to the UE.

After the initial AMF assigns the special new 5G-GUTI used for AMF reallocation, the initial AMF does not need to flag the 5G-GUTI.

Optionally, the initial AMF stores information about the target AMF.

Step 1102: The initial AMF sends a second message to the UE, where the second message carries the new 5G-GUTI assigned to the UE.

Optionally, the second message is a registration accept message or a configuration update command.

Step 1103: The initial AMF initiates a de-registration procedure or sends a registration reject message, and indicates the UE to perform re-registration.

If the second message is the registration accept message, the initial AMF initiates the de-registration procedure. If the second message is the configuration update command, the initial AMF sends the registration reject message.

Step 1104: Optionally, the initial AMF initiates RRC connection release.

Step 1105: The UE re-initiates a registration request, where the registration request RR message carries the new 5G-GUTI.

In Manner 1 of step 1101, the (R)AN sends the RR that carries the new 5G-GUTI to the target AMF.

In Manner 2 of step 1101, the (R)AN sends the RR that carries the new 5G-GUTI to the initial AMF, and the initial AMF checks the 5G-GUTI carried in the RR. If the initial AMF flags the 5G-GUTI locally, and/or if the initial AMF determines that the 5G-GUTI is the 5G-GUTI used in AMF reallocation scenario, the initial AMF initiates the procedure of performing NAS reroute via the (R)AN and sends the RR to the target AMF via the (R)AN.

In Manner 3 of step 1101, the (R)AN sends, to the target AMF, the RR that carries the special new 5G-GUTI used for AMF reallocation.

In Manner 4 of step 1101, the (R)AN sends, to the initial AMF, the RR that carries the special new 5G-GUTI used for AMF reallocation. The initial AMF checks the special new 5G-GUTI used for AMF reallocation carried in the RR. The initial AMF initiates the procedure of performing NAS reroute via the (R)AN and sends the RR to the target AMF via the (R)AN.

Optionally, the initial AMF sends the SUCI carried in the RR to the target AMF.

Step 1106: The target AMF receives the registration request RR, and checks the 5G-GUTI carried in the RR.

In Manner 1 of step 1101, if the target AMF has flagged the 5G-GUTI locally, the target AMF initiates an identity request procedure to obtain an SUCI of the UE and perform primary authentication to successfully register the UE.

Alternatively, if the target AMF has flagged the 5G-GUTI locally, the target AMF searches for the correspondence between the SUCI and the 5G-GUTI and perform primary authentication to successfully register the UE.

In Manner 2 and Manner 4 of step 1101, if the target AMF previously receives the SUCI, the target AMF initiates primary authentication to successfully register the UE.

Alternatively, if the target AMF does not receive the SUCI, the target AMF initiates an identity request procedure to obtain an SUCI of the UE and perform primary authentication to successfully register the UE.

In Manner 3 of step 1101, if the target AMF determines that the 5G-GUTI is the 5G-GUTI used in AMF reallocation scenario, the target AMF initiates an identity request procedure to obtain an SUCI of the UE and perform primary authentication to successfully register the UE.

Alternatively, if the target AMF determines that the 5G-GUTI is the 5G-GUTI used in AMF reallocation scenario, the target AMF searches for the correspondence between the SUCI and the 5G-GUTI and perform primary authentication to successfully register the UE.

The following describes a registration process in Embodiment 2 of this application by using two specific embodiments.

Embodiment 2(1): The initial AMF sends, to the target AMF, the information for requesting to assign the new 5G-GUTI to the UE, or the initial AMF requests the target AMF to assign the special new 5G-GUTI used for AMF reallocation. The target AMF assigns the new 5G-GUTI to the UE, or the target AMF assigns the special new 5G-GUTI used for AMF reallocation to the UE. Refer to a registration procedure shown in FIG. 12A and FIG. 12B. The registration process includes the following steps.

An implementation process of step 1201 to step 1204 is the same as that of step 101 to step 103 shown in FIG. 1A and FIG. 1B.

Optionally, the registration request RR message carries the SUCI.

Step 1205: The initial AMF determines, based on the Requested S-NSSAIs, whether the initial AMF can serve the UE. If the initial AMF determines that the initial AMF cannot serve the UE, the initial AMF determines that NAS reroute via a (R)AN needs to be performed (determines to reroute NAS via (R)AN is needed). The initial AMF skips NAS reroute via the (R)AN (skip NAS reroute via (R)AN).

Step 1206: The initial AMF requests a new 5G-GUTI from a target AMF via the (R)AN (requests a new 5G-GUTI from Target AMF), or the initial AMF requests a special new 5G-GUTI used for AMF reallocation from a target AMF via the (R)AN.

For an implementation process of this step, refer to Manner 1 or Manner 3 in step 1101 in FIG. 11.

Step 1207: The target AMF assigns the new 5G-GUTI, or the target AMF assigns the special new 5G-GUTI used for AMF reallocation. The target AMF sends, to the initial AMF via the (R)AN, a message that carries the new 5G-GUTI, or the target AMF sends, to the initial AMF via the (R)AN, a message that carries the special new 5G-GUTI used for AMF reallocation.

Step 1208: The initial AMF sends the registration accept message carrying the new 5G-GUTI to the UE, or the initial AMF sends the Registration Accept message carrying the special new 5G-GUTI used for AMF reallocation to the UE.

Alternatively, the initial AMF may send the configuration update command carrying the new 5G-GUTI to the UE, or send the configuration update command carrying the special new 5G-GUTI used for AMF reallocation and send the configuration update command to the UE.

Step 1209: The initial AMF initiates a de-registration procedure, and indicates the UE to perform re-registration.

Alternatively, the initial AMF may send a registration reject message to the UE, and indicate the UE to perform re-registration.

Step 1210: Optionally, the initial AMF initiates RRC connection release (for example, N2 RRC Release).

Step 1211: The UE sends the registration request RR message to the target AMF, where the RR carries the new 5G-GUTI.

Step 1212: The target AMF receives the RR, and checks the 5G-GUTI carried in the RR.

If the target AMF flags the 5G-GUTI locally, or if the target AMF determines that the 5G-GUTI is a 5G-GUTI used in an AMF reallocation scenario, the target AMF initiates an identity request procedure to obtain an SUCI of the UE and performs the primary authentication to successfully register the UE.

Alternatively, if the target AMF flags the 5G-GUTI locally, or if the target AMF determines that the 5G-GUTI is a 5G-GUTI used in an AMF reallocation scenario, the target AMF searches for a correspondence between the SUCI and the 5G-GUTI and performs the primary authentication to successfully register the UE.

Embodiment 2(2): The initial AMF assigns the new 5G-GUTI to the UE, or the initial AMF assigns the special new 5G-GUTI used for AMF reallocation to the UE. Refer to a registration procedure shown in FIG. 13A and FIG. 13B. The registration process includes the following steps.

Figure 12A:
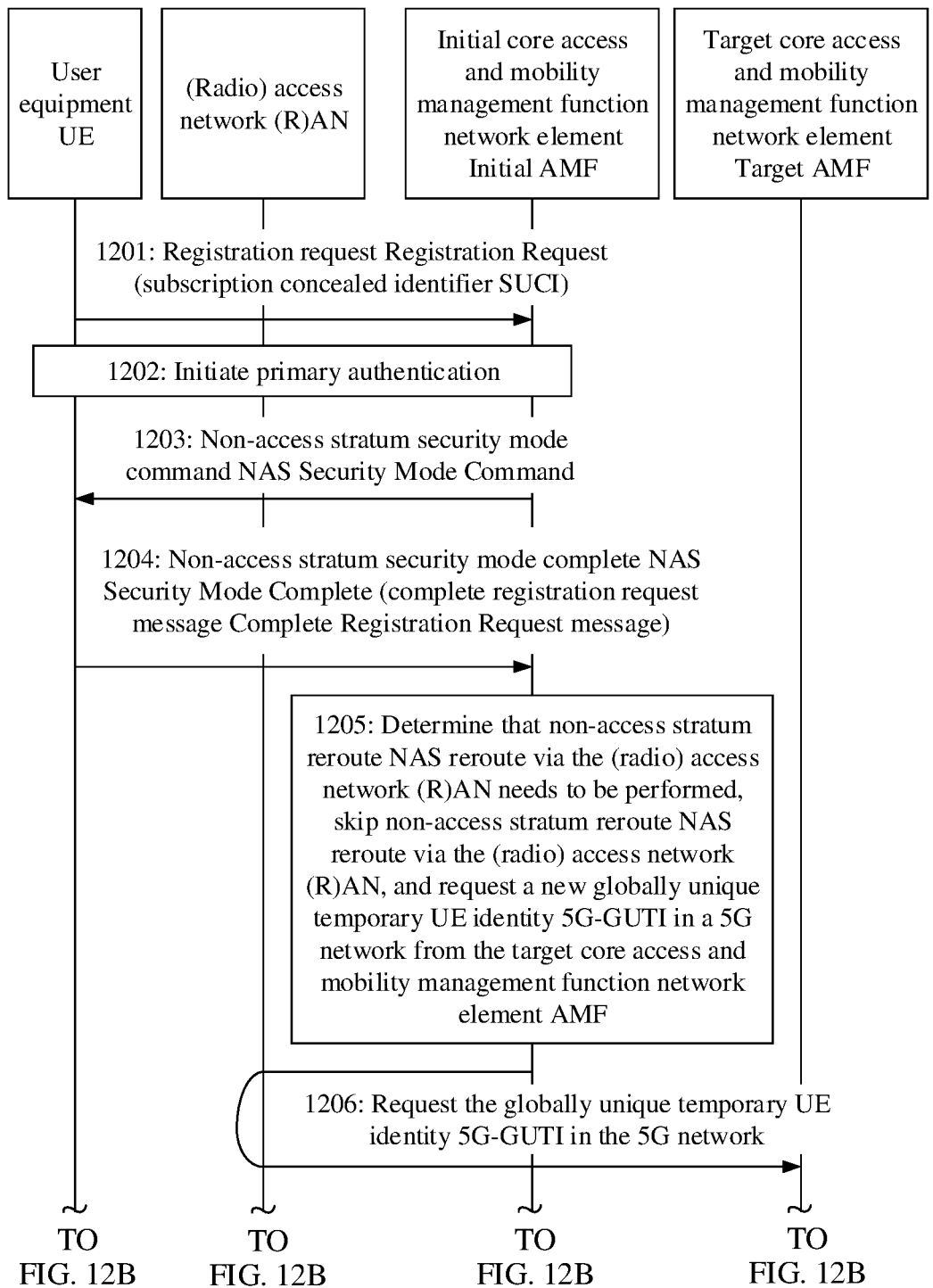
FIG. 12A and FIG. 12B are example schematic diagrams of a registration procedure to which an embodiment of this application is applicable.
Figure 12B:
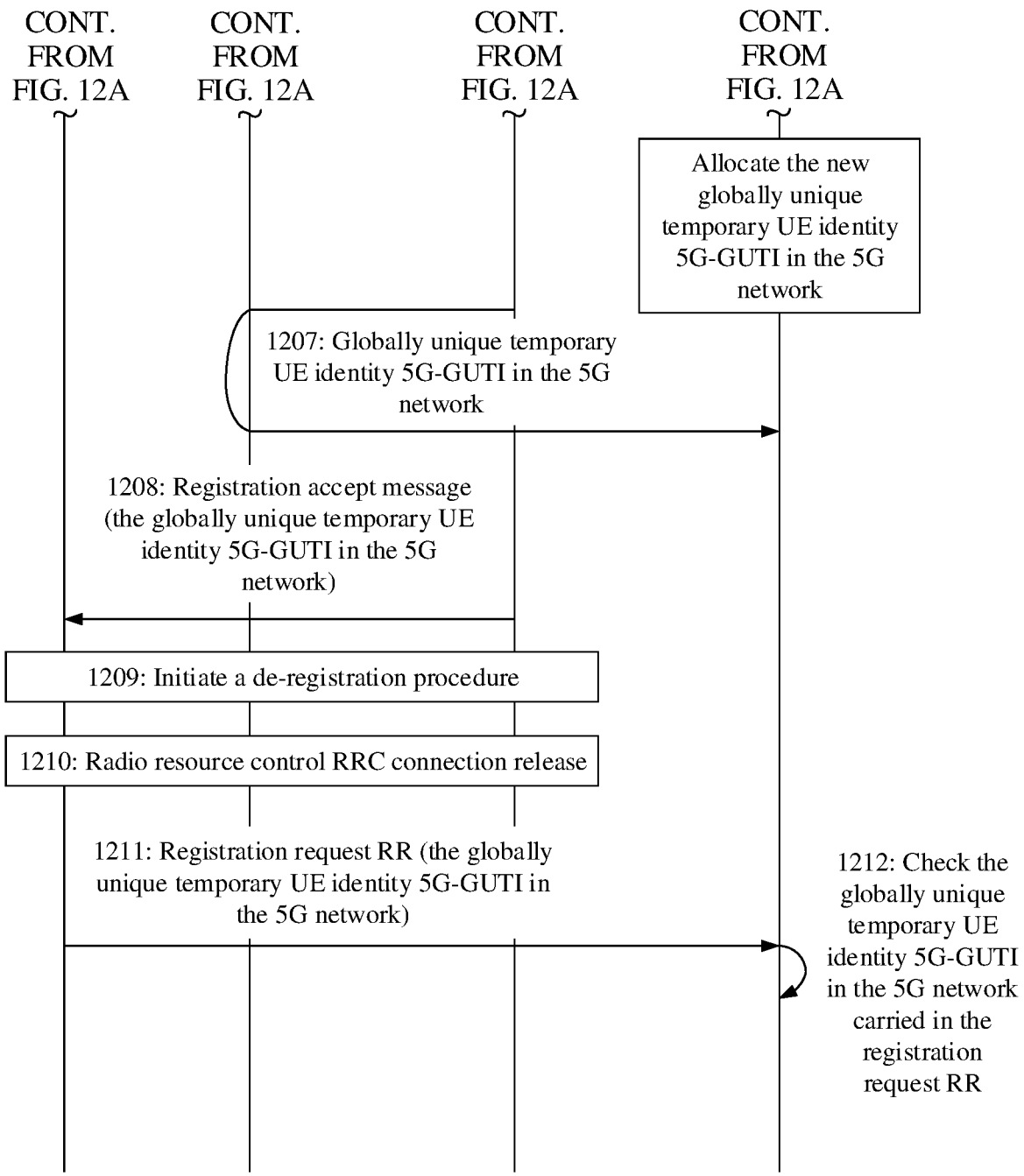

An implementation process of step 1301 to step 1304 is the same as that of step 1201 to step 1204 shown in FIG. 12A and FIG. 12B.

Optionally, the registration request RR message carries the SUCI.

Step 1305: The initial AMF determines, based on the Requested S-NSSAIs, whether the initial AMF can serve the UE. If the initial AMF determines that the initial AMF cannot serve the UE, the initial AMF determines that NAS reroute via a (RAN) needs to be performed (decides to reroute NAS via (R)AN is needed). The initial AMF skips NAS reroute via the (R)AN. The initial AMF assigns the new 5G-GUTI and flag the UE (assign a new 5G-GUTI, and flag the UE), or the initial AMF assigns a special new 5G-GUTI used for AMF reallocation.

Step 1306: The initial AMF sends the registration accept message carrying the new 5G-GUTI to the UE, or the initial AMF sends the Registration Accept message carrying the special new 5G-GUTI used for AMF reallocation to the UE.

Alternatively, the initial AMF may send the configuration update command carrying the new 5G-GUTI to the UE, or send the configuration update command carrying the special new 5G-GUTI used for AMF reallocation to the UE.

Step 1307: The initial AMF initiates a de-registration procedure, and indicates the UE to perform re-registration.

Alternatively, the initial AMF may send a registration reject message to the UE, and indicate the UE to perform re-registration.

Step 1308: Optionally, the initial AMF initiates RRC connection release (for example, N2 RRC Release).

Step 1309: The UE sends the RR that carries the 5G-GUTI to the initial AMF.

Step 1310: The initial AMF checks the 5G-GUTI carried in the RR. If the initial AMF flags the 5G-GUTI locally, or if the initial AMF determines that the 5G-GUTI is a 5G-GUTI used in an AMF reallocation scenario, the initial AMF initiates a procedure of performing NAS reroute (perform NAS reroute) via the (RAN).

Step 1311: The initial AMF sends the RR to the target AMF via the (R)AN.

The RR carries the 5G-GUTI.

Optionally, the initial AMF sends the SUCI carried in the RR to the target AMF.

Step 1312: The target AMF receives the RR, and checks the 5G-GUTI carried in the RR.

Figure 13A:
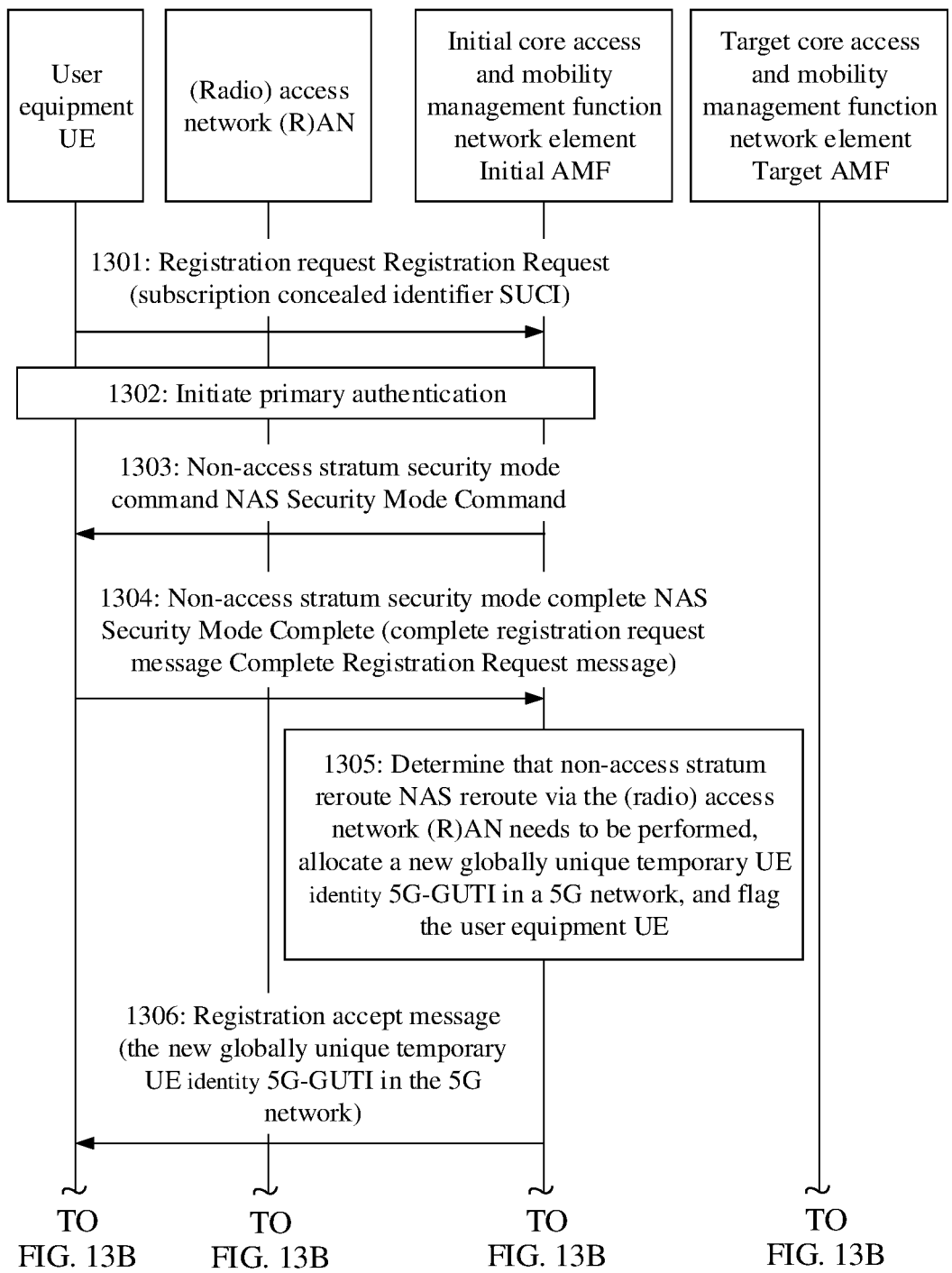
FIG. 13A and FIG. 13B are example schematic diagrams of a registration procedure to which an embodiment of this application is applicable.
Figure 13B:
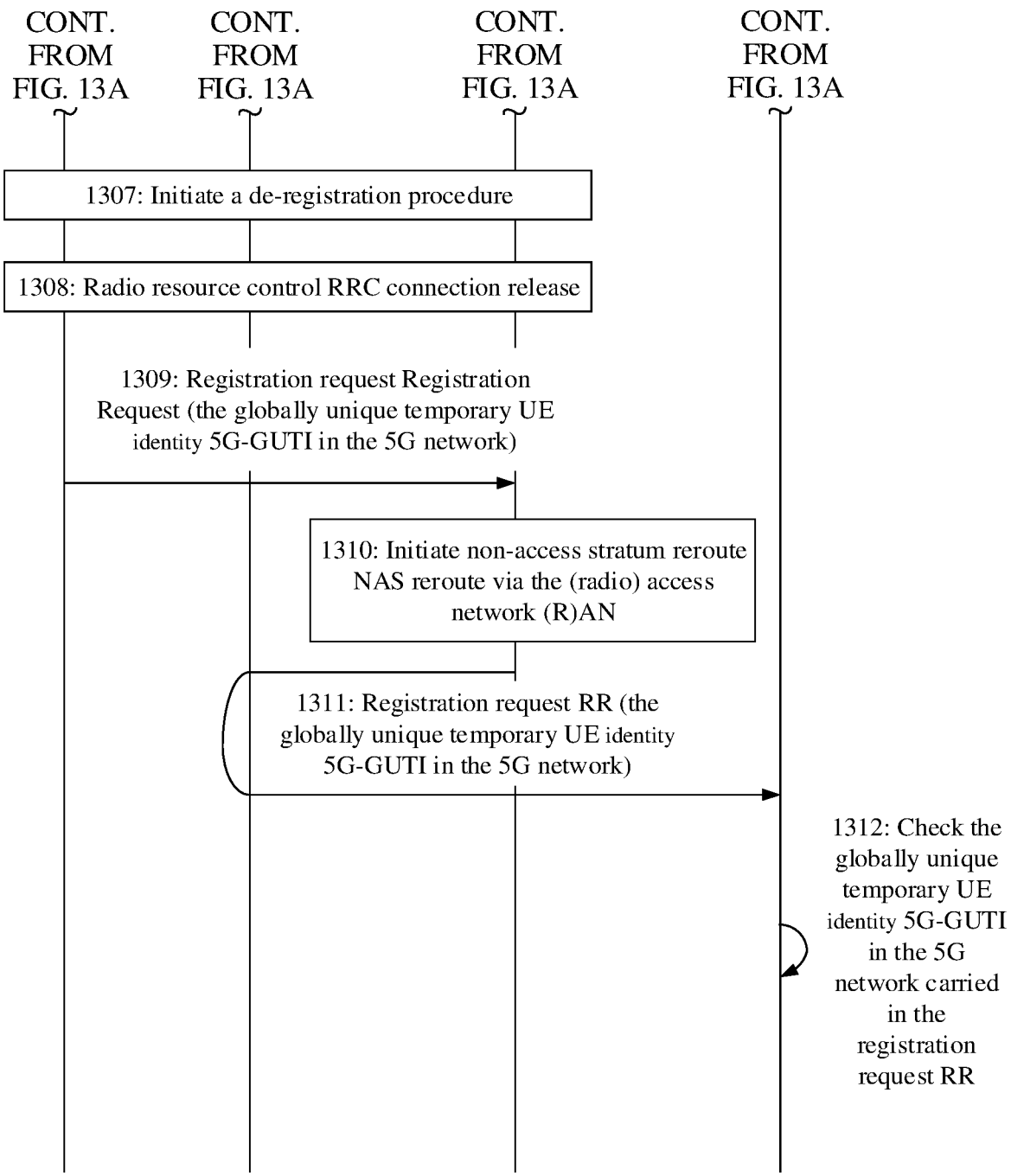

It is assumed that there is no direct connection between the target AMF and an AMF to which the 5G-GUTI points (the initial AMF in FIG. 13A and FIG. 13B).

In this case, if the target AMF previously receives the SUCI, the target AMF initiates the primary authentication to successfully register the UE; or if the target AMF does not receive the SUCI, the target AMF initiates an identity request procedure to obtain an SUCI of the UE and perform the primary authentication to successfully register the UE.

Embodiment 3

UE optionally carries an indication indicator 1 in a registration request RR. When deciding to perform NAS reroute, an initial AMF performs different steps based on whether the RR carries the indication indicator 1 to successfully register the UE.

Embodiment 3(1): Optionally, the UE includes the indication indicator 1 in the registration request RR.

For example, the indication indicator 1 is used to indicate:
the UE is UE with non-Release 15;
the UE is UE with Release 16 or UE with a release later than Release 16;
the UE supports a capability in Release 16 or a release later than Release 16;
the UE supports a capability of performing NAS reroute via a (R)AN;
the UE supports a capability of performing AMF reallocation via the (R)AN;
the UE supports a capability of falling back an NAS security context (in NAS reroute via the (RAN)/in AMF reallocation via the (RAN));
the UE supports a capability of (resuming) using an old NAS security context (in NAS reroute via the (RAN)/in AMF reallocation via the (RAN));
the UE supports a capability of deleting a new NAS security context (in NAS reroute via the (RAN)/in AMF reallocation via the (RAN));
the UE supports a capability of restoring to a state in which there is no NAS security context (in NAS reroute via the (RAN)/in AMF reallocation via the (RAN)); and/or
the UE supports a capability of processing an NAS security context in NAS reroute (in NAS reroute via the (RAN)/in AMF reallocation via the (RAN)).

Figure 14:
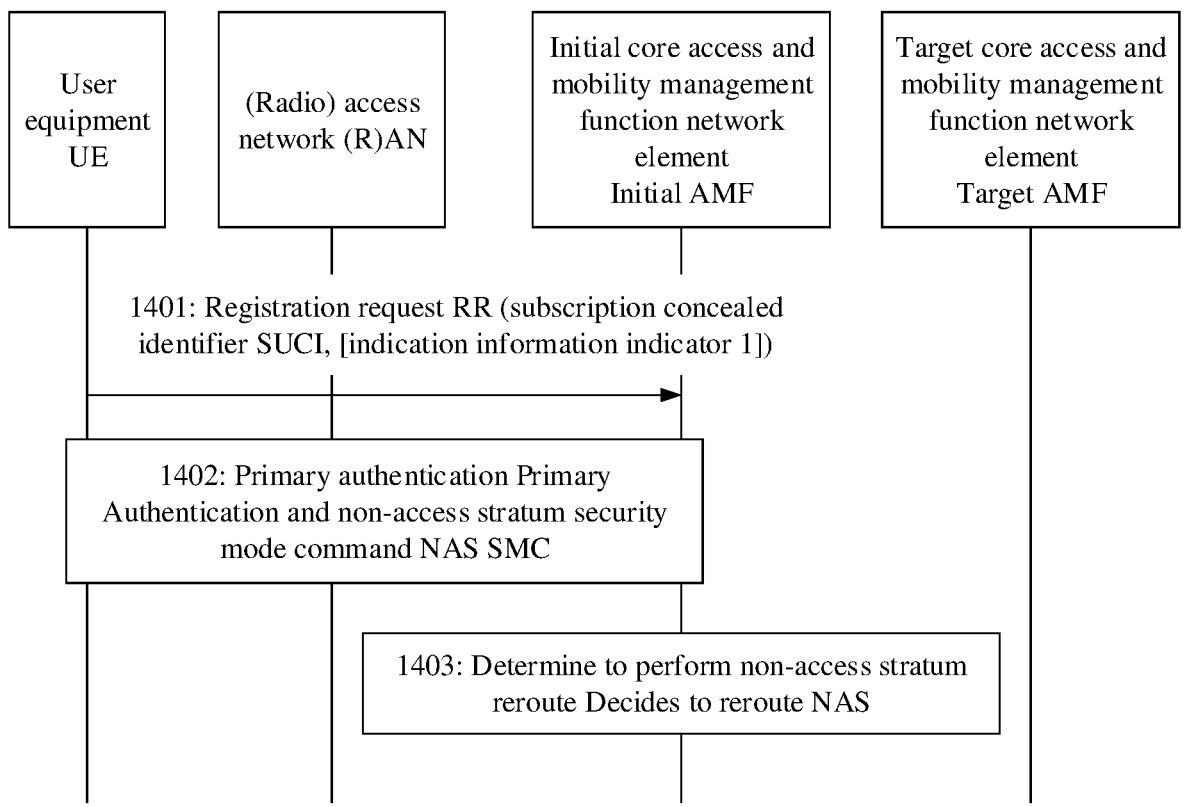
FIG. 14 is an example schematic diagram of a registration procedure to which an embodiment of this application is applicable.

In a registration process shown in FIG. 14, the registration process includes the following steps.

Step 1401: UE sends a registration request RR to an initial AMF, where the RR carries a 5G-GUTI.

Optionally, the RR carries an indicator 1, or the RR does not carry an indicator 1.

An implementation process of step 1402 is the same as that of step 102 and step 103 in FIG. 1A and FIG. 1B.

Step 1403: The initial AMF determines whether the initial AMF can serve the UE. If the initial AMF determines that the initial AMF cannot serve the UE, the initial AMF determines to perform NAS reroute via a (R)AN (or AMF reallocation via a (R)AN).

If the initial AMF does not receive the indication indicator 1, or the initial AMF determines, based on the registration request message,
that the UE is UE with Release 15;
that the UE is UE with non-Release 16 or a release earlier than Release 16;
that the UE does not support a capability in Release 16 or a release later than Release 16;
that the UE does not support a capability of performing NAS reroute via the (R)AN;
that the UE does not support a capability of performing AMF reallocation via the (R)AN;
that the UE does not support a capability of falling back an NAS security context (in NAS reroute via the (RAN)/in AMF reallocation via the (RAN));
that the UE does not support a capability of (resuming) using an old NAS security context (in NAS reroute via the (RAN)/in AMF reallocation via the (RAN));
that the UE does not support a capability of deleting a new NAS security context (in NAS reroute via the (RAN)/in AMF reallocation via the (RAN));
that the UE does not support a capability of restoring to a state in which there is no NAS security context (in NAS reroute via the (RAN)/in AMF reallocation via the (RAN)); and/or the UE does not support a capability of processing an NAS security context in NAS reroute (in NAS reroute via the (RAN)/in AMF reallocation via the (RAN)), the initial AMF may perform one of the following processes:

a1: The initial AMF directly performs NAS reroute, or the initial AMF directly forwards the registration request message to a target AMF, in other words, the initial AMF invokes a Namf_Communication_N1MessageNotify service operation provided by the target AMF. The Namf_Communication_N1MessageNotify service operation includes all registration request messages and a context of the UE if there are the registration request messages and the context of the UE. For a detailed process, refer to step 7(A) defined in the section 4.2.2.2.3 of TS 23.502.

a2: The initial AMF sends information for requesting to a target AMF to assign a new 5G-GUTI to the UE, or the initial AMF requests a target AMF to assign a special new 5G-GUTI used for AMF reallocation. For a detailed process, refer to a process shown in Embodiment 2(1).

a3: The initial AMF assigns a new 5G-GUTI to the UE, or the initial AMF assigns a special new 5G-GUTI used for AMF reallocation to the UE. For a detailed process, refer to a process shown in Embodiment 2(2).

If the initial AMF receives the indication indicator 1, or the initial AMF determines, based on the registration request message,
that the UE is UE with non-Release 15;

that the UE is UE with Release 16 or a release later than Release 16;

that the UE supports a capability in Release 16 or a release later than Release 16;

that the UE supports a capability of performing NAS reroute via the (R)AN;

that the UE supports a capability of performing AMF reallocation via the (R)AN;

that the UE supports a capability of falling back an NAS security context (in NAS reroute via the (RAN)/in AMF reallocation via the (RAN));

that the UE supports a capability of (resuming) using an old NAS security context (in NAS reroute via the (RAN)/in AMF reallocation via the (RAN));

that the UE supports a capability of deleting a new NAS security context (in NAS reroute via the (RAN)/in AMF reallocation via the (RAN));

that the UE supports a capability of restoring to a state in which there is no NAS security context (in NAS reroute via the (RAN)/in AMF reallocation via the (RAN)); and/or the UE supports a capability of processing an NAS security context in NAS reroute (in NAS reroute via the (RAN)/in AMF reallocation via the (RAN)), the initial AMF determines whether to directly perform NAS reroute according to a local policy and based on subscription information (in other words, the initial AMF directly sends the registration request message to the target AMF) or perform NAS reroute via the (R)AN (in other words, the initial AMF sends the registration request message to the target AMF via the (R)AN). If the initial AMF determines to directly perform NAS reroute according to the local policy and based on the subscription information, or if the initial AMF determines to directly forward the registration request message to the target AMF according to the local policy and based on the subscription information, the initial AMF invokes a Namf_Communication_N1MessageNotify service provided by the target AMF. The Namf_Communication_N1MessageNotify service operation includes all registration request messages and a context of the UE if there are the registration request messages and the context of the UE. For a detailed process, refer to step 7(A) defined in the section 4.2.2.2.3 of TS 23.502.

If the initial AMF determines, according to the local policy and based on the subscription information, to perform NAS reroute via the (R)AN (or send the registration request message to the target AMF via the (R)AN), the initial AMF may perform one of the following processes:

b1: The initial AMF notifies the UE that AMF reallocation occurs, the initial AMF indicates the UE to delete the NAS security context, the initial AMF returns to security in which the registration request is sent, or the initial AMF indicates the UE to receive and process an authentication request message without protection, that is, perform a process shown in Embodiment 1(1).

b2: The initial AMF notified the target AMF that AMF reallocation occurs, that is, perform a process shown in Embodiment 1(2).

b3: The initial AMF notified the target AMF that AMF reallocation occurs, that is, perform a process shown in Embodiment 1(3).

b4: The initial AMF sends the NAS security context to the target AMF, that is, performs a process shown in Embodiment 1(4).

b5: The initial AMF sends a complete registration request message to the target AMF, that is, performs a process shown in Embodiment 1(5).

For a detailed process in which the initial AMF performs NAS reroute via the (R)AN, refer to step 7(B) defined in the section 4.2.2.2.3 in TS 23.502.

Embodiment 4

An initial AMF determines to initiate AMF reallocation according to a local policy in a registration process of UE. The initial AMF determines to directly perform NAS reroute, that is, directly send a registration request (or an NAS message) to a target AMF. The initial AMF sends a current NAS security context to the target AMF, to enable the target AMF to perform protection on an authentication request by using the NAS security context, and sends the protected authentication request to the UE, to successfully register the UE (for details, refer to Embodiment 1(4)). Alternatively, an initial AMF determines, according to a local policy, whether to perform horizontal Kamf derivation to generate a new Kamf, and sends the newly generated Kamf to a target AMF, and UE generates a new Kamf, to ensure that NAS security contexts on both sides of the target AMF and the UE are consistent, thereby successfully registering the UE.

Figure 15:
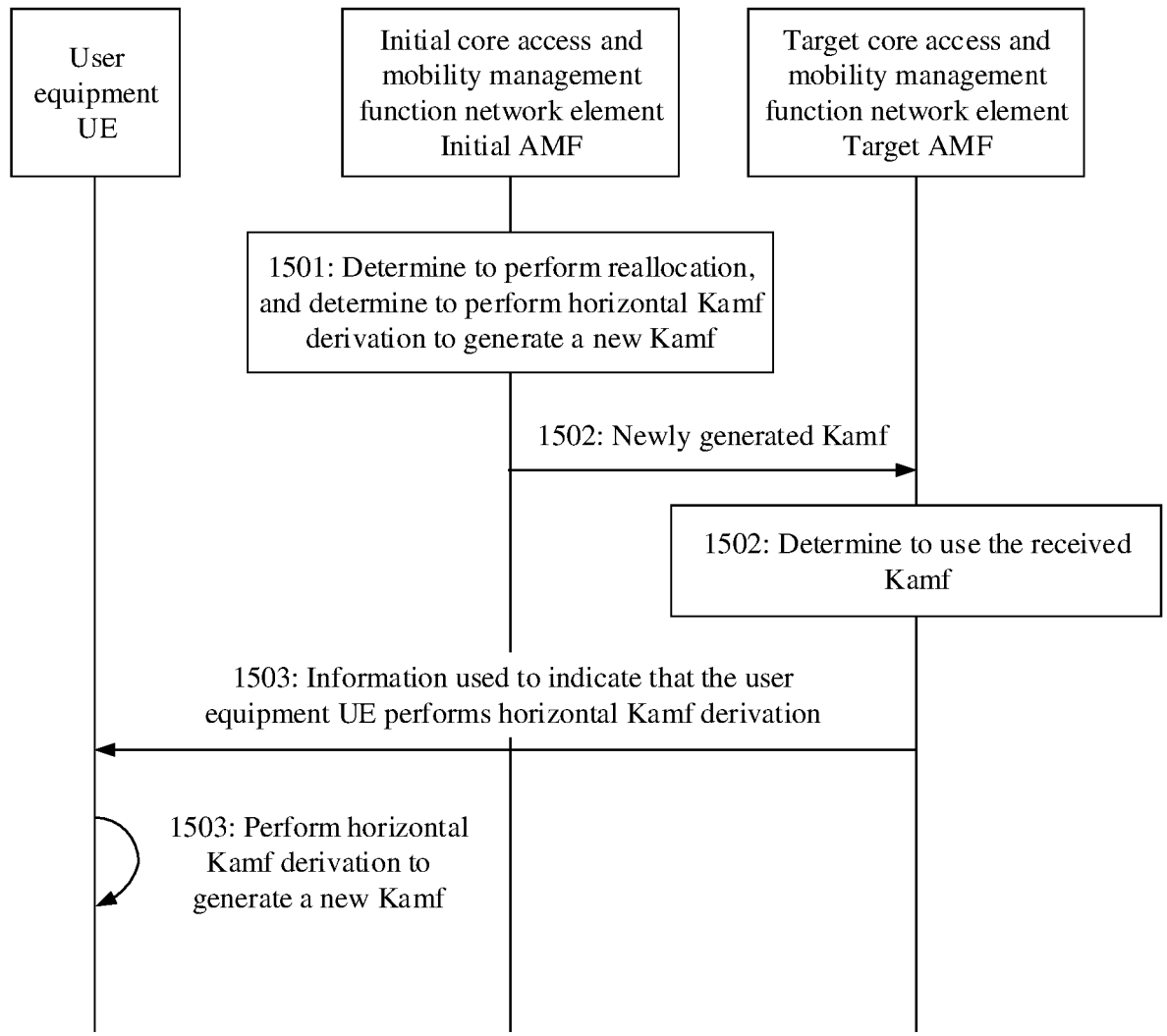
FIG. 15 is an example schematic diagram of a registration procedure to which an embodiment of this application is applicable.

Refer to a registration process shown in FIG. 15. The registration process includes the following steps.

Step 1501: An initial AMF determines, according to a local policy, to directly perform NAS reroute (namely, reallocation). Alternatively, an initial AMF determines, according to a local policy, to directly send a registration request (or an NAS message) to a target AMF. In this case, the initial AMF sends a current NAS security context to the target AMF. Alternatively, an initial AMF determines, according to a local policy, whether to perform horizontal Kamf derivation. If the initial AMF determines to perform horizontal Kamf derivation, the initial AMF generates a new Kamf, and sends the newly generated Kamf to a target AMF. If the AMF determines not to perform horizontal Kamf derivation, the initial AMF sends a current NAS security context (the NAS security context generated in step 102 in FIG. 1A and FIG. 1B) to the target AMF.

Specifically, the initial AMF sends a Namf_Communication_N1MessageNotify message carrying the newly generated Kamf or the current NAS security context to the target AMF.

For example, that the initial AMF performs horizontal Kamf derivation to generate a new Kamf includes one of the following manners:

The initial AMF generates the new Kamf based on a current Kamf (the Kamf generated in step 102 in FIG. 1A and FIG. 1B) and an uplink NAS COUNT value in the received registration request RR.

The initial AMF generates the new Kamf based on a current Kamf and an uplink NAS COUNT value in a received NAS Security Mode Complete message.

The initial AMF generates the new Kamf based on a current Kamf and an uplink NAS COUNT value in a recently received N1 message. Specifically, the N1 message includes the registration request RR and/or the NAS Security Mode Complete message. To be specific, if the initial AMF receives the NAS Security Mode Complete message sent by the UE, the NAS Security Mode Complete message is the recently received N1 message, and the initial AMF generates the new Kamf based on the current Kamf and the uplink NAS COUNT value in the received NAS Security Mode Complete message. Otherwise, the registration request RR is the recently received N1 message, and the initial AMF generates the new Kamf based on the current Kamf and the uplink NAS COUNT value in the received registration request RR.

The initial AMF generates the new Kamf based on a current Kamf and a current downlink NAS COUNT value.

If no new NAS security context is activated/used/generated/established between the initial AMF and the UE, the initial AMF generates the new Kamf based on the current Kamf and the uplink NAS COUNT value in the received registration request RR. Otherwise, the initial AMF generates the new Kamf based on the current Kamf and the current downlink NAS COUNT value.

If the initial AMF receives only one NAS message, and the NAS message is the registration request RR, the initial AMF generates the new Kamf based on the current Kamf and the uplink NAS COUNT value in the received registration request RR. Otherwise, the initial AMF generates the new Kamf based on the current Kamf and the current downlink NAS COUNT value.

If no NAS security mode command/control procedure is performed between the initial AMF and the UE, the initial AMF generates the new Kamf based on the current Kamf and the uplink NAS COUNT value in the received registration request RR. Otherwise, the initial AMF generates the new Kamf based on the current Kamf and the current downlink NAS COUNT value.

If the NAS message received by the initial AMF includes only the registration request RR message, the initial AMF generates the new Kamf based on the current Kamf and the uplink NAS COUNT value in the received registration request RR. Otherwise, the initial AMF generates the new Kamf based on the current Kamf and the current downlink NAS COUNT value.

If the initial AMF receives other NAS messages in addition to the registration request RR, the initial AMF generates the new Kamf based on the current Kamf and the current downlink NAS COUNT value. Otherwise, the initial AMF generates the new Kamf based on the current Kamf and the uplink NAS COUNT value in the received registration request RR. The other NAS messages include the NAS Security Mode Complete message.

If the initial AMF generates the new Kamf or if the initial AMF performs horizontal Kamf derivation, the initial AMF sends an indication indicator 2 used to indicate that the new Kamf is generated or an indication used to indicate that horizontal Kamf derivation is performed to the target AMF. The initial AMF further sends an indication used to indicate that AS key re-keying needs to be performed to the target AMF.

Specifically, the initial AMF includes the indicator 2 in the Namf_Communication_N1MessageNotify message, or the indication used to indicate that horizontal Kamf derivation is performed. The initial AMF includes the new Kamf, a new ngKSI, and the indication used to indicate that AS key re-keying needs to be performed in the Namf_Communication_N1MessageNotify message.

If the initial AMF generates the new Kamf by using the current downlink NAS COUNT, the initial AMF sends the downlink NAS COUNT value to the target AMF. Specifically, the initial AMF includes the downlink NAS COUNT value used to generate the new Kamf in the Namf_Communication_N1MessageNotify.

Optionally, the initial AMF sends, to the target AMF, the uplink NAS COUNT value used to generate the new Kamf. Alternatively, if the initial AMF uses the uplink NAS COUNT in the registration request when generating the new Kamf, the initial AMF sends, to the target AMF, an indication indicator 3 used to indicate to "generate the new Kamf by using the uplink NAS COUNT value in the registration request message". Alternatively, if the initial AMF uses the uplink NAS COUNT in the NAS Security Mode Complete message when generating the new Kamf, the initial AMF sends, to the target AMF, an indication indicator 4 used to indicate to "generate the new Kamf by using the uplink NAS COUNT value in the NAS Security Mode Complete message".

Optionally, the initial AMF sends an indication indicator X to the target AMF, where the indication indicator X is used to indicate that "the registration request message is from the verified UE", "verification on the UE succeeds", "verification on the registration message succeeds", "the UE does not need to be verified", or "the registration message does not need to be verified". Specifically, the initial AMF optionally sends the Namf_Communication_N1MessageNotify message including the indicator X to the target AMF.

Optionally, if the new NAS security context is established between the initial AMF and the UE, the initial AMF sends the indicator X to the target AMF.

Step 1502: The target AMF receives the Kamf, and the target AMF determines, according to the local policy, whether to use the received Kamf. If the target AMF determines to use the received Kamf, and if the target AMF receives the indication used to indicate that the new Kamf is generated, or the indication used to indicate that horizontal Kamf derivation needs to be performed, the target AMF sends the indication used to indicate that the UE performs horizontal Kamf derivation to the UE.

If the target AMF determines not to use the received Kamf, the target AMF may initiate re-authentication and re-establish a new NAS security context with the UE.

For example, the target AMF sets K_AMF_change_flag (the indication used to indicate that the UE performs horizontal Kamf derivation) to 1.

Specifically, the target AMF includes the indication used to indicate that the UE performs horizontal Kamf derivation in the NAS Security Mode Command message and send the NAS Security Mode Command message to the UE.

Optionally, that the target AMF further sends, to the UE, information about a value used to generate the new Kamf specifically includes one of the following cases:

If the target AMF receives a downlink NAS COUNT value, the target AMF sends the downlink NAS COUNT value to the UE. Specifically, the target AMF includes the downlink NAS COUNT value in NAS Container.

Alternatively, if the target AMF receives an uplink NAS COUNT value, the target AMF sends the uplink NAS COUNT value to the UE. Specifically, the target AMF includes the uplink NAS COUNT value in an NAS Security Mode Command message.

Alternatively, if the target AMF receives the indicator 3, the target AMF sends, to the UE, an indication indicator 5 used to indicate to "generate the new Kamf by using the uplink NAS COUNT value in the registration request message". Specifically, the target AMF sends an NAS Security Mode Command message including the indicator 5 to the UE.

Alternatively, if the target AMF receives the indicator 4, the target AMF sends, to the UE, an indication indicator 6 used to indicate to "generate the new Kamf by using the uplink NAS COUNT value in the NAS security mode complete message". Specifically, the target AMF sends an NAS Security Mode Command message including the indicator 6 to the UE.

Optionally, if the target AMF receives the indicator X, the target AMF does not verify the received registration request RR, or the target AMF does not verify the UE.

Step 1503: The UE receives the indication used to indicate that horizontal Kamf derivation needs to be performed, and performs horizontal Kamf derivation to generate the new Kamf.

A process in which the UE performs horizontal Kamf derivation is the same as a process in which the initial AMF performs horizontal Kamf derivation, to ensure that an NAS security context in the target AMF is consistent with an NAS security context in the UE.

When receiving the K_AMF_change_flag whose value is 1, the UE determines that information used to indicate that the UE performs horizontal Kamf derivation is received.

Optionally, that the UE performs horizontal Kamf derivation based on the indication and the information about the value used to generate the new Kamf, to generate the new Kamf specifically includes one of the following cases:

If the UE receives a downlink NAS COUNT value, the UE generates the new Kamf by using the downlink NAS COUNT value.

Alternatively, if the UE receives an uplink NAS COUNT value, the UE generates the new Kamf by using the uplink NAS COUNT value.

Alternatively, if the UE receives the indicator 4, the UE generates the new Kamf by using the uplink NAS COUNT value in the registration request message.

Alternatively, if the UE receives the indicator 5, the UE generates the new Kamf by using the uplink NAS COUNT value in the NAS Security Mode Complete.

Otherwise, the UE generates the new Kamf by using the uplink NAS COUNT value in the recently sent N1 message. Specifically, if the UE recently sends an NAS Security Command message, the UE generates the new Kamf by using an uplink NAS COUNT value in the NAS Security Command message. Otherwise, the UE uses the uplink NAS COUNT in the sent registration request message.

The following describes a registration process in Embodiment 4 of this application by using a specific embodiment.

Figure 16:
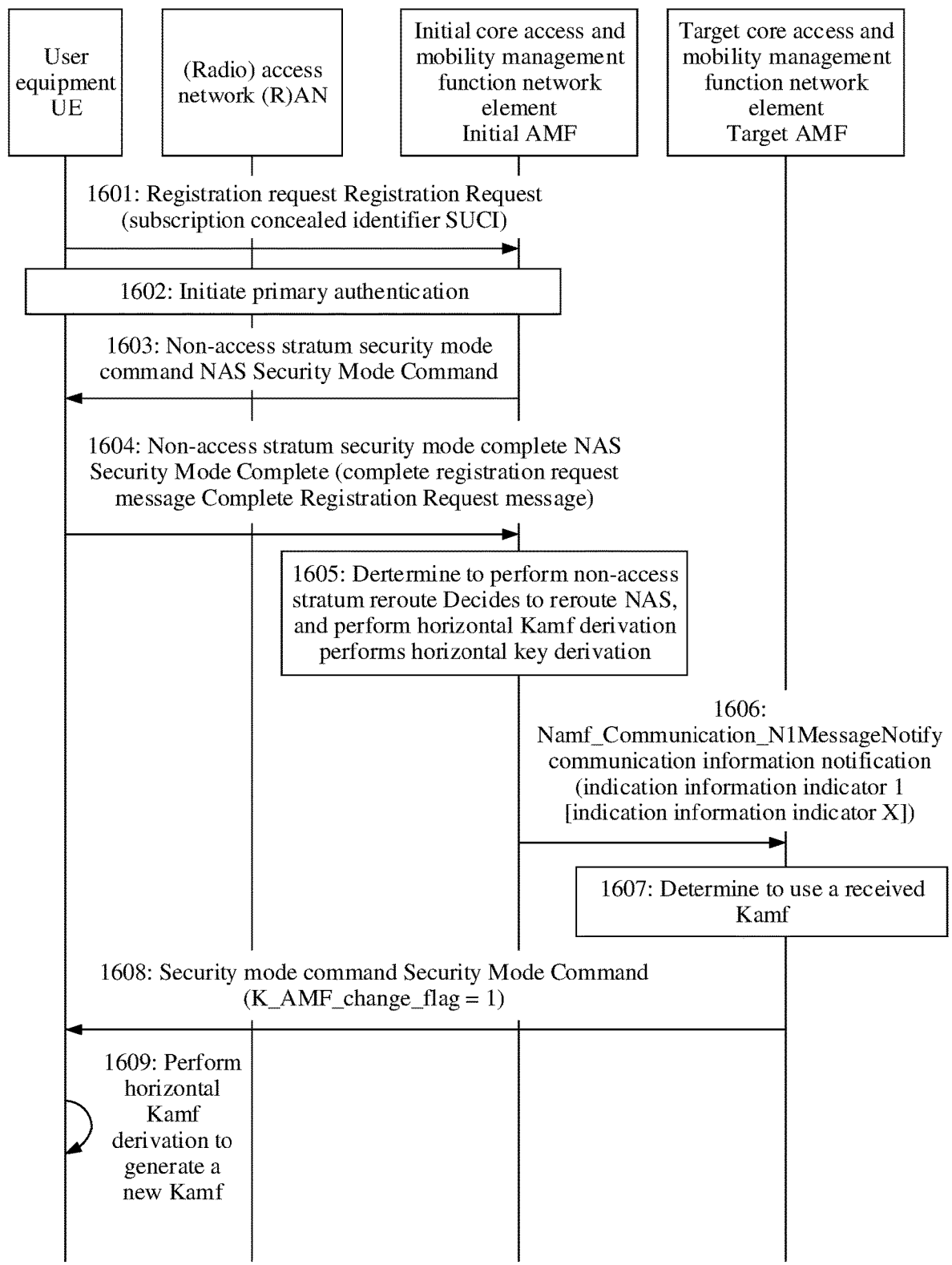
FIG. 16 is an example schematic diagram of a registration procedure to which an embodiment of this application is applicable.

Refer to a registration procedure shown in FIG. 16. The registration process includes the following steps.

An implementation process of step 1601 to step 1604 is the same as that of step 101 to step 103 shown in FIG. 1A and FIG. 1B.

Step 1605: The initial AMF determines whether the initial AMF can serve the UE. If the initial AMF determines that the initial AMF cannot serve the UE, and the initial AMF determines to directly perform NAS reroute or the initial AMF determines to directly send the registration request message (or an NAS message) to a target AMF, the initial AMF sends a current security context to the target AMF. Alternatively, the initial AMF determines, according to a local policy, whether to perform horizontal Kamf derivation. If the initial AMF determines to perform horizontal Kamf derivation (e.g., horizontal key derivation), the initial AMF generates a new Kamf and sends the newly generated Kamf to a target AMF. If the initial AMF determines not to perform horizontal Kamf derivation, the initial AMF sends a current NAS security context to the target AMF.

Step 1606: The initial AMF sends a Namf_Communication_N1MessageNotify message to the target AMF, where the Namf_Communication_N1MessageNotify message includes the new Kamf and an indication indicator 1. Optionally, the Namf_Communication_N1MessageNotify message includes an indication indicator X.

If the initial AMF generates the new Kamf by using the current downlink NAS COUNT, the initial AMF sends the downlink NAS COUNT value to the target AMF. Specifically, the initial AMF includes the downlink NAS COUNT value used to generate the new Kamf in the Namf_Communication_N1MessageNotify.

Optionally, the initial AMF sends, to the target AMF, an uplink NAS COUNT value used to generate the new Kamf. Alternatively, if the initial AMF uses an uplink NAS COUNT in the registration request when generating the new Kamf, the initial AMF sends, to the target AMF, an indication indicator 3 used to indicate to "generate the new Kamf by using the uplink NAS COUNT value in the registration request message". Alternatively, if the initial AMF uses an uplink NAS COUNT in the NAS Security Mode Complete message when generating the new Kamf, the initial AMF sends, to the target AMF, an indication indicator 4 used to indicate to "generate the new Kamf by using the uplink NAS COUNT value in the NAS Security Mode Complete message".

Step 1607: The target AMF receives the new Kamf and the indication indicator 1, and determines to use the received new Kamf according to the local policy. If the target AMF determines not to use the received new Kamf, the target AMF may initiate re-authentication and establish a new NAS security context with the UE. If the target AMF determines to use the received Kamf according to the local policy, the target AMF sets K_AMF_change_flag to 1.

Step 1608: The target AMF sends the security mode command message including the K_AMF_change_flag whose value is 1 to the UE, where the Security Mode Command message indicates information about a value used to generate the new Kamf.

Specifically, if the target AMF receives a downlink NAS COUNT value, the target AMF sends the downlink NAS COUNT value to the UE. Specifically, the target AMF includes the downlink NAS COUNT value in NAS Container.

Alternatively, if the target AMF receives an uplink NAS COUNT value, the target AMF sends the uplink NAS COUNT value to the UE. Specifically, the target AMF includes the uplink NAS COUNT value in an NAS Security Mode Command message.

Alternatively, if the target AMF receives the indicator 3, the target AMF sends, to the UE, an indication indicator 5 used to indicate to "generate the new Kamf by using the uplink NAS COUNT value in the registration request message". Specifically, the target AMF sends an NAS Security Mode Command message including the indicator 5 to the UE.

Alternatively, if the target AMF receives the indicator 4, the target AMF sends, to the UE, an indication indicator 6 used to indicate to "generate the new Kamf by using the uplink NAS COUNT value in the NAS security mode complete message". Specifically, the target AMF sends an NAS Security Mode Command message including the indicator 6 to the UE.

Step 1609: The UE receives K_AMF_change_flag whose value is 1, determines to perform horizontal Kamf derivation, and generates the new Kamf based on the received value used to generate the new Kamf.

Specifically, if the UE receives K_AMF_change_flag whose value is 1, and if the UE receives a downlink NAS COUNT value, the UE generates the new Kamf by using the downlink NAS COUNT value;

if the UE receives an uplink NAS COUNT value, the UE generates the new Kamf by using the uplink NAS COUNT value;

if the UE receives the indicator 4, the UE generates the new Kamf by using the uplink NAS COUNT value in the registration request message; or if the UE receives the indicator 5, the UE generates the new Kamf by using the uplink NAS COUNT value in the NAS Security Mode Complete.

Otherwise, the UE generates the new Kamf by using the uplink NAS COUNT value in the recently sent N1 message. Specifically, if the UE recently sends an NAS Security Command message, the UE generates the new Kamf by using an uplink NAS COUNT value in the NAS Security Command message. Otherwise, the UE uses the uplink NAS COUNT value in the sent registration request message.

Figure 17:
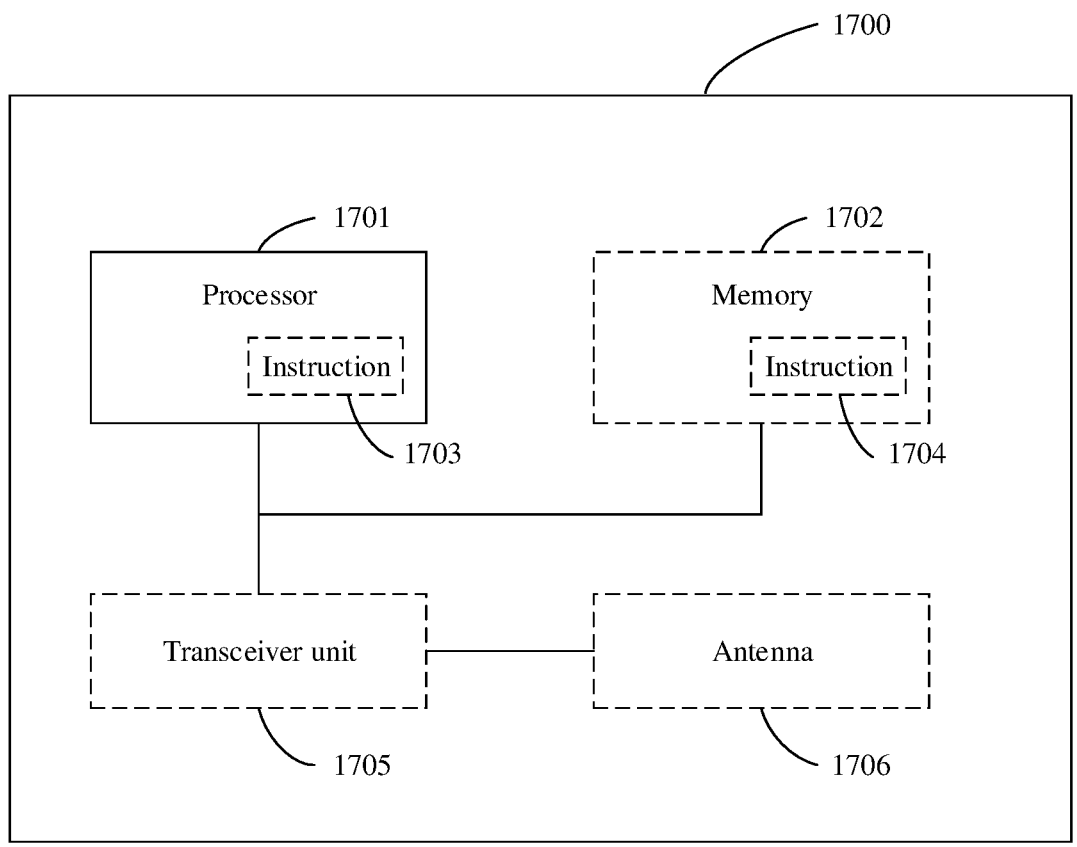
FIG. 17 is an example schematic diagram of a structure of a registration apparatus to which an embodiment of this application is applicable.

The foregoing describes the registration method in the embodiments of this application in detail with reference to FIG. 2 to FIG. 17. Based on a same technical concept as the foregoing registration method, as shown in FIG. 17, an embodiment of this application further provides a schematic diagram of a structure of a registration apparatus 1700. The apparatus 1700 may be configured to implement the method described in the foregoing method embodiments applied to the AMF or the UE. Refer to the descriptions in the foregoing method embodiments.

The apparatus 1700 includes processor 1701 (which can include one or more processors 1701). The processor 1701 may be a general-purpose processor, a special-purpose processor, or the like. For example, the processor may be a baseband processor or a central processing unit. The baseband processor may be configured to process a communication protocol and communication data. The central processing unit may be configured to control a communication apparatus (for example, a base station, a terminal, or a chip), execute a software program, and process data of the software program. The communication apparatus may include a transceiver unit, configured to input (e.g., receive) and output (e.g., send/transmit) signals. For example, the transceiver unit may be a transceiver, a radio frequency chip, or the like.

The apparatus 1700 includes the one or more processors 1701, and the one or more processors 1701 may implement the method performed by the AMF or the UE in the foregoing embodiments.

Optionally, in addition to implementing the method in the foregoing embodiments, the processor 1701 may further implement another function.

Optionally, in a design, the processor 1701 may execute instructions, so that the apparatus 1700 performs the method described in the foregoing method embodiments. All or some of the instructions, for example, an instruction 1703, may be stored in the processor 1701, or all or some of the instructions, for example, an instruction 1704, may be stored in a memory 1702 coupled to the processor 1701. Alternatively, the apparatus 1700 may be enabled, by using both instructions 1703 and 1704, to perform the method described in the foregoing method embodiments.

In still another possible design, the registration apparatus 1700 may further include a circuit, and the circuit may implement a function of the AMF or the UE in the foregoing method embodiments.

In still another possible design, the apparatus 1700 may include one or more memories 1702 that store an instruction 1704. The instruction may be run on the processor 1701, so that the apparatus 1700 performs the method described in the foregoing method embodiments. Optionally, the memory 1702 may further store data. Optionally, the processor 1701 may alternatively store instructions and/or data. For example, the one or more memories 1702 may store the correspondence described in the foregoing embodiments, or the related parameter or table provided in the foregoing embodiments. The processor 1701 and the memory 1702 may be separately disposed, or may be integrated together.

In still another possible design, the apparatus 1700 may further include a transceiver unit 1705 and an antenna 1706. The processor 1701 may be referred to as a processing unit, to control an apparatus (e.g., a terminal or a base station). The transceiver unit 1705 may be referred to as a transceiver circuit, a transceiver, or the like, and is configured to implement a transceiver function of the apparatus through the antenna 1706.

It should be noted that the processor 1701 in the embodiments of this application may be an integrated circuit chip, and has a signal processing capability. In an implementation process, the steps in the foregoing method embodiments may be implemented by using a hardware integrated logic circuit in the processor, or by using instructions in a form of software. The processor 1701 may be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logical block diagrams that are disclosed in the embodiments of this application may be implemented or performed. The general-purpose processor may be a microprocessor, or the processor 1701 may be any conventional processor or the like. Steps of the methods disclosed with reference to the embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor 1701.

It may be understood that the memory 1702 in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

An embodiment of this application further provides a computer-readable medium, where the computer-readable medium stores a computer program. When the computer program is executed by a computer, the registration method in any method embodiment applied to the AMF or the UE is implemented.

An embodiment of this application further provides a computer program product. When the computer program product is executed by a computer, the registration method in any method embodiment applied to the AMF or the UE is implemented.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

An embodiment of this application further provides a processing apparatus, including a processor and an interface. The processor is configured to perform the registration method in any method embodiment applied to the AMF or the UE.

It should be understood that the processing apparatus may be a chip. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor. The general-purpose processor is implemented by reading software code stored in a memory. The memory may be integrated into the processor, or may be located outside the processor and exist independently.

A person of ordinary skill in the art may be aware that, units, algorithms, and steps in the examples described with reference to the embodiments disclosed in this specification can be implemented by electronic hardware, computer software, or a combination thereof. To clearly describe interchangeability between the hardware and the software, the foregoing has generally described compositions and steps of the examples based on functions. Whether the functions are performed by hardware or software depends on particular applications and design constraints of the technical solutions. A person skilled in the art may use a different method to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments.

In the several embodiments provided in this application, it should be understood that the disclosed system, apparatus, and method may be implemented in other manners. For example, the foregoing apparatus embodiment is only an example. For example, division into the units is only a type of division of logical functions, and may be another manner of division in an actual implementation. For example, a plurality of units or components may be combined or integrated into another system, or some features may be ignored or may not be performed. In addition, displayed or discussed mutual couplings or direct couplings or communication connections may be indirect couplings or communication connections through some interfaces, apparatuses, or units, and may be connections in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by using hardware, firmware, or a combination thereof. When this application is implemented by using the software, the foregoing functions may be stored in a computer-readable medium or transmitted as one or more instructions or code in the computer-readable medium. The computer-readable medium includes a computer storage medium and a communication medium, where the communication medium includes any medium that facilitates transmission of a computer program from one place to another place. The storage medium may be any available medium that can be accessed by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of instructions or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line or wireless technologies such as infrared ray, radio and microwave, the coaxial cable, optical fiber/cable, twisted pair, DSL or wireless technologies such as infrared ray, radio, and microwave are included in a definition of a medium to which they belong. A disk and a disc used in this application include a compact disc (CD), a laser disc, an optical disc, a digital versatile disk (DVD), a floppy disk, and a Blu-ray disc. The disk usually copies data in a magnetic manner, whereas the disc copies data optically through a laser. The foregoing combination should also be included in the protection scope of the computer-readable medium.

In conclusion, the foregoing descriptions are merely example embodiments of the technical solutions in this application, but are not intended to limit the protection scope of this application. Any modification, equivalent replacement, or improvement made without departing from the spirit and principle of this application should fall in the protection scope of this application.

What is claimed is:

1. A registration method, comprising:
   determining, by an initial core access and mobility management function (AMF) network element, to perform AMF reallocation; and
   sending, by the initial core AMF, a first notification message or a first non-access stratum (NAS) message to user equipment (UE), wherein
   the first notification message is used to indicate the UE to delete an NAS security context, or
   the first NAS message carries first indication information, and the first indication information is used to indicate the UE to delete the NAS security context.

2. The method according to claim 1, wherein the first notification message or the first NAS message carries a next generation key set identifier (ngKSI), and the ngKSI is used to indicate the UE to delete the NAS security context corresponding to the ngKSI.

3. The method according to claim 1, wherein the first NAS message may include any of: a configuration update command, a fifth generation (5G) system mobility management status, or a registration reject message.

4. The method according to claim 1, wherein the initial core AMF sends second indication information to a target AMF, wherein the second indication information indicates the UE to delete the NAS security context.

5. A registration method, comprising:
   receiving, by user equipment (UE), a first notification message, or a first non-access stratum (NAS) message sent by an initial access and mobility management function (AMF), wherein the first NAS message carries first indication information;
   deleting, by the UE, the NAS security context based on the first notification message, or the first indication information; and
   in association with the UE receiving an authentication request message sent by a target AMF:
      processing, by the UE, the authentication request message, and
      sending an authentication response message to the target AMF.

6. The method according to claim 5, wherein
   the first notification message or the first NAS message carries a next generation key set identifier (ngKSI), and
   deleting the NAS security context based on the indication information comprises:
      deleting, by the UE, the NAS security context corresponding to the ngKSI.

7. The method according to claim 5, wherein the first NAS message may include any of: a configuration update command, a fifth generation (5G) system mobility management status, or a registration reject message.

8. The method according to claim 5, wherein the authentication response message is sent to the target AMF without security protection.

9. A registration method, comprising:
   receiving, by a target core access and mobility management function (AMF) network element, first indication information, wherein the first indication information is used to indicate user equipment (UE) to delete a non-access stratum (NAS) security context;
   sending, by the target core AMF based on the first indication information, an authentication request message to the UE, wherein the authentication request message includes the first indication information used to indicate the UE to delete the NAS security context; and
   receiving an authentication response message sent by the UE.

10. The method according to claim 9, wherein receiving, by the target core AMF, the indication information comprises:
    receiving, by the target core AMF, a notification message sent by a radio access network (RAN), wherein the notification message carries second indication information, and the second indication information is used to indicate the UE to delete the NAS security context; and
    sending, by the target core AMF based on the second indication information, the authentication request message to the UE, wherein the authentication request message includes third indication information used to indicate the UE to delete the NAS security context.

11. The method according to claim 9, wherein receiving, by the target core AMF, the indication information comprises:
    receiving, by the target core AMF, a notification message sent by a radio access network (RAN), wherein the notification message carries second indication information used to indicate the UE to verify the second indication information and delete the NAS security context; and
    sending, by the target core AMF based on the second indication information, the authentication request message to the UE, wherein the authentication request message includes the second indication information used to indicate the UE to verify the second indication information and delete the NAS security context.

12. The method according to claim 9, wherein receiving, by the target core AMF, the indication information comprises:
    receiving, by the target core AMF, a complete registration request message sent by a radio access network (RAN); and
    sending, by the target core AMF, the authentication request message to the UE based on the complete registration request message, wherein the authentication request message includes the indication information used to indicate the UE to delete the NAS security context.

13. The method according to claim 9, wherein the target core AMF sending the authentication request message to the UE to indicate the UE to delete the NAS security context comprises:
    incorporating, by the target core AMF based on an obtained next generation key set identifier (ngKSI), the ngKSI in the authentication request message, and sending the ngKSI to the UE, wherein the ngKSI is used to indicate the UE to delete the NAS security context corresponding to the ngKSI.

14. A registration method, comprising:
    receiving, by user equipment (UE), an authentication request message sent by a target core access and mobility management function (AMF) network element, wherein the authentication request message includes indication information used to indicate the UE to delete a non-access stratum (NAS) security context;

deleting, by the UE, the NAS security context based on the indication information that is included in the authentication request message and that is used to indicate the UE to delete the NAS security context; and processing, by the UE, the authentication request message, and sending an authentication response message to the target core AMF.

15. The method according to claim 14, wherein the indication information that is included in the authentication request message and that is used to indicate the UE to delete the NAS security context is second indication information; and deleting, by the UE, the NAS security context based on the indication information comprises:
deleting, by the UE, the NAS security context based on the second indication information.

16. The method according to claim 15, wherein the indication information that is included in the authentication request message and that is used to indicate the UE to delete the NAS security context is third indication information; and deleting, by the UE, the NAS security context based on the indication information comprises:
deleting, by the UE, the NAS security context based on the third indication information.

17. The method according to claim 14, wherein the indication information that is included in the authentication request message and that is used to indicate the UE to delete the NAS security context is second indication information; and deleting, by the UE, the NAS security context based on the indication information comprises:
verifying, by the UE, the second indication information, and deleting the NAS security context.

18. The method according to claim 14, wherein the authentication request message includes a next generation key set identifier (ngKSI); and the UE deleting the NAS security context comprises:
deleting, by the UE based on the ngKSI, the NAS security context corresponding to the ngKSI.

* * * * *